(12) United States Patent
Sasaki

(10) Patent No.: US 9,792,695 B2
(45) Date of Patent: Oct. 17, 2017

(54) IMAGE PROCESSING APPARATUS, IMAGE PROCESSING METHOD, IMAGE PROCESSING SYSTEM, AND NON-TRANSITORY COMPUTER READABLE MEDIUM

(71) Applicant: FUJI XEROX CO., LTD., Tokyo (JP)

(72) Inventor: Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 71 days.

(21) Appl. No.: 14/926,736

(22) Filed: Oct. 29, 2015

(65) Prior Publication Data

US 2016/0364626 A1 Dec. 15, 2016

(30) Foreign Application Priority Data

Jun. 15, 2015 (JP) .................................. 2015-120622

(51) Int. Cl.
*G06K 9/46* (2006.01)
*G06K 9/62* (2006.01)
*G06T 7/11* (2017.01)
*G06T 7/10* (2017.01)
*G06T 7/181* (2017.01)
(Continued)

(52) U.S. Cl.
CPC ............ *G06T 7/11* (2017.01); *G06F 3/04845* (2013.01); *G06K 9/4671* (2013.01); *G06K 9/6217* (2013.01); *G06K 9/6253* (2013.01); *G06T 7/10* (2017.01); *G06T 7/187* (2017.01);
(Continued)

(58) Field of Classification Search
None
See application file for complete search history.

(56) References Cited

U.S. PATENT DOCUMENTS 6,323,876 B1 * 11/2001 Rao ..................... G06K 9/00442
345/634
2006/0159342 A1 * 7/2006 Sun ........................ G06K 9/342
382/173

(Continued)

FOREIGN PATENT DOCUMENTS

JP 2014-064835 A 4/2014

OTHER PUBLICATIONS

Vezhnevets et al., ""Grow Cut"—Interactive Multi-Label N-D Image Segmentation by Cellular Automata," Proc. Graphicon, 2005, pp. 150-156.

(Continued)

*Primary Examiner* — Kim Vu
*Assistant Examiner* — Nathan Bloom
(74) *Attorney, Agent, or Firm* — Oliff PLC

(57) ABSTRACT

An image processing apparatus includes a position information obtaining unit and a region detection unit. The position information obtaining unit obtains position information indicating a representative position of one or more designated regions in an image. The region detection unit detects the one or more designated regions from the position information. The region detection unit cancels a setting of the one or more designated regions for pixels within a predetermined portion of the image, and detects the one or more designated regions again for the pixels within the predetermined portion, based on a reference pixel selected from among pixels on the image for which the setting of the one or more designated regions has not been canceled.

15 Claims, 45 Drawing Sheets

(51) Int. Cl.
*G06F 3/0484* (2013.01)
*G06T 7/187* (2017.01)

(52) U.S. Cl.
CPC ............... *G06T 2207/20101* (2013.01); *G06T 2207/20112* (2013.01)

(56) References Cited

U.S. PATENT DOCUMENTS

| | | | | |
|---|---|---|---|---|
| 2008/0136820 | A1* | 6/2008 | Yang | G06F 3/04845 345/440 |
| 2008/0310716 | A1* | 12/2008 | Jolly | G06K 9/342 382/173 |
| 2009/0304280 | A1* | 12/2009 | Aharoni | G06T 7/194 382/180 |
| 2010/0111396 | A1* | 5/2010 | Boucheron | G06K 9/0014 382/133 |
| 2013/0022255 | A1* | 1/2013 | Chen | G06K 9/34 382/131 |
| 2013/0136338 | A1* | 5/2013 | Asente | G06K 9/46 382/154 |
| 2015/0193943 | A1 | 7/2015 | Li | |

OTHER PUBLICATIONS

Shiba et al., "Fast and Memory Efficient Image Segmentation Using Graph Cuts by Divided Images", The Institue of Electronics, Information and Communication Engineers Journal, vol. J95-D, No. 3, pp. 628-637.

\* cited by examiner

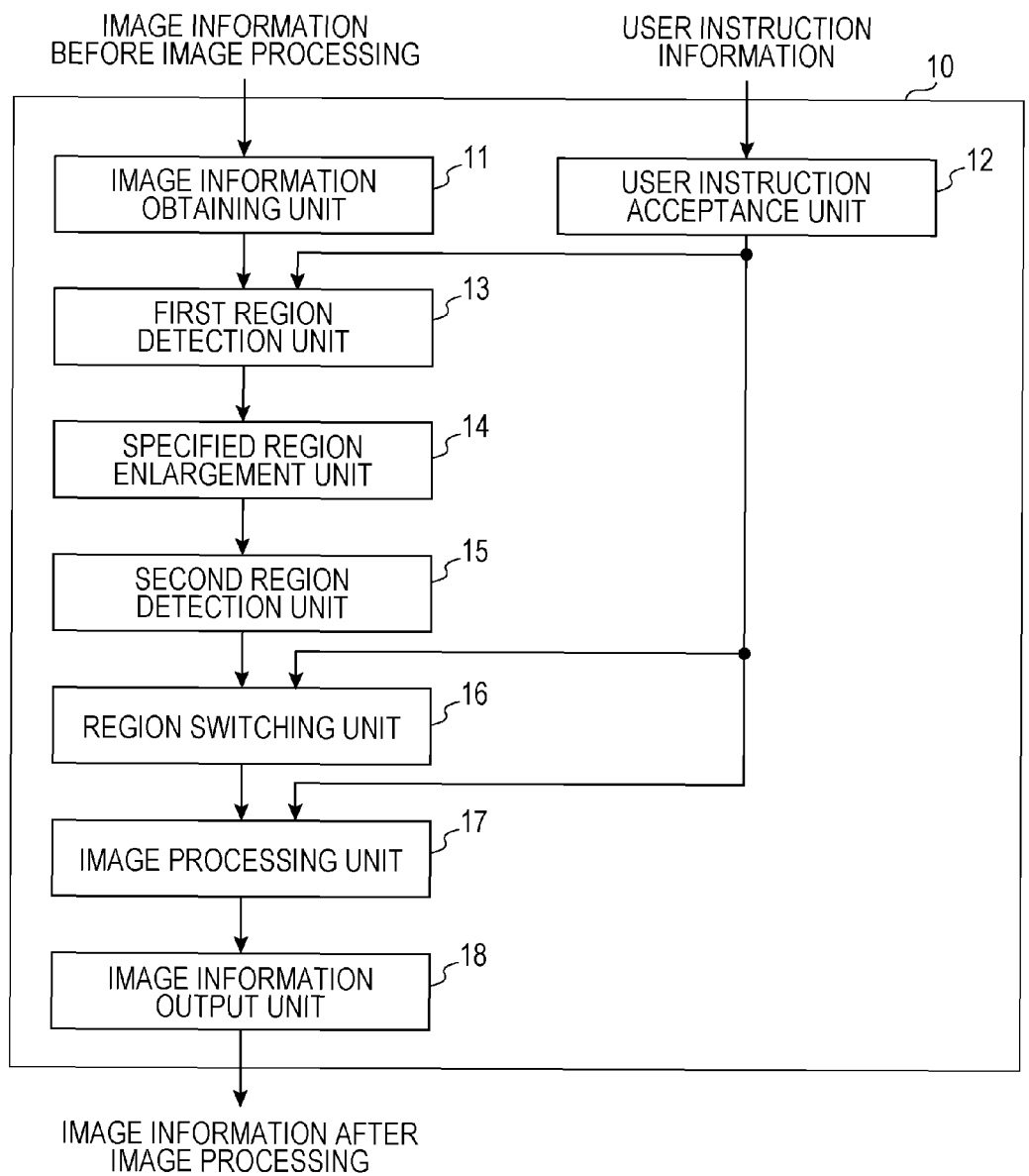

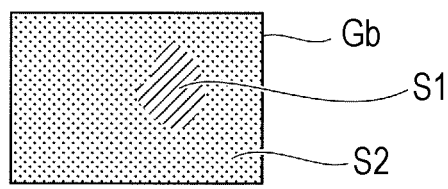
FIG. 5A
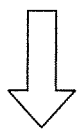
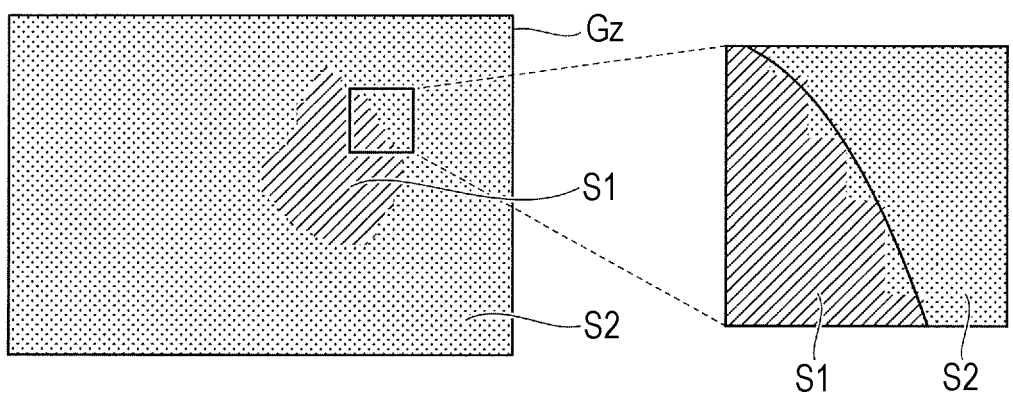
FIG. 5B
FIG. 5C

FIG. 7A
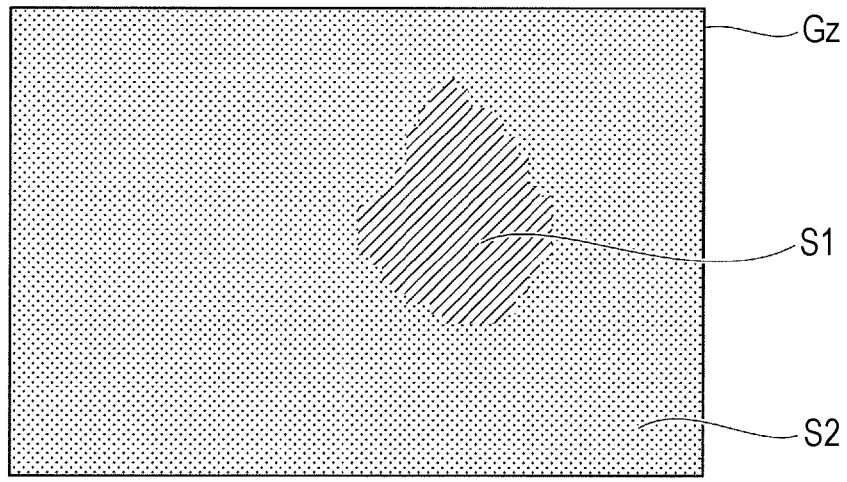
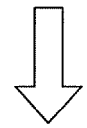
FIG. 7B
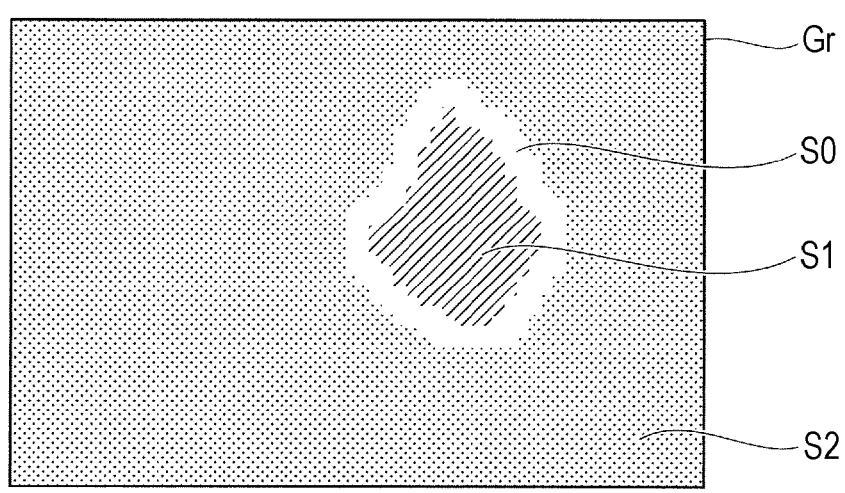

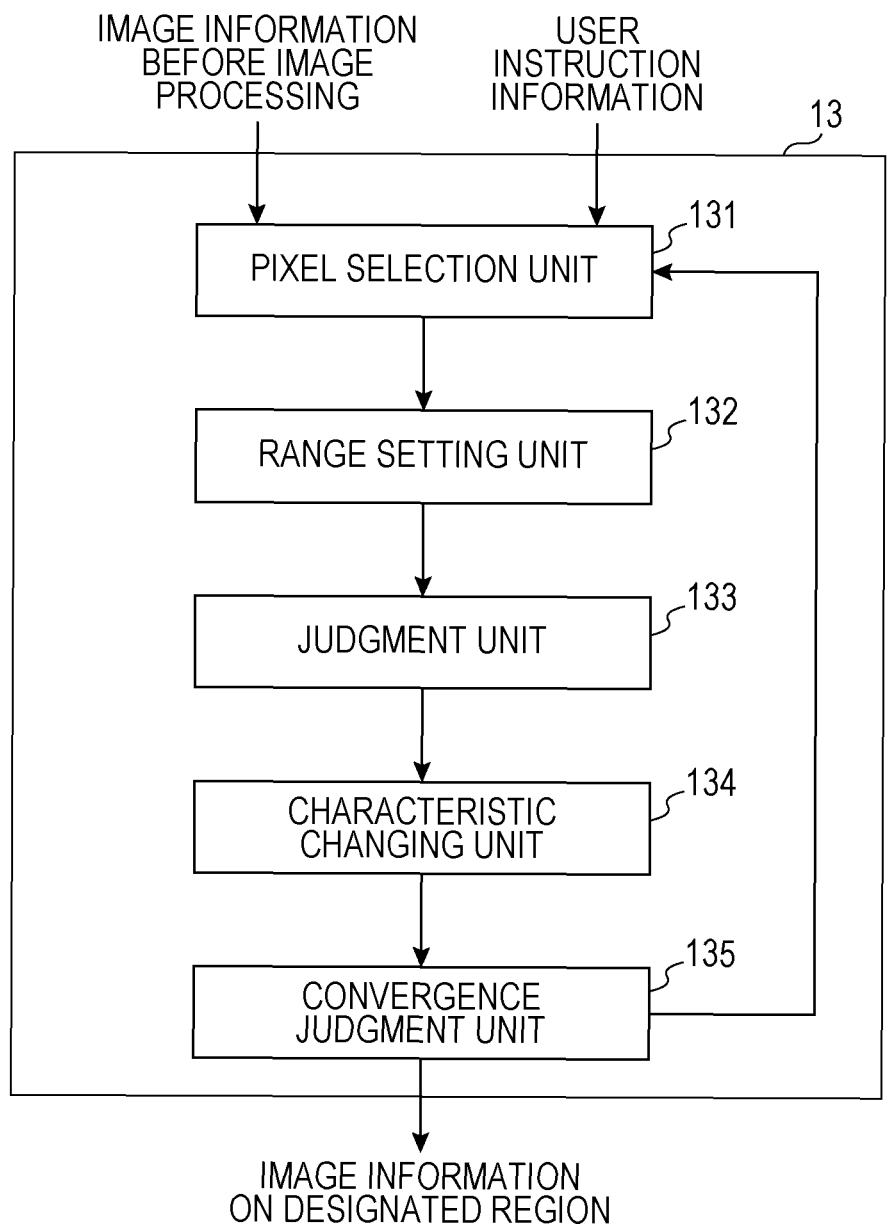

SEED 2   SEED 1

FIG. 27A
FIG. 27B

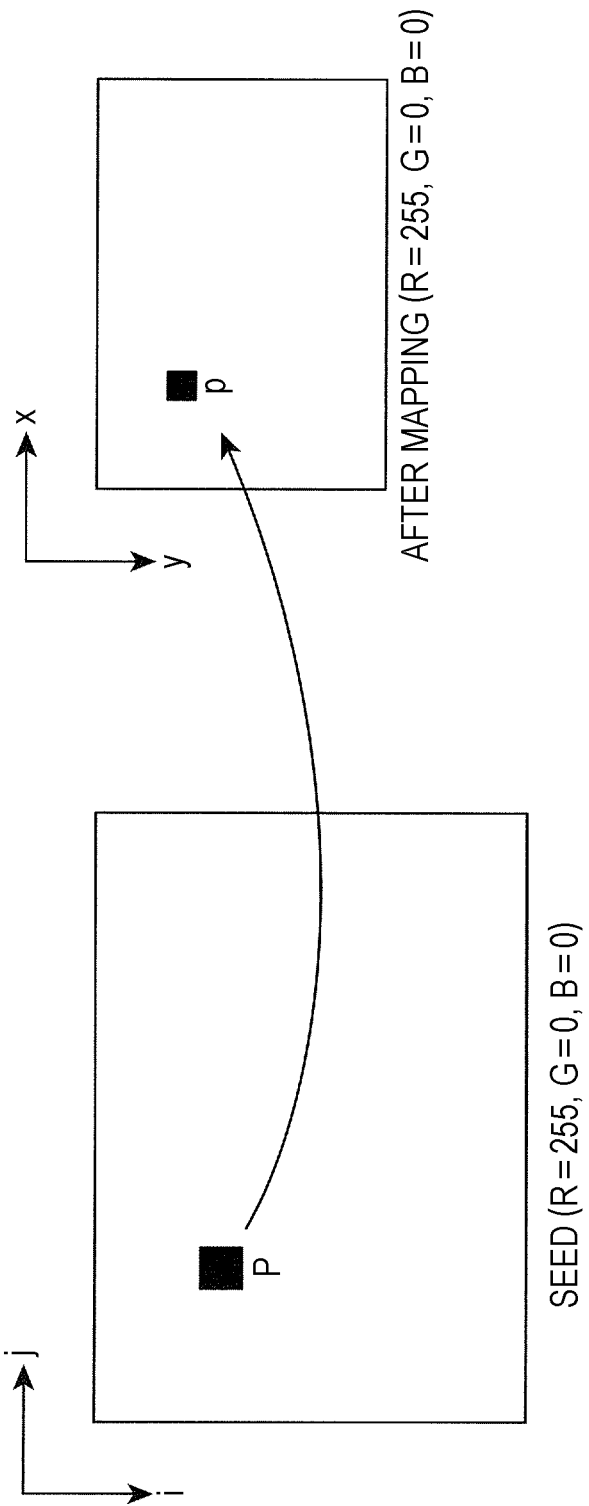

FIG. 40A
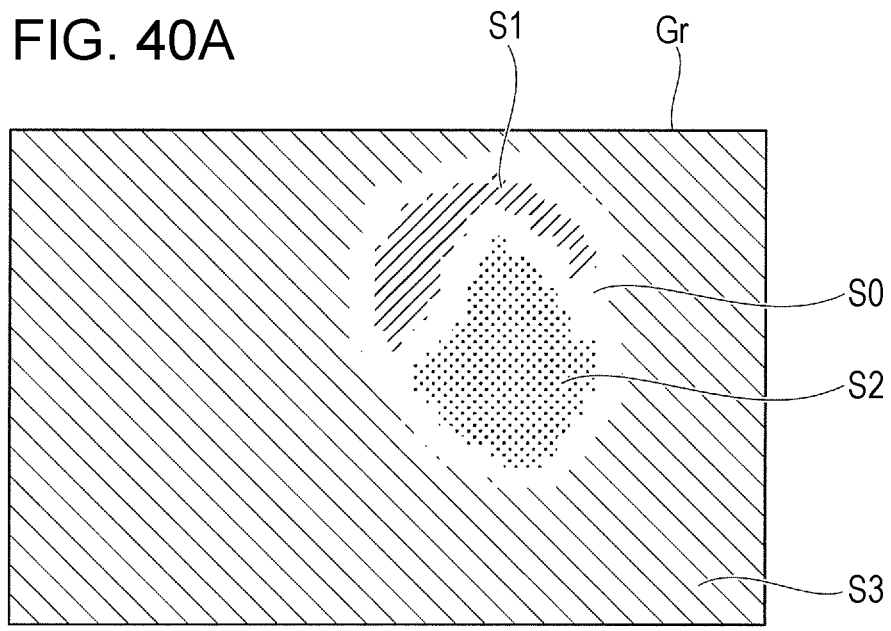
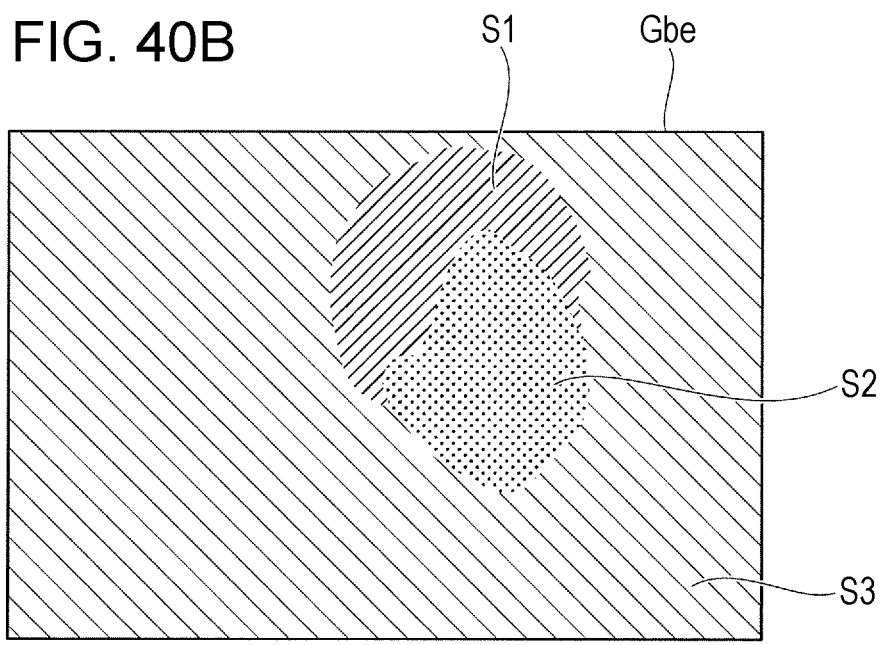
FIG. 40B

IMAGE PROCESSING APPARATUS, IMAGE PROCESSING METHOD, IMAGE PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-120622 filed Jun. 15, 2015.

BACKGROUND (i) Technical Field

The present invention relates to an image processing apparatus, an image processing method, an image processing system, and a non-transitory computer readable medium.

(ii) Related Art

In image processing, users segment designated regions that they designate as regions to be subjected to image processing.

SUMMARY

According to an aspect of the invention, there is provided an image processing apparatus including a position information obtaining unit and a region detection unit. The position information obtaining unit obtains position information indicating a representative position of one or more designated regions in an image. The region detection unit detects the one or more designated regions from the position information. The region detection unit cancels a setting of the one or more designated regions for pixels within a predetermined portion of the image, and detects the one or more designated regions again for the pixels within the predetermined portion, based on a reference pixel selected from among pixels on the image for which the setting of the one or more designated regions has not been canceled.

BRIEF DESCRIPTION OF THE DRAWINGS

Exemplary embodiments of the present invention will be described in detail based on the following figures, wherein:

FIG. 2 is a block diagram illustrating an example functional configuration of an image processing apparatus according to first, third, and fourth exemplary embodiments;

FIGS. 5A to 5C illustrate a process performed by a designated region enlargement unit;

FIGS. 7A and 7B illustrate comparison between before and after the reset of labels;

FIG. 12 is a block diagram illustrating an example functional configuration of a first region detection unit according to the first exemplary embodiment;

FIGS. 27A and 27B are conceptual diagrams illustrating retinex processing for enhancing the visibility of an original image;

FIG. 31 is an image which depicts nearest-neighbor mapping;

FIGS. 40A and 40B illustrate a process in which the second region detection unit detects designated regions again according to the third exemplary embodiment;

DETAILED DESCRIPTION

Exemplary embodiments of the present invention will be described in detail hereinafter with reference to the accompanying drawings.

Before providing the detailed description with reference to the drawings, a background for the present invention will now be discussed. Quality adjustment of color images is performed in different ways. For instance, the quality of an entire color image is adjusted and the quality of each region in the color image is adjusted. Color images are generally expressed in color components of a color space such as Red-Green-Blue (RGB), luminance and chromaticity components of L*a*b* or the like, or luminance, hue, and saturation components of Hue-Saturation-Value (HSV) or the like. Typical examples of image quality control include control of a histogram of color components, control of luminance contrast, control of a luminance histogram, control of the bandwidth of luminance, control of hue, and control of saturation. Further, recent attention has focused on control of image quality regarding visibility, such as retinex processing. Controlling image quality based on colors or the bandwidth of luminance, in particular, adjusting the image quality of only a specific region, involves a process for segmenting the specific region.

Recent widespread use of information and communication technology (ICT) devices has given rise to the extended range of image processing operations. Accordingly, there are various conceivable approaches as described above for image manipulation and image editing. The advantage of ICT devices, such as tablet terminals, is that they are intuitively operated through touch panels and the like, and such ICT devices feature the capabilities of image manipulation and image editing with enhanced user interactivity.

Furthermore, recent processes for image segmentation in diverse fields such as the design field and the medical field are often targeted at high-resolution images. For example, in the design field, high-resolution images are sometimes used for adjusting the color of a segmented region, changing the texture of a segmented region, and other operations. At other times, post-processing may require the printing of high-resolution images. In this case, applying masking to a high-resolution image (segmentation of regions) may be generally necessary.

In light of the situation described above, in exemplary embodiments disclosed herein, an image processing system 1 having the following configuration is used to segment a specific region and adjust image quality.

Description of Overall Image Processing System

Figure 1:
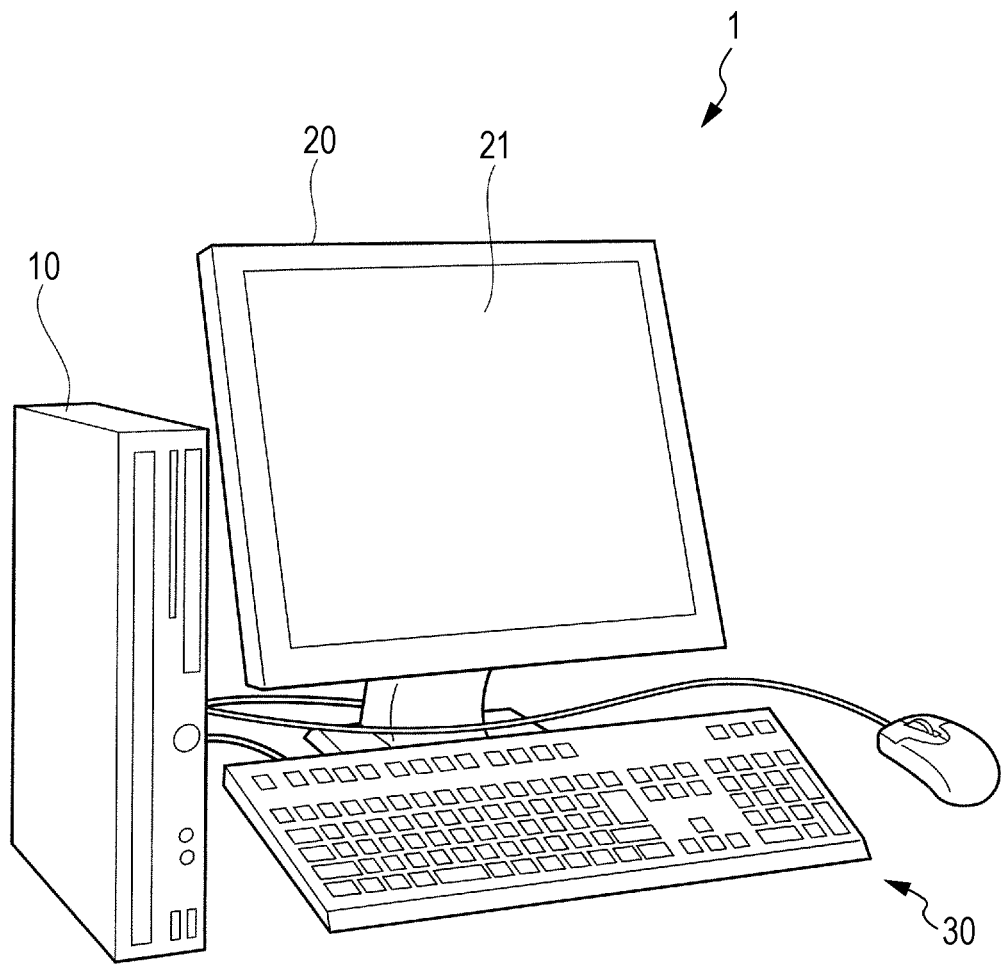
FIG. 1 illustrates an example configuration of an image processing system according to exemplary embodiments of the present invention.

FIG. 1 illustrates an example configuration of the image processing system 1 according to the exemplary embodiments.

As illustrated in FIG. 1, the image processing system 1 according to the exemplary embodiments includes an image processing apparatus 10, a display device 20, and an input device 30. The image processing apparatus 10 performs image processing on image information on an image displayed on the display device 20. The display device 20 receives image information created by the image processing apparatus 10, and displays an image based on the image information. The input device 30 is operated by a user to input various kinds of information to the image processing apparatus 10.

The image processing apparatus 10 is, for example, a general-purpose personal computer (PC). The image processing apparatus 10 causes various kinds of application software to operate under the management of an operating system (OS). Accordingly, operations, such as creating image information, are performed.

The display device 20 displays an image on a display screen 21. The display device 20 is implemented as a device having a function of displaying an image using additive color mixing, such as a PC liquid crystal display, a liquid crystal TV monitor, or a projector. Thus, the display method of the display device 20 is not limited to a liquid crystal method. In the example illustrated in FIG. 1, the display screen 21 is located on top of the display device 20. Alternatively, a projector may be used as the display device 20, for example. In this case, the display screen 21 may be a screen located remotely from the display device 20.

The input device 30 is constituted by a keyboard, a mouse, and any other suitable component. The input device 30 may be used to activate or deactivate application software for image processing, or may be used by a user to input instructions to the image processing apparatus 10 to perform image processing when the user is to perform image processing, which will be described in detail below.

The image processing apparatus 10 and the display device 20 are connected to each other via a digital visual interface (DVI). Any other method instead of DVI, such as HDMI (registered trademark) (High-Definition Multimedia Interface) or DisplayPort connection, may be used.

The image processing apparatus 10 and the input device 30 are connected to each other via, for example, Universal Serial Bus (USB). Any other method instead of USB, such as Institute of Electrical and Electronics Engineers (IEEE) 1394 or RS-232C connection, may be used.

In the image processing system 1 having the configuration described above, an original image which is an image before image processing is first displayed on the display device 20. When a user uses the input device 30 to input instructions to the image processing apparatus 10 to perform image processing, the image processing apparatus 10 performs image processing on image information on the original image. The result of the image processing is reflected in an image displayed on the display device 20, and the image subjected to the image processing is re-rendered and is displayed on the display device 20. This may enable the user to interactively perform image processing while viewing the image on the display device 20, resulting in more intuitive and easier operation of image processing.

Note that the configuration of the image processing system 1 according to the exemplary embodiments is not limited to that illustrated in FIG. 1. For example, a tablet terminal may be exemplified as the image processing system 1. The tablet terminal has a touch panel on which an image is displayed and through which a user inputs instructions. That is, the touch panel functions as the display device 20 and the input device 30. A touch monitor may also be used as an integrated device of the display device 20 and the input device 30. The touch monitor has a touch panel serving as the display screen 21 of the display device 20. In this case, image information is created by the image processing apparatus 10, and an image based on the image information is displayed on the touch monitor. By operating the touch monitor, such as touching the touch monitor, the user inputs instructions for performing image processing.

First Exemplary Embodiment

The image processing apparatus 10 will now be described. First, a description will be given of a first exemplary embodiment.

Description of Image Processing Apparatus

FIG. 2 is a block diagram illustrating an example functional configuration of an image processing apparatus 10 according to the first exemplary embodiment. In FIG. 2, functions related to this exemplary embodiment among a variety of functions of the image processing apparatus 10 are selectively illustrated.

As illustrated in FIG. 2, the image processing apparatus 10 according to this exemplary embodiment includes an image information obtaining unit 11, a user instruction acceptance unit 12, a first region detection unit 13, a designated region enlargement unit 14, a second region detection unit 15, a region switching unit 16, an image processing unit 17, and an image information output unit 18.

The image information obtaining unit 11 obtains image information on an image to be subjected to image processing. That is, the image information obtaining unit 11 obtains image information on the original image before image processing. The image information is represented by, for example, video data in RGB form (RGB data) for display on the display device 20.

In this exemplary embodiment, the image information obtaining unit 11 obtains image information on two images. One of the images is an image being used G' having a high resolution that the user wishes to actually perform image processing. In this exemplary embodiment, the image being used G' is finally segmented into designated regions. The other image is an image G having a lower resolution than the image being used G'. For example, the image G is a size-reduced version of the image being used G'. The low-resolution image G is displayed on the display device 20 in order for, for example, the user instruction acceptance unit 12, the region switching unit 16, and the image processing unit 17 to accept instructions given by the user, which will be described in detail below. The image G is further used in order for the first region detection unit 13 to segment designated regions.

The user instruction acceptance unit 12 is an example of a position information obtaining unit, and accepts instructions given by the user for image processing, which have been input through the input device 30.

Specifically, the user instruction acceptance unit 12 accepts, as user instruction information, instructions for specifying designated regions that the user designates as specific image regions in the image G displayed on the display device 20. The specific image regions are, by way of example, image regions on which the user performs image processing. In practice, in this exemplary embodiment, the user instruction acceptance unit 12 obtains, as user instruction information, position information indicating representative positions of the designated regions, which is input by the user.

As described in detail below, the user instruction acceptance unit 12 accepts, as user instruction information, instructions for selecting a designated region on which the user actually performs image processing from among the designated regions. The user instruction acceptance unit 12 further accepts, as user instruction information, instructions related to details of the image processing performed by the user on the selected designated region, such as a processing item and the amount of processing. The details will follow.

This exemplary embodiment adopts a user interactive method described below for specifying designated regions.

Figure 3A:
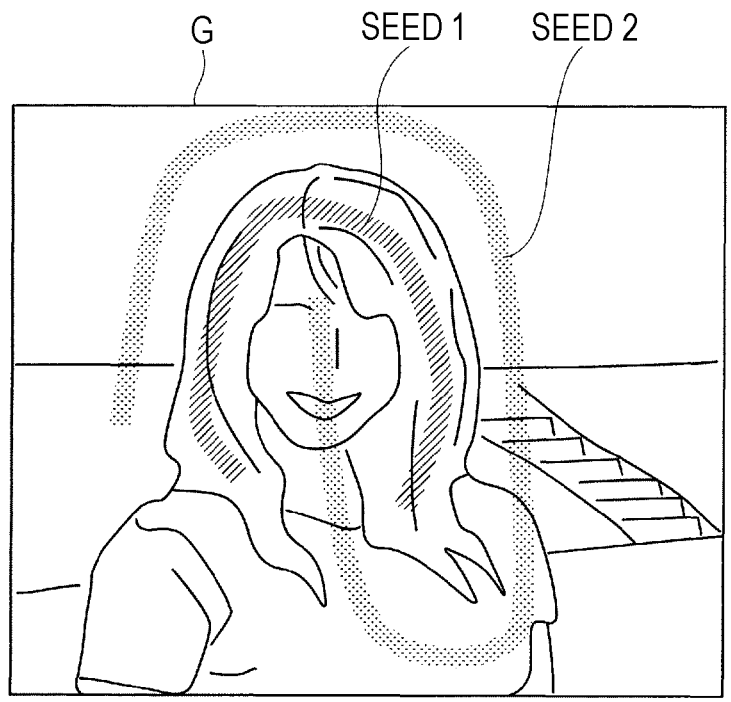
FIGS. 3A and 3B illustrate an example user interactive method for specifying designated regions.

FIG. 3A and to 3B illustrate an example user interactive method for specifying designated regions.

In FIG. 3A, an image displayed on the display screen 21 of the display device 20 is an image G of a photograph that shows a person in the foreground and a background behind the person. In FIG. 3A, furthermore, the user selects the hair portion of the person's head in the foreground and the non-hair portion as designated regions. That is, two designated regions are present. In the following, the designated region representing the hair portion may be referred to as the "first designated region", and the designated region representing the non-hair portion may be referred to as the "second designated region".

Figure 3B:
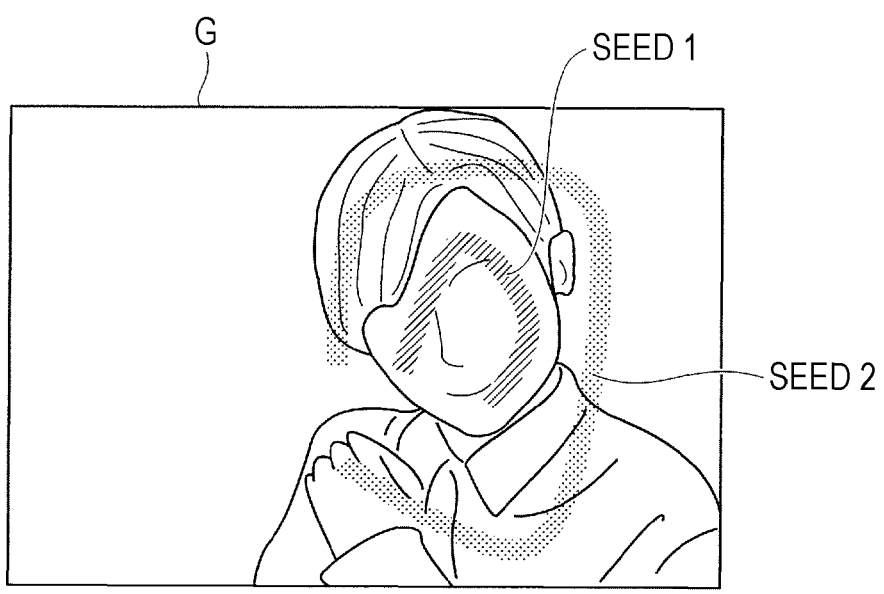

Also in FIG. 3B, an image displayed on the display screen 21 of the display device 20 is an image G of a photograph that shows a person in the foreground and a background behind the person. In FIG. 3B, furthermore, the user selects the face portion of the person in the foreground and the non-face portion as designated regions. That is, two designated regions are present. In the following, the designated region representing the face portion may be referred to as the "first designated region", and the designated region representing the non-face portion may be referred to as the "second designated region".

The user draws a representative path in each of the respective designated regions. The path may be input through the input device 30. Specifically, if the input device 30 is a mouse, the user operates the mouse and draws a path by dragging across the image G displayed on the display screen 21 of the display device 20. If the input device 30 is a touch panel, the user draws a path by moving around across the image G with their finger or any tool such as a touch pen by swiping. The user may draw a point instead of a path. It may be sufficient that the user give information indicating a position representative of each designated region such as the hair portion. In other words, the user may input position information indicating a representative position of a designated region. In the following, paths, points, or the like may be referred to as "seeds".

In the example illustrated in FIG. 3A, seeds are drawn in the hair portion and the non-hair portion. The seeds in the hair portion and the non-hair portion may be hereinafter referred to as the "seed 1" and the "seed 2", respectively. In the example illustrated in FIG. 3B, seeds are drawn in the face portion and the non-face portion. The seeds in the face portion and the non-face portion may be hereinafter referred to as the "seed 1" and the "seed 2", respectively.

The first region detection unit 13 detects designated regions in the image G displayed on the display device 20 in accordance with the user instruction information accepted by the user instruction acceptance unit 12. In practice, the first region detection unit 13 performs a process for segmenting designated regions from the image G displayed on the display device 20.

For the segmentation of a designated region based on information on a seed, first, the first region detection unit 13 assigns a label to pixels in a portion where the seed is drawn. In the example illustrated in FIG. 3A, the pixels corresponding to the path drawn in the hair portion (seed 1) are assigned "label 1", and the pixels corresponding to the path drawn in the non-hair portion (seed 2) are assigned "label 2".

In the example illustrated in FIG. 3B, the pixels corresponding to the path drawn in the face portion (seed 1) are assigned "label 1", and the pixels corresponding to the path drawn in the non-face portion (seed 2) are assigned "label 2". In this exemplary embodiment, assigning a label is referred to as "labeling".

Then, a pixel marked as a seed (hereinafter referred to as a "seed pixel") and a neighboring pixel of the seed pixel are combined or not in accordance with how close the pixel values of the seed pixel and the neighboring pixel are to each other. Specifically, as described in detail below, both pixels are combined if the pixel values are close to each other, and are not combined if the pixel values are far from each other. This operation is repeatedly performed to expand the region. Through the region growing method described above, designated regions are segmented.

Figure 4A:
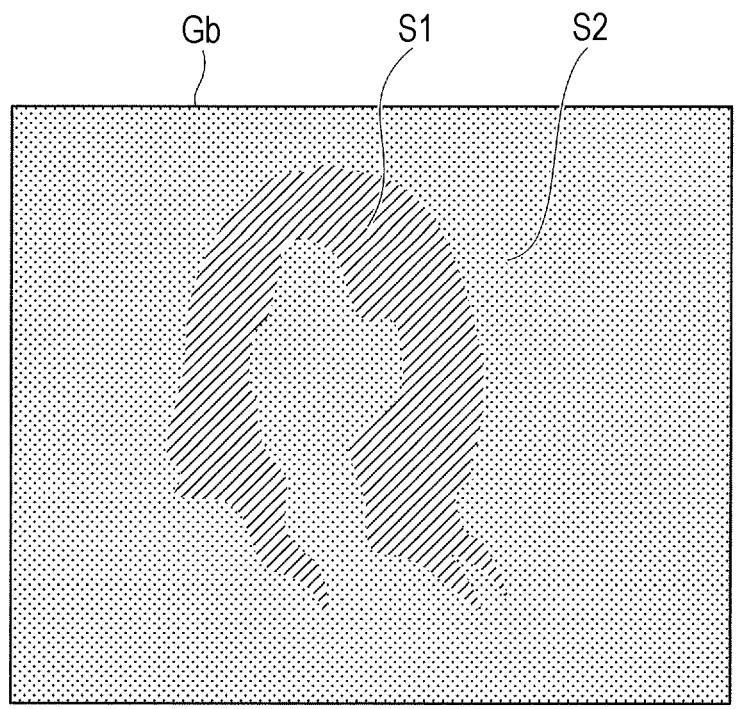
FIGS. 4A and 4B illustrate the designated regions segmented in images illustrated in FIGS. 3A and 3B, respectively, by using a region growing method.
Figure 4B:
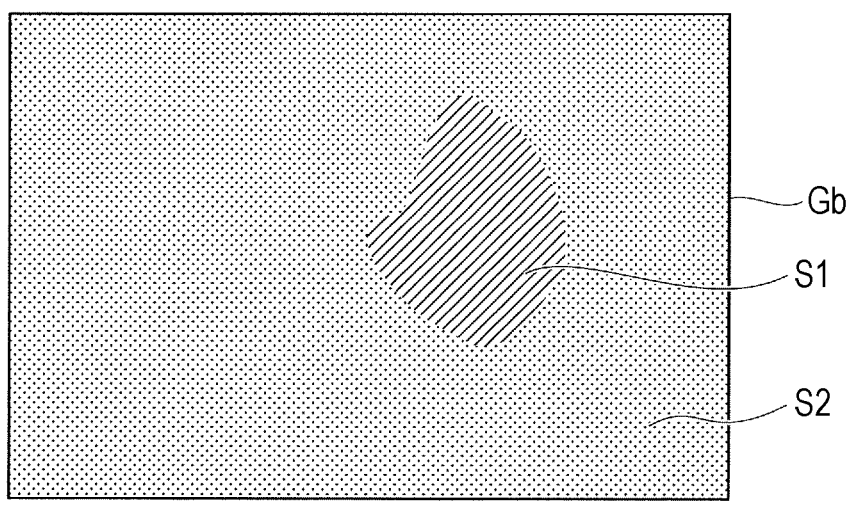

FIGS. 4A and 4B illustrate designated regions which have been segmented in the images G illustrated in FIGS. 3A and 3B, respectively, by using a region growing method.

In FIG. 4A, the "first designated region (S1)" and the "second designated region (S2)" have been segmented in the image G illustrated in FIG. 3A by using a region growing method.

In FIG. 4B, the "first designated region (S1)" and the "second designated region (S2)" have been segmented in the image G illustrated in FIG. 3B by using a region growing method.

In the following, each of the images illustrated in FIGS. 4A and 4B in which designated regions have been segmented may be referred to as a segmentation image Gb.

The method described above allows the user to more intuitively and more easily segment designated regions even if the designated regions have complex shapes. Here, designated regions are segmented in a low-resolution image G. In contrast, this exemplary embodiment may enable designated regions to be segmented in a high-resolution image being used G' through the following process.

The designated region enlargement unit 14 enlarges the designated regions detected by the first region detection unit 13.

FIGS. 5A to 5C illustrate a process performed by the designated region enlargement unit 14.

In FIGS. 5A to 5C, the designated regions illustrated in FIG. 4B are enlarged. Similarly to FIG. 4B, FIG. 5A illustrates the segmentation image Gb in which the "first designated region (S1)" and the "second designated region (S2)" have been segmented as designated regions.

FIG. 5B illustrates an enlarged segmentation image Gz obtained by enlarging the segmentation image Gb. The enlarged segmentation image Gz is constituted by enlarged designated regions. The designated region enlargement unit 14 enlarges the segmentation image Gb until the size of the segmentation image Gb becomes equal to that of the image being used G'. That is, the designated region enlargement unit 14 enlarges the segmentation image Gb in accordance with the size of the image being used G'.

As illustrated in FIG. 5B, the enlarged segmentation image Gz after enlargement has a size equal to the image being used G'. However, since the enlarged segmentation image Gz is produced merely by enlarging the low-resolution segmentation image Gb, there are noticeable jaggies, or ragged edges, at the boundary between the "first designated region (S1)" and the "second designated region (S2)".

FIG. 5C is an enlarged view of the boundary between the "first designated region (S1)" and the "second designated region (S2)". In FIG. 5C, the actual boundary of the two designated regions in the image being used G' is indicated by a solid line. As illustrated in FIG. 5C, the boundary between the "first designated region (S1)" and the "second designated region (S2)" is deviated from the actual boundary. Here, the enlarged segmentation image Gz is produced merely by enlarging the segmentation image Gb. However, such deviations will occur even with the use of any other higher precision enlargement method.

The second region detection unit 15 again detects designated regions in a boundary portion of the designated regions enlarged by the designated region enlargement unit 14. That is, the second region detection unit 15 again performs a process for detecting designated regions in the boundary portion between the "first designated region (S1)" and the "second designated region (S2)" illustrated in FIGS. 5B and 5C. This process is selectively performed on the boundary portion, but not on any other portion, using the high-resolution image being used G' so that the boundary between the "first designated region (S1)" and the "second designated region (S2)" matches the actual boundary. A specific process performed by the second region detection unit 15 will be described hereinafter.

First, the second region detection unit 15 resets labels in the boundary portion between the "first designated region (S1)" and the "second designated region (S2)" in the enlarged segmentation image Gz. That is, "label 1" assigned to the pixels included in the "first designated region (S1)" and "label 2" assigned to the pixels included in the "second designated region (S2)" are reset.

In this exemplary embodiment, the second region detection unit 15 applies a filter for resetting a label to a pixel assigned a label different from that of the adjacent pixels among the pixels of the enlarged segmentation image Gz.

Figure 6A:
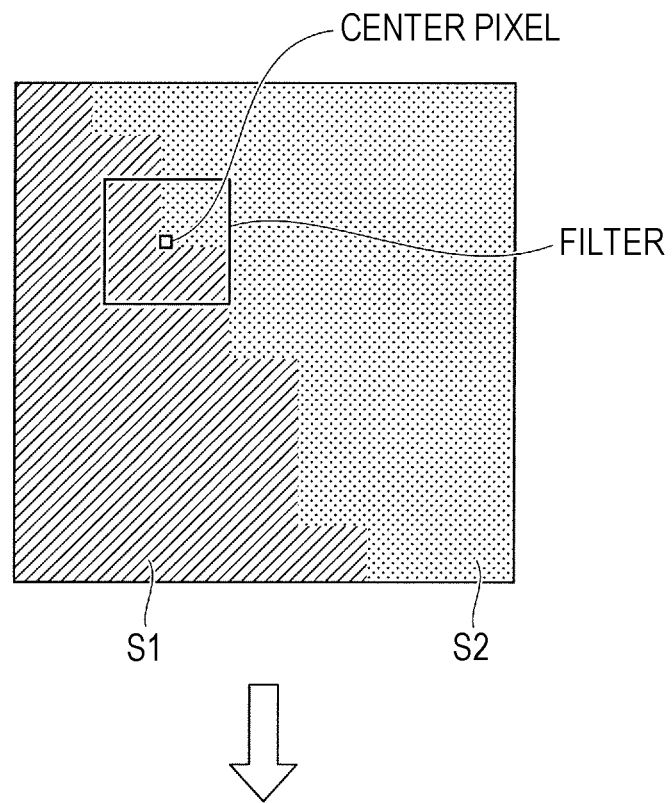
FIGS. 6A and 6B illustrate a process in which a second region detection unit resets labels.
Figure 6B:
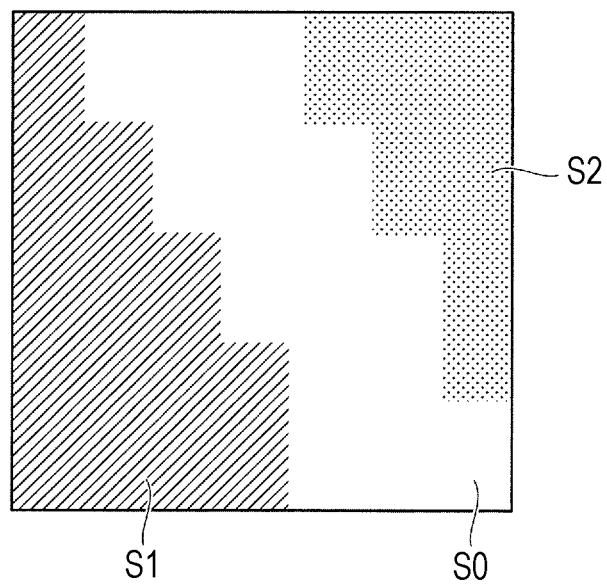

FIGS. 6A and 6B illustrate a process in which the second region detection unit 15 resets labels.

FIG. 6A illustrates a filter for resetting a label. The filter is set to be centered on a pixel assigned a label different from that of the adjacent pixels. In FIG. 6A, a filter set to be centered on a pixel represented by a center pixel is illustrated. The label assigned to the center pixel may be either "label 1" or "label 2". The size of the filter may be determined in accordance with the size of the image being used G'. For example, if the size of the image being used G' is ten times as large as the size of the image G, a filter of 10 pixels by 10 pixels may be used.

In FIG. 6B, labels have been reset using the filter described above. As illustrated in FIG. 6B, the labels in the boundary portion between the "first designated region (S1)" and the "second designated region (S2)" illustrated in FIG. 6A are reset. Here, a range for the boundary between the "first designated region (S1)" and the "second designated region (S2)" is represented by a region S0. Further, a label to which the labels are reset is represented by "label 0". In other words, the pixels in the region S0 are assigned "label 0".

FIGS. 7A and 7B illustrate comparison between before and after the reset of labels.

FIG. 7A illustrates an image before the reset of labels, which is the enlarged segmentation image Gz as illustrated in FIG. 5B. FIG. 7B illustrates an image after the reset of labels, which is represented by a label-reset image Gr. In the label-reset image Gr, as seen in FIG. 7B, the labels in the boundary portion between the "first designated region (S1)" and the "second designated region (S2)" are reset, resulting in the region S0 being obtained.

Then, the second region detection unit 15 detects designated regions again within the region S0. The second region detection unit 15 segments designated regions by using the region growing method described above in the description of the first region detection unit 13. While the first region detection unit 13 segments designated regions in the entire low-resolution image G, the second region detection unit 15 uses the image being used G' and selectively segments designated regions in the boundary portion, or in the region S0. That is, the labels assigned to the pixels included in the "first designated region (S1)" and the "second designated region (S2)" in FIG. 7B, which are pixels whose labels have not been reset, are fixed labels and are not changed from "label 1" or "label 2". In contrast, the pixels included in the region S0 and assigned "label 0" are reassigned "label 1" or "label 2" by the second region detection unit 15.

FIGS. 8A to 8E illustrate a process in which the second region detection unit 15 detects designated regions again within the region S0.

Figure 8A:
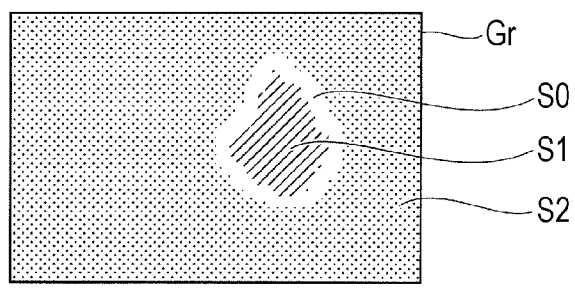
FIGS. 8A to 8E illustrate a process in which the second region detection unit detects designated regions again.
Figure 8B:
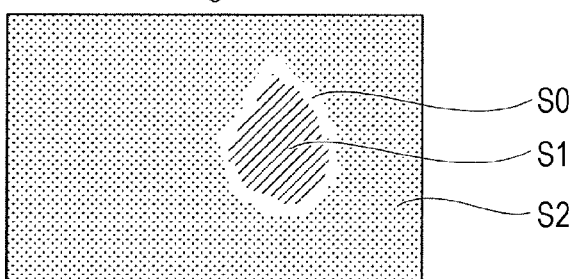
Figure 8C:
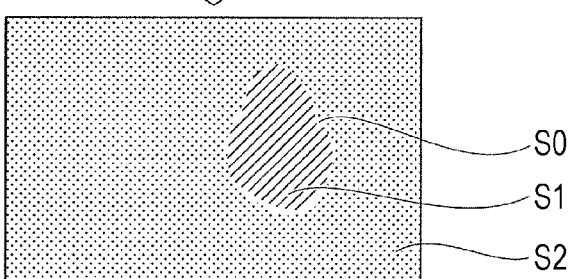
Figure 8D:
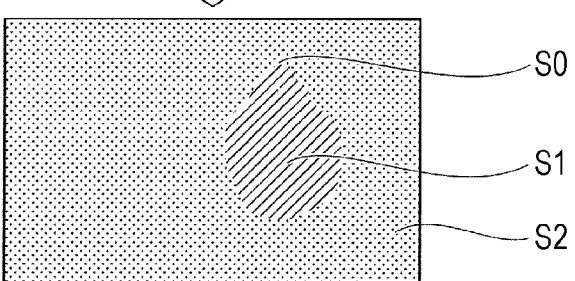
Figure 8E:
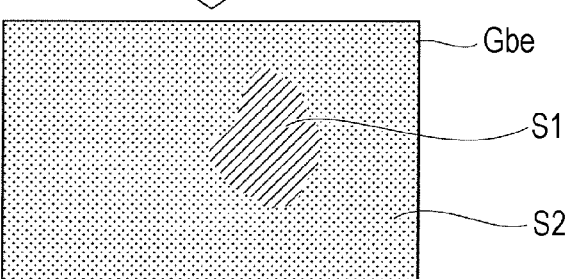

In FIGS. 8A to 8E, the detection of designated regions proceeds sequentially from top to bottom. Similarly to FIG. 7B, FIG. 8A illustrates the label-reset image Gr before the second region detection unit 15 detects designated regions. FIG. 8E illustrates a final segmentation image Gbe obtained after the second region detection unit 15 has detected designated regions. As seen in FIG. 8E, the region S0 is again segmented into the "first designated region (S1)" and the "second designated region (S2)", and the region S0 disappears. FIGS. 8B to 8D illustrate the progress of the process from the state illustrated in FIG. 8A to the state illustrated in FIG. 8E.

In the state illustrated in FIG. 8E, the boundary between the "first designated region (S1)" and the "second designated region (S2)" substantially matches the actual boundary illustrated in FIG. 5C, and the jaggies illustrated in FIGS. 5B and 5C do not substantially occur, resulting in the boundary being made more smooth.

In the manner described above, the second region detection unit 15 applies a filter for canceling the setting of designated regions so that the filter is centered on a pixel in the boundary of designated regions enlarged by the designated region enlargement unit 14, and detects designated regions again for the pixels for which the setting of the designated regions has been canceled.

Referring back to FIG. 2, the region switching unit 16 switches between plural designated regions. That is, if plural designated regions are present, the user selects a designated region on which the user wishes to perform image adjustment, and the region switching unit 16 switches the designated region accordingly.

Figure 9A:
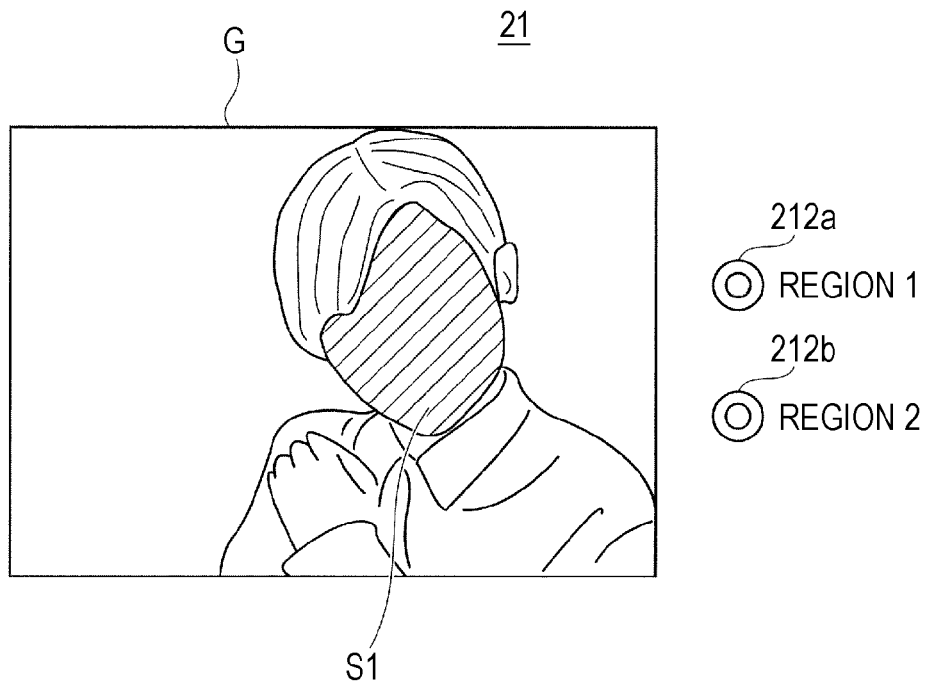
FIGS. 9A and 9B illustrate an example screen displayed on a display screen of a display device when the user selects a designated region.
Figure 9B:
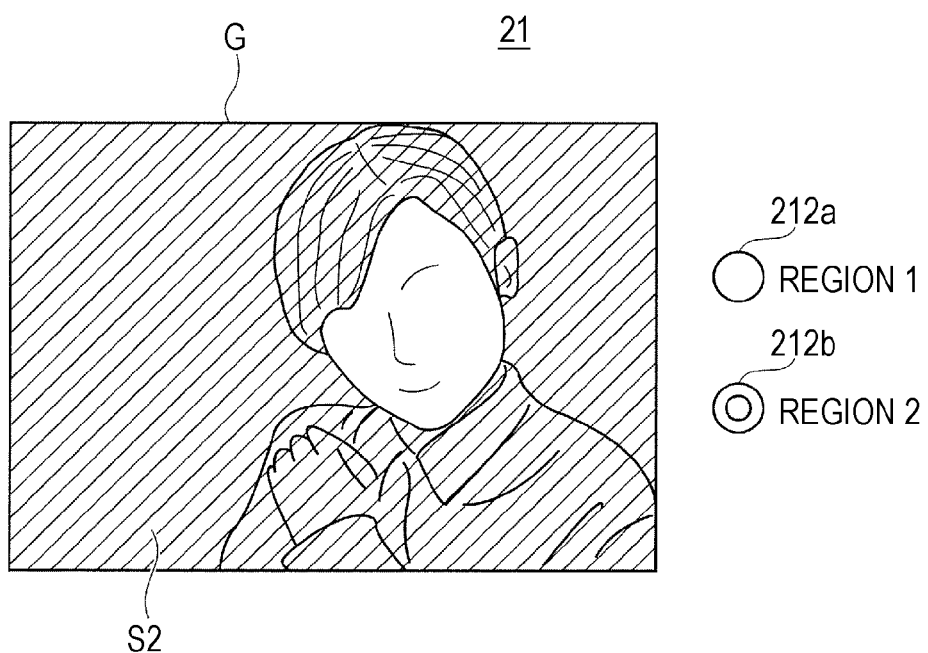

FIGS. 9A and 9B illustrate an example screen displayed on the display screen 21 of the display device 20 when the user selects a designated region.

In the example illustrated in FIGS. 9A and 9B, an image G in which a designated region has been selected is displayed in the left part of the display screen 21, and radio buttons 212a and 212b used to select either "region 1" or "region 2" are displayed in the right part of the display screen 21. The "region 1" corresponds to the "first designated region (S1)", and the "region 2" corresponds to the "second designated region (S2)". When the user selects the radio button 212a or 212b by using the input device 30, the designated regions are switched.

In FIG. 9A, the radio button 212a is selected and the "first designated region (S1)", which is an image region of the face portion, is selected as a designated region. When the user selects the radio button 212b, as illustrated in FIG. 9B, the designated region is switched to the "second designated region (S2)", which is an image region of the non-face portion.

In practice, the result of the operation described above with reference to FIGS. 9A and 9B is obtained by the user instruction acceptance unit 12 as user instruction information, and designated regions are switched by the region switching unit 16.

The image processing unit 17 actually performs image processing on the selected designated region.

Figure 10:
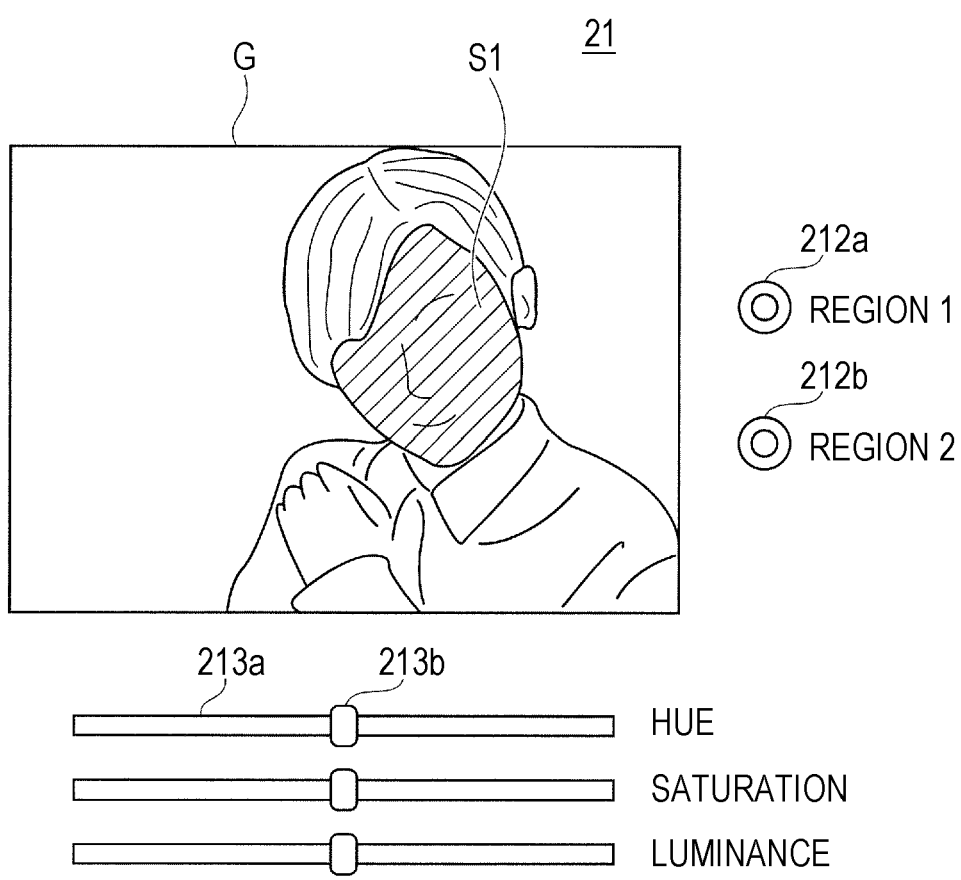
FIG. 10 illustrates an example screen displayed on the display screen of the display device when image processing is to be performed.

FIG. 10 illustrates an example screen displayed on the display screen 21 of the display device 20 when image processing is to be performed.

Here, the selected designated region is adjusted in terms of hue, saturation, and luminance, by way of example. In the illustrated example, an image G in which a designated region has been selected is displayed in the upper left part of the display screen 21, and the radio buttons 212a and 212b used to select either the "region 1" or the "region 2" are displayed in the upper right part of the display screen 21. In the illustrated example, the radio button 212a is selected and the "first designated region (S1)", which is an image region of the face portion, is selected as a designated region. The radio buttons 212a and 212b are operated to enable switching between designated regions in a way similar to that illustrated in FIGS. 9A and 9B.

In the lower part of the display screen 21, slide bars 213a and sliders 213b are further displayed. The slide bars 213a are used for the adjustment of "hue", "saturation", and "luminance". Each of the sliders 213b is configured to slidably move right and left along the corresponding one of the slide bars 213a in accordance with an operation of the input device 30. The sliders 213b are located at the center of the slide bars 213a in the initial state, and the sliders 213b, when located at the center of the slide bars 213a, indicate the state before the adjustment of "hue", "saturation", and "luminance".

When the user uses the input device 30 and slides any one of the sliders 213b for "hue", "saturation", and "luminance" right and left in FIG. 10 along the corresponding one of the slide bars 213a, image processing is performed on the selected designated region, and the image G displayed on the display screen 21 also changes accordingly. When the user slides one of the sliders 213b to the right in FIG. 10, image processing for increasing the corresponding one of "hue", "saturation", and "luminance" is performed. When the user slides one of the sliders 213b to the left in FIG. 10, image processing for reducing the corresponding one of "hue", "saturation", and "luminance" is performed.

Referring back to FIG. 2, the image information output unit 18 outputs image information which has been subjected to the image processing in the way described above. The image information which has been subjected to the image processing is sent to the display device 20. Then, an image G based on the image information is displayed on the display device 20. Note that the image G displayed on the display device 20 is used to present the result of the image processing to the user, while image processing is actually performed on the higher-resolution image being used G' by the region switching unit 16 and the image processing unit 17. The image information on the image G may be created by, for example, reducing the size of the image being used G'.

Description of First Region Detection Unit and Second Region Detection Unit

Next, a method by which the first region detection unit 13 and the second region detection unit 15 segment designated regions by using a region growing method will be described in more detail.

First, a description will be given of a region growing method of the related art.

Figure 11A:
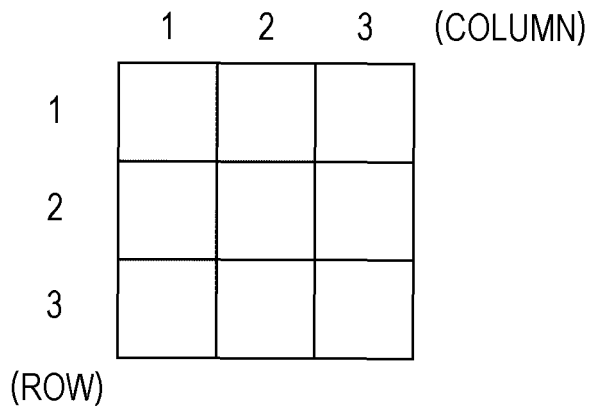
FIGS. 11A to 11C illustrate a region growing method of the related art.
Figure 11B:
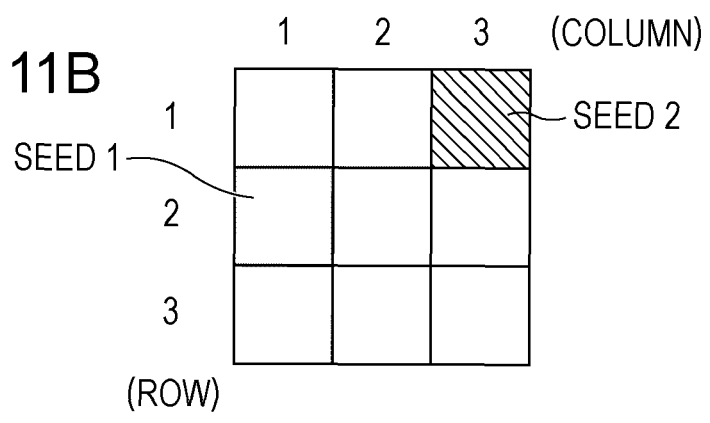
Figure 11C:
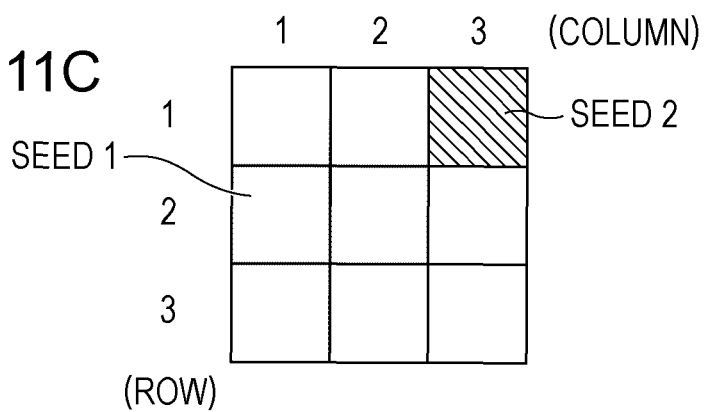

FIGS. 11A to 11C illustrate a region growing method of the related art.

FIG. 11A illustrates an original image made up of a region of 3 pixels vertically and 3 pixels horizontally, that is, 9 pixels (3×3=9). The original image is constituted by two image regions. In FIG. 11A, the two image regions are represented using pixels with different intensities of a color. It is assumed that the pixels included in each image region have pixel values that are close to each other.

As illustrated in FIG. 11B, the pixel at the second row and first column is assigned seed 1, and the pixel at the first row and third column is assigned seed 2.

Now, consideration is given to whether the pixel at the second row and second column, which is the pixel (hereinafter referred to as the "center pixel") at the center of the image, belongs to a designated region including the pixel assigned seed 1 or a designated region including the pixel assigned seed 2. Here, a comparison is made between the pixel value of the center pixel and the pixel value of a seed pixel included in the eight neighboring pixels of the center pixel. If both pixel values are close to each other, it is determined that the center pixel is included in the designated region including the seed pixel. In the illustrated example, two seed pixels, namely, the pixel assigned seed 1 and the pixel assigned seed 2, are included in the eight neighboring pixels. Since the pixel value of the center pixel is closer to the pixel value of the pixel assigned seed 1 than to the pixel value of the pixel assigned seed 2, it is judged that the center pixel belongs to the designated region including the pixel assigned seed 1.

Then, as illustrated in FIG. 11C, the center pixel belongs to the region including the pixel assigned seed 1. The center pixel is now handled as a new seed. In this case, the center pixel is labeled with "label 1", which is the same as the label of the pixel assigned seed 1.

In the region growing method of the related art, a pixel adjacent to a seed pixel is selected as a target pixel (in the example described above, the center pixel) to be judged to be or not to be in the corresponding designated region, and the pixel value of the target pixel is compared with the pixel value of a seed pixel included in the eight neighboring pixels of the target pixel. The target pixel is considered to belong to a region including a seed pixel whose pixel value is close to the pixel value of the target pixel, and is labeled. The operation described above is repeatedly performed to expand the region.

Typical examples of the region growing method of the related art include a Grow-Cut method described in the following article: V. Vezhnevets and V. Konouchine: "Grow-Cut"-Interactive Multi-label N-D Image Segmentation", Proc. Graphicon. pp 150-156 (2005).

In the region growing method of the related art, as described above, a target pixel is focused on, and the pixel value of the target pixel is compared with the pixel value of a seed pixel among the eight neighboring pixels of the target pixel to determine a designated region to which the target pixel belongs. That is, the region growing method of the related art is a so-called "passive type" method in which the target pixel changes upon being influenced by the eight neighboring pixels.

However, the region growing method of the related art involves the selection of pixels one by one as a target pixel and the labeling of the pixels, resulting in the processing speed being likely to slow down. Another issue is that segmentation accuracy is likely to be reduced at, for example, a portion including a complicated region.

In this exemplary embodiment, accordingly, the first region detection unit 13 and the second region detection unit 15 have the following configuration to address the foregoing issues. Since the first region detection unit 13 and the second region detection unit 15 have similar configurations, the first region detection unit 13 will be described, by way of example.

FIG. 12 is a block diagram illustrating an example functional configuration of the first region detection unit 13 according to this exemplary embodiment.

As illustrated in FIG. 12, the first region detection unit 13 according to this exemplary embodiment includes a pixel selection unit 131, a range setting unit 132, a judgment unit 133, a characteristic changing unit 134, and a convergence judgment unit 135.

In the following, the first region detection unit 13 illustrated in FIG. 12 will be described using first to fourth examples.

First Example (In the Case of "Active Type" and "Synchronous Type")

First, a description will be given of a first example of the first region detection unit 13.

In the first example, the pixel selection unit 131 selects a reference pixel. The reference pixel is selected from among pixels belonging to a designated region. The term "pixels belonging to a designated region" refers to pixels included in, for example, a representative position specified by a user, that is, seed pixels described above. The term "pixels belonging to a designated region" is used to also include pixels which are newly labeled by using a region growing method.

Here, the pixel selection unit 131 selects one pixel as a reference pixel from among pixels belonging to a designated region.

Figure 13A:
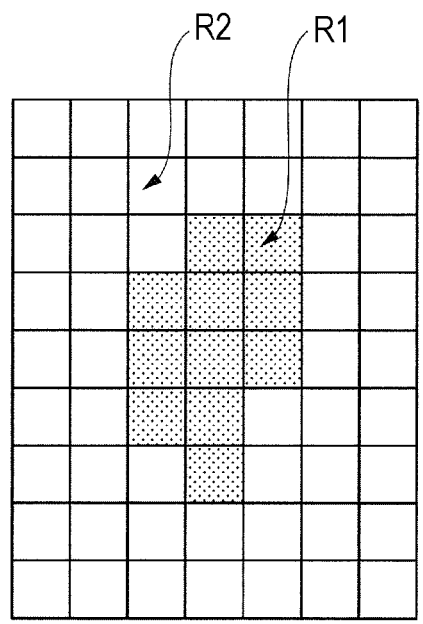
FIG. 13A illustrates an original image in which designated regions are to be segmented.

FIG. 13A illustrates an original image in which designated regions are to be segmented. As illustrated in FIG. 13A, the original image is made up of a region of 9 pixels vertically and 7 pixels horizontally, that is, 63 pixels (9×7=63). As illustrated in FIG. 13A, the original image includes an image region R1 and an image region R2. The pixels included in the image region R1 have pixel values that are close to each other, and the pixels included in the image region R2 have pixel values that are close to each other. As described below, the image region R1 and the image region R2 are segmented as designated regions.

Figure 13B:
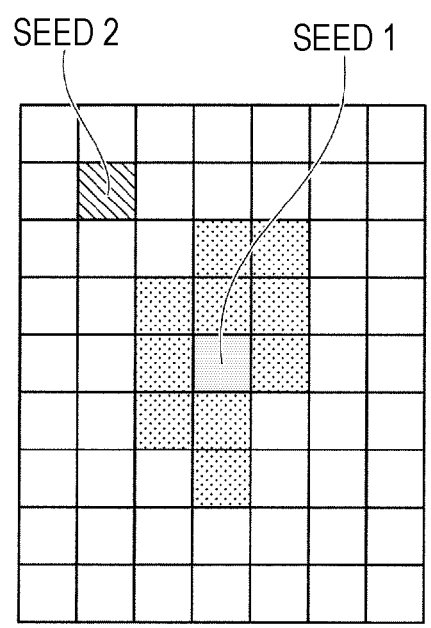
FIG. 13B illustrates reference pixels.

For simplicity of illustration, as illustrated in FIG. 13B, the user designates two representative positions each in one of the image region R1 and the image region R2. Each of the representative positions is specified by a single pixel, and is selected as a reference pixel by the pixel selection unit 131. In FIG. 13B, the reference pixels are represented by seed 1 and seed 2.

Each of the pixels with seed 1 and seed 2 is labeled and has a strength, which will be described in detail below. Here, the pixels with seed 1 and seed 2 are labeled with label 1 and label 2, respectively, and have strengths which are both set to 1 as the initial value.

The range setting unit 132 sets a first range. The first range is set for a reference pixel, and covers a target pixel (first target pixel) to be determined to be or not to be in a designated region to which the reference pixel belongs.

Figure 14:
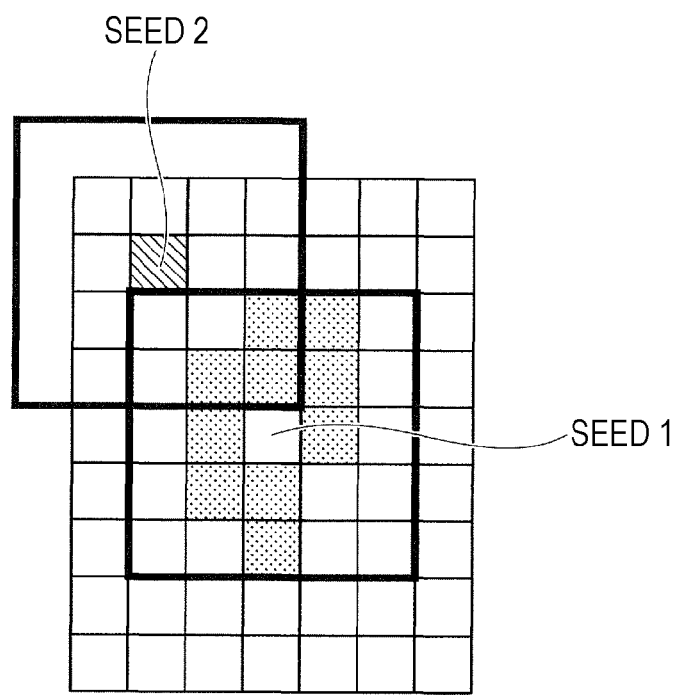
FIG. 14 illustrates a first range.

FIG. 14 illustrates the first range.

As illustrated in FIG. 14, the pixels with seed 1 and seed 2, which are reference pixels, are selected in the image region R1 and the image region R2, respectively. In addition, ranges of 5 pixels vertically and 5 pixels horizontally centered respectively on the pixels with seed 1 and seed 2 are set as first ranges. In FIG. 14, the first ranges are displayed as ranges defined by thick-line frames.

In this exemplary embodiment, the first ranges are variable, and may be reduced in accordance with the progress of the process, which will be described in detail below.

The judgment unit 133 is an example of a determination unit, and determines to which designated region a target pixel (first target pixel) within a first range belongs.

The judgment unit 133 sets each of the 24 pixels, except for the pixels with seed 1 or seed 2, among the 25 pixels included in the first range as a target pixel (first target pixel) to be judged to be or not to be in the corresponding designated region. Then, the judgment unit 133 judges whether each of the target pixels is included in the designated region (first designated region) to which the pixel with seed 1 belongs or the designated region (second designated region) to which the pixel with seed 2 belongs.

In this case, the judgment may be based on the degree of closeness of pixel values.

Specifically, the 24 pixels included in the first range are assigned numbers, for convenience, and, assuming the i-th (where i is an integer from 1 to 24) target pixel is represented by $P_i$, the color data of the pixel $P_i$ may be represented by $P_i=(R_i, G_i, B_i)$ if the color data is RGB data. Also, assuming that the reference pixel with seed 1 or seed 2 is represented by $P_0$, the color data of the reference pixel $P_0$ may be represented by $P_0=(R_0, G_0, B_0)$. To measure the degree of closeness of pixel values, the Euclidean distance $d_i$ between the RGB values, which is given by the following equation, is considered.

$$d_i=\sqrt{(R_i-R_o)^2+(G_i-G_o)^2+(B_i-B_o)^2} \quad (1)$$

If the Euclidean distance $d_i$ is less than or equal to a predetermined threshold value, the judgment unit 133 judges that the target pixel belongs to the first designated region or the second designated region. That is, if the Euclidean distance $d_i$ is less than or equal to the predetermined threshold value, the pixel value of the reference pixel $P_0$ and the pixel value of the target pixel $P_i$ are considered to be close to each other. In this case, the judgment unit 133 determines that the reference pixel $P_0$ and the target pixel $P_i$ belong to the same designated region.

In some cases, the Euclidean distances $d_i$ for both the pixels with seed 1 and seed 2 may be less than or equal to the threshold value. In such cases, the judgment unit 133 determines that the target pixel belongs to the designated region to which one of the pixels with seed 1 and seed 2 for which the Euclidean distance $d_i$ is smaller belongs.

Figure 15:
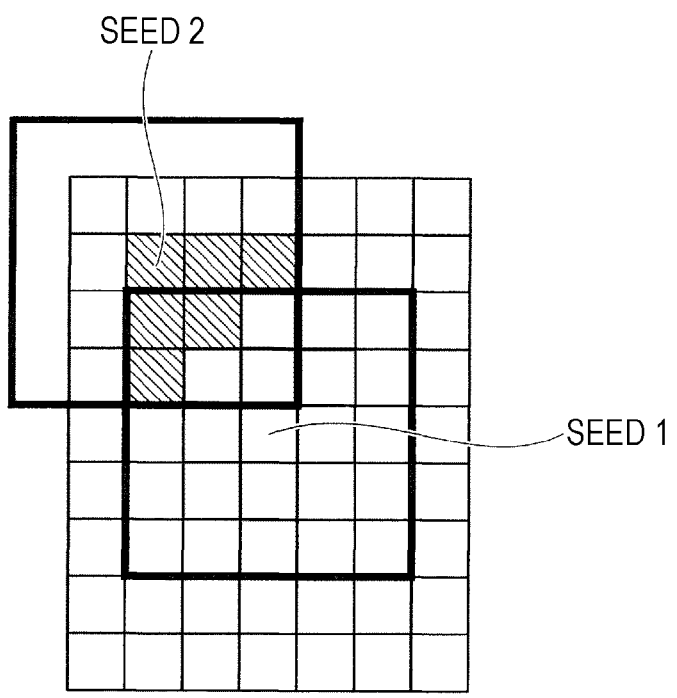
FIG. 15 illustrates a result of judgment based on a Euclidean distance for a target pixel within the first range illustrated in FIG. 14.

FIG. 15 illustrates a result of judgment based on the Euclidean distance $d_i$ for a target pixel within the first range illustrated in FIG. 14.

In FIG. 15, pixels in black, which is the same color as that of the pixel with seed 1, are judged to belong to the designated region 1, and pixels with (diagonal) hatching, which is the same as that of the pixel with seed 2, are judged to belong to the designated region 2. Pixels in white are judged to belong to none of the designated regions 1 and 2.

Operating the judgment unit 133 in the way described above provides an effect of allowing a given seed to be automatically spread out. In this exemplary embodiment, for example, the judgment unit 133 may perform the operation described above only for the first time. Alternatively, the judgment unit 133 may perform the operation described above for the first several times. In this case, for the subsequent times, the judgment unit 133 may make a judgment using the "strength" described below. Note that the judgment unit 133 may make a judgment using the "strength" described below from the first time.

In the example described above, the description has been made in the context of the color data being RGB data. This is not intended to be limiting, and color data in any other color space, such as L*a*b* data, YCbCr data, HSV data, or Image Processing Toolbox (IPT) data, may be used. Not all the color components may be used. For example, when HSV data is used as color data, only the H and S values may be used.

In some cases, color data in any other color space may be used to address the failure of segmentation of designated regions. For example, consideration is given to the use of a Euclidean distance $d_i^w$ that uses YCbCr values, which is given in equation (2) below, instead of the Euclidean distance $d_i$ of the RGB values given by equation (1). Equation (2) provides the Euclidean distance $d_i^w$ when the color data of the target pixel is represented by $P_i=(Y_i, Cb_i, Cr_i)$ and the color data of the reference pixel is represented by $P_0=(Y_0, Cb_0, Cr_0)$. Further, the Euclidean distance $d_i^w$ given by equation (2) is a weighted Euclidean distance using weighting factors $W_Y$, $W_{Cb}$, and $W_{Cr}$. Equation (2) is effective when, for example, the difference in luminance between designated regions is large but the difference in chromaticity is small. That is, the weighting factor $W_Y$ is reduced to reduce the contribution of the luminance component Y to the Euclidean distance $d_i^w$. This results in a relative increase in the contribution of the chromaticity component to the Euclidean distance $d_i^w$. As a result, the accuracy of segmentation of designated regions between which the difference in luminance is large but the difference in chromaticity is small may be improved.

$$d_i^w=\sqrt{w_Y(Y_i-Y_o)^2+w_{Cb}(Cb_i-Cb_o)^2+w_{Cr}(Cr_i-Cr_o)^2} \quad (2)$$

The color data to be used is not limited to color data having three components. For example, n-dimensional color space may be used and a Euclidean distance $d_i^w$ of n color components may be considered.

For example, equation (3) uses color components $X_1$, $X_2$, ..., and $X_n$. Equation (3) provides a Euclidean distance $d_i^w$ when the color data of the target pixel is represented by $P_i=(X_{1i}, X_{2i}, \ldots, X_{ni})$ and the color data of the reference pixel is represented by $P_0=(X_{10}, X_{20}, \ldots, X_{n0})$. The Euclidean distance $d_i^w$ given by equation (3) is also a weighted Euclidean distance using weighting factors $W_{X1}$, $W_{X2}$, ... and $W_{Xn}$. In this case, the weighting factor for a color component which well exhibits the characteristics of a designated region among the n color components is made relatively larger than the other weighting factors, enabling an improvement in the accuracy of segmentation of designated regions.

$$d_i^w = \frac{}{\sqrt{w_{X1}(X_{1i}-X_{1o})^2 + w_{X2}(X_{2i}-X_{2o})^2 + \ldots + w_{Xn}(X_{ni}-X_{no})^2}} \quad (3)$$

The characteristic changing unit 134 changes the characteristics given to the target pixel (first target pixel) within the first range.

The term "characteristics", as used herein, refers to the label and strength given to the target pixel.

The label indicates, as described above, to which designated region the target pixel belongs, and a pixel belonging to the designated region 1 is assigned "label 1" while a pixel belonging to the designated region 2 is assigned "label 2". Since the pixel with seed 1 has label 1 and the pixel with seed 2 has label 2, a pixel determined by the judgment unit 133 to belong to the designated region 1 (in FIG. 15, a pixel in black) is labeled with label 1. A pixel determined by the judgment unit 133 to belong to the designated region 2 (in FIG. 15, a pixel with (diagonal) hatching) is labeled with label 2.

The strength is a strength of a pixel belonging to the designated region corresponding to the label assigned thereto, and indicates how likely it is that a certain pixel may belong to the designated region corresponding to the label assigned thereto. The higher the strength, the more likely it is that the pixel may belong to the designated region corresponding to the label. The lower the strength, the less likely it is that the pixel may belong to the designated region corresponding to the label. The strength is determined in the following way.

First, the strength of a pixel included in a representative position specified by the user for the first time is set to 1 as the initial value. That is, a pixel with seed 1 or seed 2 before region growing has a strength of 1. An unlabeled pixel has a strength of 0.

Consideration is now given to the level of influence of a pixel given a strength on neighboring pixels.

Figure 16A:
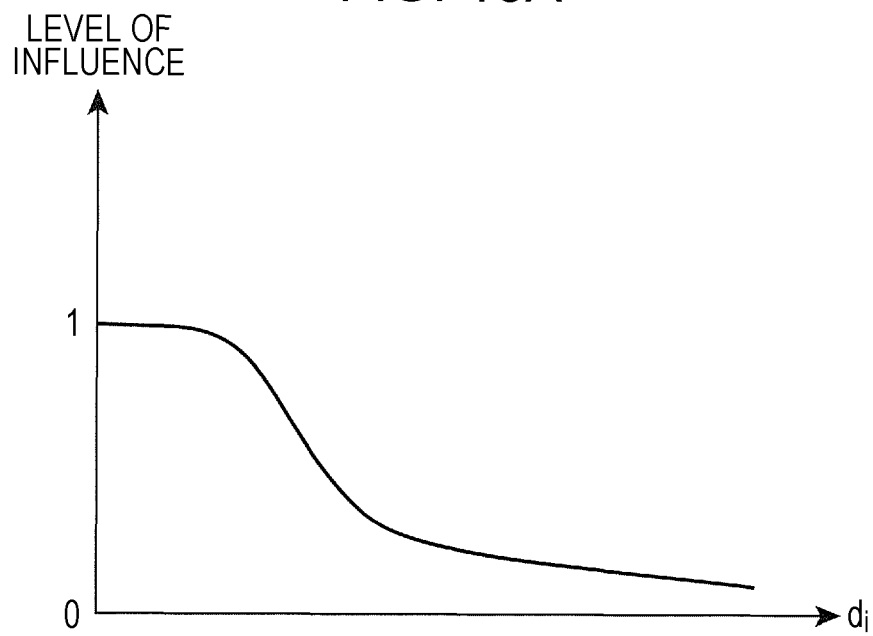
FIGS. 16A and 16B illustrate a method for determining a level of influence.
Figure 16B:
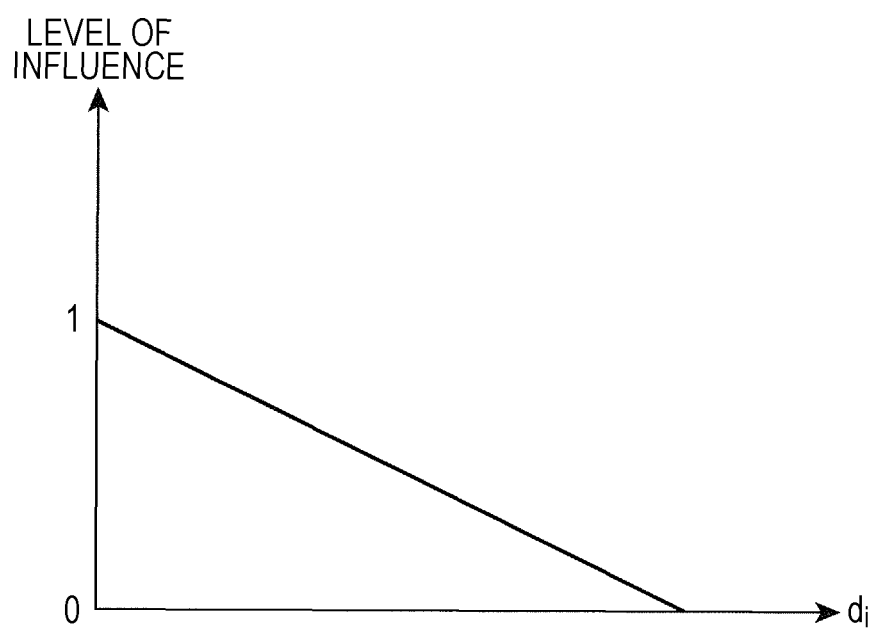

FIGS. 16A and 16B illustrate a method for determining a level of influence. In FIGS. 16A and 16B, the horizontal axis represents the Euclidean distance $d_i$ and the vertical axis represents the level of influence.

The Euclidean distance $d_i$ is a Euclidean distance $d_i$ between the pixel value of a pixel given a strength and the pixel value of a neighboring pixel of the pixel. For example, as illustrated in FIG. 16A, a non-linear monotonically decreasing function is defined, and a value determined by the monotonically decreasing function with respect to a Euclidean distance $d_i$ is defined as a level of influence.

That is, the smaller the Euclidean distance $d_i$, the higher the level of influence, and the larger the Euclidean distance $d_i$, the lower the level of influence.

The monotonically decreasing function is not limited to that illustrated in FIG. 16A, and a monotonically decreasing function with any shape may be used. Thus, a linear monotonically decreasing function illustrated in FIG. 16B may be used. Alternatively, a piecewise-linear monotonically decreasing function with a linear partition within a specific range of Euclidean distances $d_i$ and a non-linear partition within the other range may be used.

The strength of a pixel judged to belong to a designated region is obtained by multiplying the strength of the reference pixel by a level of influence. For example, a reference pixel has a strength of 1 and the level of influence of the reference pixel on a target pixel adjacent left to the reference pixel is 0.9. In this case, the strength given to the target pixel is given by 1×0.9=0.9 when the target pixel is judged to belong to the corresponding designated region. For example, a reference pixel has a strength of 1 and the level of influence of the reference pixel on a target pixel which is two pixels adjacent left to the reference pixel is 0.8. In this case, the strength given to the target pixel is given by 1×0.8=0.8 when target pixel is judged to belong to the corresponding designated region.

Using the computation method described above, the judgment unit 133 may make a judgment using the strength given to the target pixel (first target pixel) within the first range. If the target pixel has no label, the judgment unit 133 judges that the target pixel is included in the designated region to which the reference pixel belongs. If the target pixel has a label for a different designated region, the judgment unit 133 judges that the target pixel is included in the designated region to which the reference pixel having a higher strength belongs. In the former case, the same label as that of the reference pixel is assigned. In the latter case, the same label as that of the reference pixel having a higher strength among the characteristics is assigned. In this method, a pixel once labeled with a certain label may have the label changed to another label.

For instance, the target pixel (first target pixel) has been labeled with a certain label. If a reference pixel assigned a different label has a strength $u_i$ and a level of influence $w_{ij}$, a strength $u_j$ exerted on the target pixel (first target pixel) is given by $u_j=w_{ij}u_i$. Then, the current strength of the target pixel (first target pixel) is compared with the strength $u_j$. If the strength $u_j$ is higher than the strength of the target pixel (first target pixel), the target pixel (first target pixel) has the label changed to the different label. If the strength $u_j$ is equal to or lower than the strength of the target pixel (first target pixel), the target pixel (first target pixel) does not have the label changed to the different label so that the current label is maintained.

Figure 17:
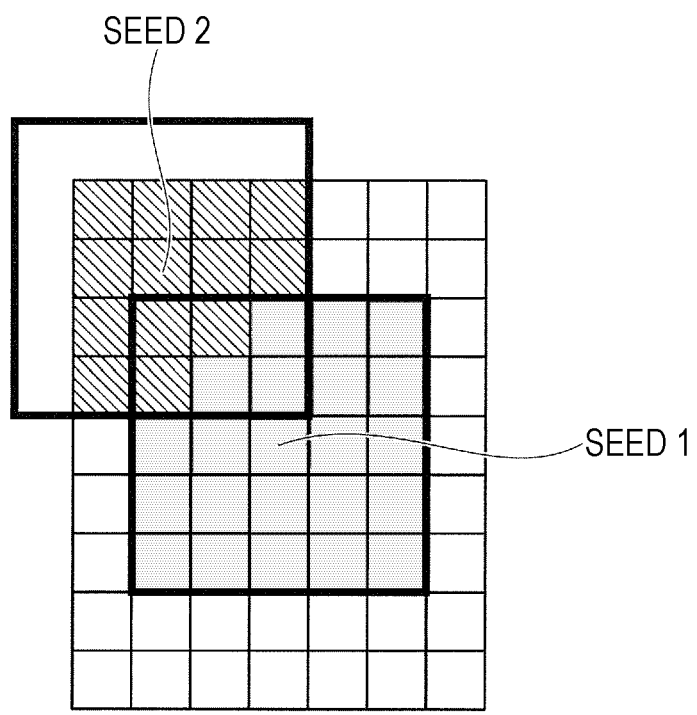
FIG. 17 illustrates a result of judgment using a method based on strength for a target pixel within the first range illustrated in FIG. 14.

FIG. 17 illustrates a result of judgment using a method based on strength for a target pixel within the first range illustrated in FIG. 14.

In FIG. 14, the first ranges for the pixels with seed 1 and seed 2 partially overlap. Unlabeled pixels in a portion where the first ranges do not overlap, that is, in a portion where the pixels with seed 1 and seed 2 do not interfere with each other, are all labeled with the same label as the corresponding one of the pixels with seed 1 and seed 2 serving as the reference pixel. On the other hand, pixels in a portion where the first ranges for the pixels with seed 1 and seed 2 overlap, that is, in a portion where the pixels with seed 1 and seed 2 interfere with each other, are each labeled with one of the labels having a higher strength. As a result, labeled pixels illustrated in FIG. 17 are obtained.

FIGS. 18A to 18H illustrate an example of the progress of the labeling of pixels using a region growing method based on strength.

Figure 18A:
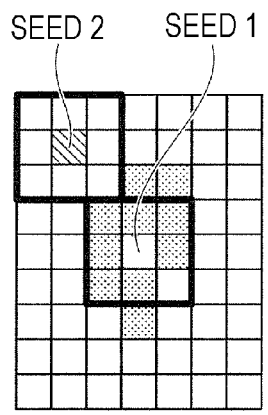
FIGS. 18A to 18H illustrate an example of the progress of the labeling of pixels using a region growing method based on strength in a first example.

FIG. 18A illustrates a first range set in this case. That is, the pixels with seed 1 and seed 2, which are reference pixels in the image region R1 and the image region R2, respectively, are selected. In addition, ranges of 3 pixels vertically and 3 pixels horizontally centered on the pixels with seed 1 and seed 2 are set as first ranges. In FIG. 18A, the first ranges are displayed in thick-line frames.

Figure 18B:
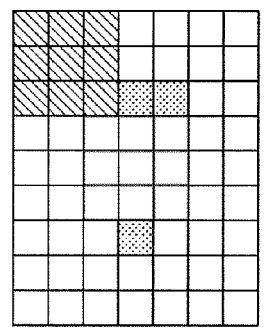

FIG. 18B illustrates a result of judgment on the target pixels within the first ranges for the pixels with seed 1 and seed 2. Since the first ranges for the pixels with seed 1 and seed 2 do not overlap, the target pixels within each of the first ranges are all labeled with the same label as that of the corresponding reference pixel, namely, the pixel with seed 1 or seed 2.

Figure 18C:
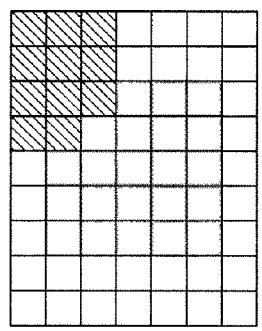
Figure 18D:
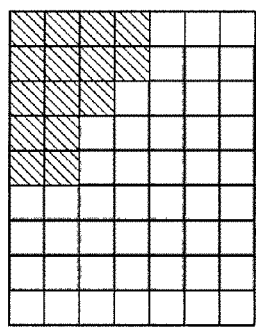
Figure 18E:
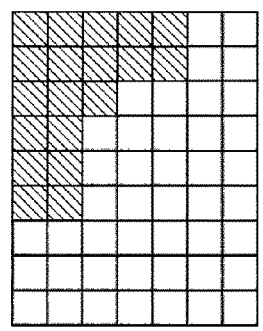
Figure 18F:
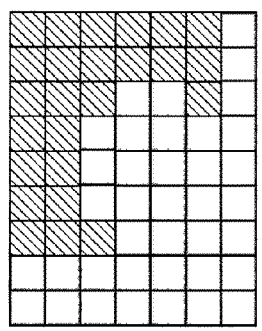
Figure 18G:
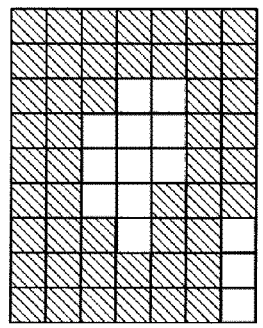

FIG. 18C illustrates the result of an update by further region growing. As in FIG. 17, pixels in a portion where the first ranges for the pixels with seed 1 and seed 2 does not overlap are all labeled with the same label as that of the corresponding one of the pixels with seed 1 and seed 2 serving as the reference pixel. Further, pixels in a portion where the first ranges for the pixels with seed 1 and seed 2 overlap are each labeled with one of the labels having a higher strength.

Further, even a target pixel which has been labeled with a certain label is labeled with a label having the higher one of the current strength of the target pixel and the strength exerted by the reference pixel. In addition, a higher strength is given to the target pixel. That is, the label and the strength of the target pixel are changed.

Figure 18H:
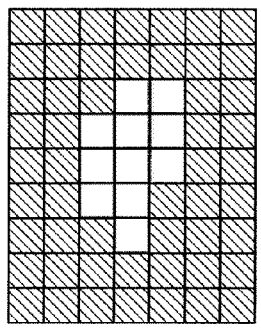

The labeled target pixel is now selected as a new reference pixel, and the region is sequentially updated in a manner illustrated in FIGS. 18D to 18H. Finally, as illustrated in FIG. 18H, the first designated region and the second designated region are segmented.

In the example described above, the description has been made in the context of the color data being RGB data. This is not intended to be limiting, and color data in any other color space, such as L*a*b* data, YCbCr data, or HSV data, may be used. Not all the color components may be used. For example, when HSV data is used as color data, only the H and S values may be used.

In the way described above, if it is judged that a target pixel belongs to a designated region, the characteristic changing unit 134 changes the label and strength of the target pixel.

In practice, information on the label, the strength, and the level of influence is stored in a main memory 92 described below (see FIG. 47) or the like as information for each pixel. The information is read as necessary from the main memory 92, and is updated when the label, the strength, and/or the level of influence is changed. This may improve the processing speed of the first region detection unit 13.

The process of the pixel selection unit 131, the range setting unit 132, the judgment unit 133, and the characteristic changing unit 134 described above is repeatedly performed until convergence is achieved. That is, as described with reference to FIG. 15, a pixel which is newly judged to belong to the designated region 1 or the designated region 2 is selected as a new reference pixel, and it is further judged whether another target pixel within the first range belongs to the designated region 1 or the designated region 2. This process is repeatedly performed for a region update operation, thereby enabling a region subjected to the change of characteristics, such as labeling, to be expanded sequentially. Accordingly, the designated region 1 and the designated region 2 are segmented. In this method (region growing method), a pixel labeled with a certain label may also have the label changed to a different label.

The convergence judgment unit 135 judges whether or not the series of processes described above has converged.

The convergence judgment unit 135 judges that the sequence of processes has converged when, for example, there is no longer a pixel whose label is to be changed. Alternatively, a maximum number of updates may be determined in advance, and the convergence judgment unit 135 may judge that the sequence of processes has converged when the maximum number of updates is reached.

In the region growing method in the first example described above, a target pixel to be judged to be or not to be in a designated region belongs to a first range and is a pixel other than the pixel with seed 1 or seed 2 serving as a reference pixel. Then, the pixel value of the target pixel is compared with the pixel value of the reference pixel, and a designated region to which the target pixel belongs is determined. That is, the region growing method in the first example is a so-called "active type" method in which the target pixel changes upon being influenced by the reference pixel.

In this region growing method, furthermore, the labels and strengths of the entire image immediately before region growing are temporarily stored. The judgment unit 133 judges to which designated region a target pixel within a first range set using a reference pixel selected from within each designated region belongs, and region growing is carried out. After the judgment, the characteristic changing unit 134 changes the stored labels and strengths. The changed labels and strengths are stored as the labels and strengths of the entire image immediately before further region growing, and further region growing is carried out. In this case, the labels and strengths of the entire image are changed together. That is, the region growing method in the first example is a so-called "synchronous type" region growing method.

In this region growing method, furthermore, the first range may be fixed or changed. The first range may be changed so as to be reduced in accordance with the number of updates. Specifically, for example, the first range is initially set to be large, and is then reduced if the number of updates is greater than or equal to a certain specified value. Plural specified values may be set and the first range may be reduced stepwise. That is, setting the first range to be large in the initial stage may result in an increase in processing speed. Thereafter, setting the first range to be small when the update proceeds to some extent may result in a further improvement in the accuracy of separation of designated regions. That is, an improvement in processing speed and an improvement in the accuracy of segmentation of designated regions are concurrently achievable.

Second Example (In the Case of "Active Type" and "Asynchronous Type")

Next, a description will be given of a second example of the first region detection unit 13.

FIGS. 19A to 19H illustrate an example of the progress of the labeling of pixels using a region growing method in the second example.

Figure 19A:
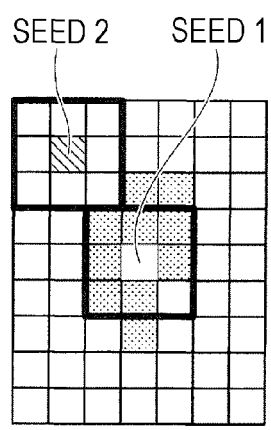
FIGS. 19A to 19H illustrate an example of the progress of the labeling of pixels using a region growing method in a second example.

Similarly to FIG. 18A, FIG. 19A illustrates a first range set in this case.

Figure 19B:
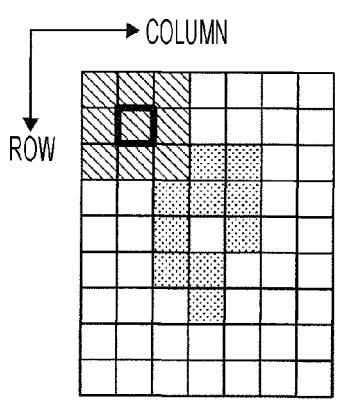
Figure 19C:
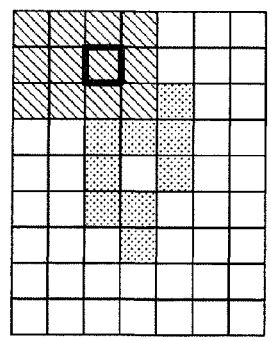
Figure 19D:
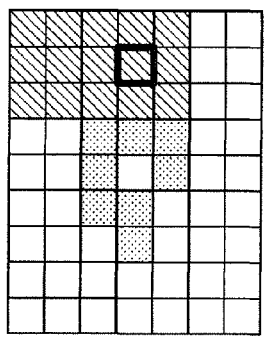
Figure 19E:
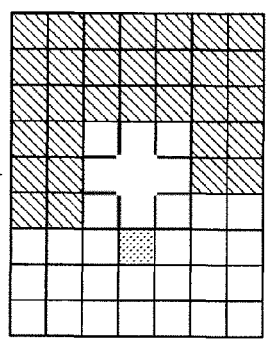
Figure 19F:
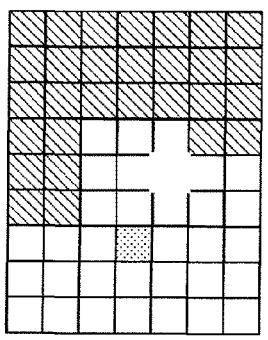
Figure 19G:
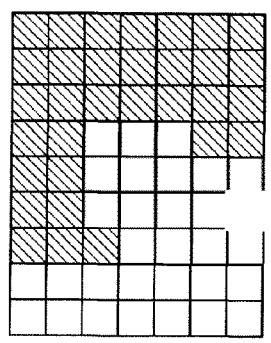

In this exemplary embodiment, as illustrated in FIG. 19B, first, the judgment unit 133 judges to which designated region a target pixel within the first range belongs, starting with the pixel with seed 2, which is set at the second row and second column. Then, as illustrated in FIGS. 19C and 19D, the judgment unit 133 judges to which designated region a target pixel within the first range belongs while shifting the reference pixel to the right in FIGS. 19C and 19D by one pixel. This judgment may be based on, for example, as described above, the degree of closeness of pixel values using equations (1) to (3). In addition, as in FIGS. 18A to 18H, this judgment may use a method based on strength.

After the judgment for each of the pixels up to the right end in FIGS. 19C and 19D as a target pixel, the judgment unit 133 shifts the reference pixel to the third row, and judges to which designated region the target pixel within the first range belongs while shifting the reference pixel to the right in FIGS. 19C and 19D by one pixel in a similar manner. After the judgment for each of the pixels up to the right end in FIGS. 19C and 19D as a target pixel, the judgment unit 133 further shifts the reference pixel to the next row. This operation is repeatedly performed in the way illustrated in FIGS. 19E to 19G, and is performed until the reference pixel has moved to the lower right end in FIGS. 19E to 19G. In other words, the judgment unit 133 may make a judgment while shifting the reference pixel so as to scan the image pixel by pixel.

After the lower right end has been reached and the reference pixel becomes no longer movable, the judgment unit 133 shifts the reference pixel in a direction opposite to that described above, and performs a similar process until the reference pixel has moved to the upper left end. Accordingly, a single reciprocating movement of the reference pixel is achieved. This reciprocating movement of the reference pixel is subsequently repeated until convergence is achieved.

Figure 20A:
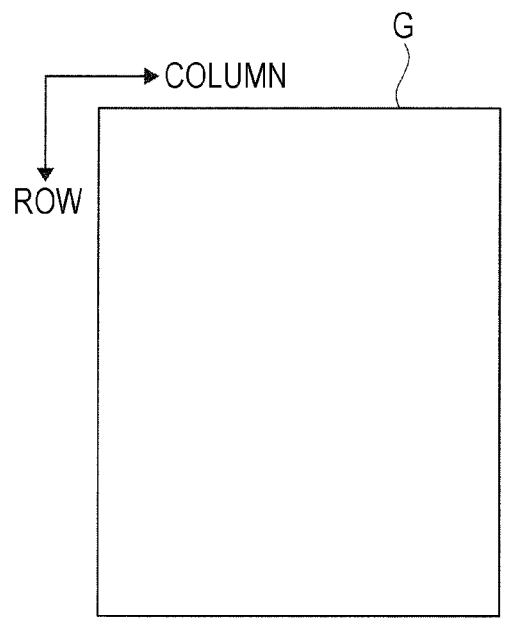
FIGS. 20A and 20B illustrate the case where the order of rows and columns is reversed.
Figure 20B:
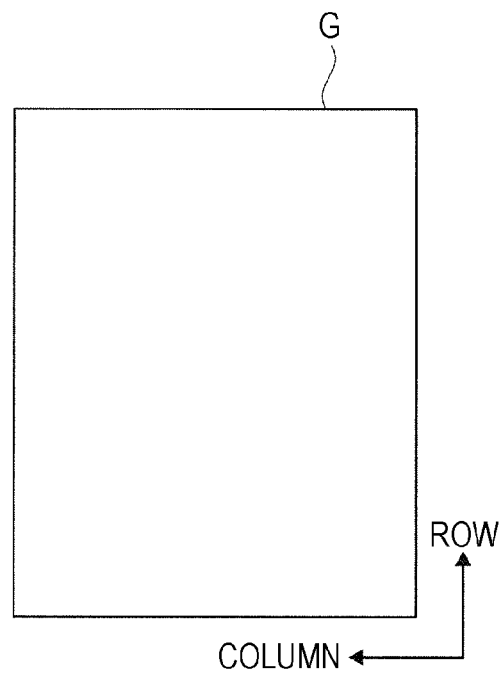

In other words, as illustrated in FIGS. 20A and 20B, a similar process is performed by reversing the order of rows and columns. Additionally, when reaching a terminal position (in this case, the lower right end or the upper left end), the reference pixel is further shifted so that the image is scanned in the reverse direction.

In the illustrated example, the description has been made in the context of a single starting point. Plural starting points may be set and individually shifted. In addition, any pixel in the image may be selected as a starting point.

Figure 19H:
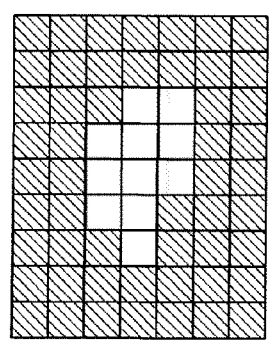

Finally, as illustrated in FIG. 19H, the first designated region and the second designated region are segmented.

This region growing method may provide higher convergence speed and higher processing speed than the method described with reference to FIGS. 18A to 18H. When reaching a terminal position, the reference pixel is further shifted so that the image is scanned in the reverse direction, allowing a portion with slow convergence to be less likely to occur, resulting in an increase in convergence speed.

In the second example, the operation of the components, except for the judgment unit 133, namely, the pixel selection unit 131, the range setting unit 132, the characteristic changing unit 134, and the convergence judgment unit 135, is similar to that in the first example. Also, the first range may be fixed or changed. The first range may be changed so as to be reduced in accordance with the number of updates.

In this region growing method, each time a selected reference pixel is shifted by one pixel, the judgment unit 133 judges to which designated region the target pixel within the first range belongs, and region growing is carried out. That is, a single reference pixel is selected in a predetermined order, and the target pixel (first target pixel) is subjected to a judgment once for the selected reference pixel. This judgment is repeated. After the judgment, the characteristic changing unit 134 changes the stored label and strength. In this case, the labels and strengths of the entire image are not changed together, and only a target pixel (first target pixel) within a first range determined each time the reference pixel is shifted by one pixel is to be subjected to the change in the label and strength. Thus, the region growing method in the second example a so-called "asynchronous type" region growing method.

Next, a description will be given of the operation of the first region detection unit 13 in the first example and the second example.

Figure 21:
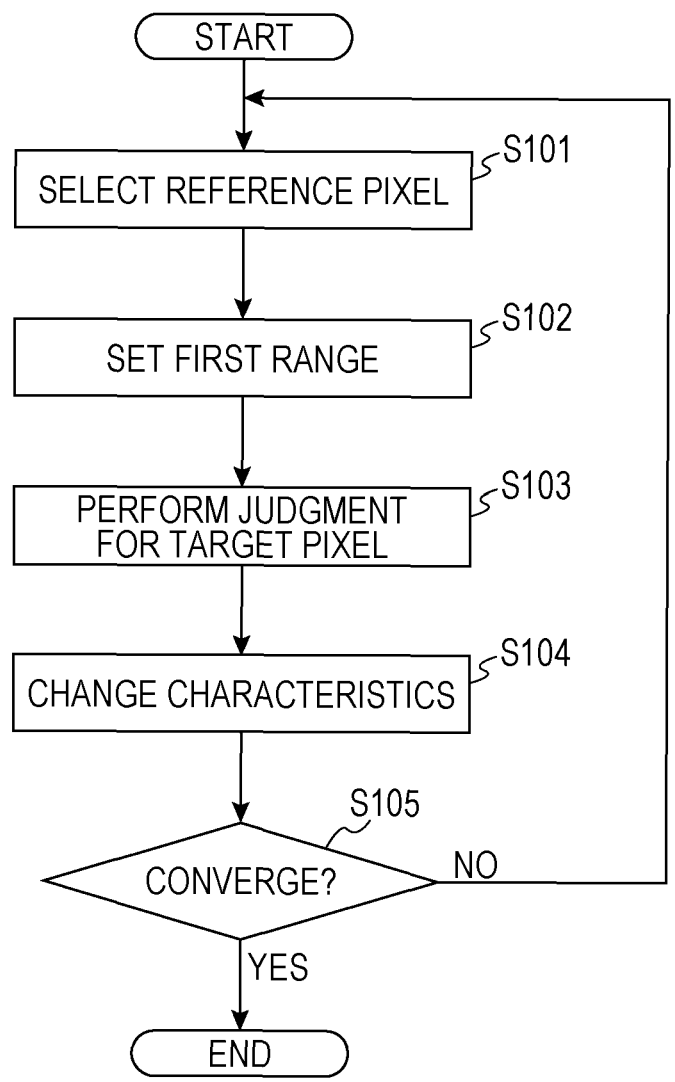
FIG. 21 is a flowchart illustrating the operation of the first region detection unit in the first example and the second example.

FIG. 21 is a flowchart illustrating the operation of the first region detection unit 13 in the first example and the second example.

In the following, the operation of the first region detection unit 13 will be described with reference to FIG. 12 and FIG. 21.

First, the pixel selection unit 131 selects a reference pixel to be selected from among pixels belonging to a designated region (step S101). In the example illustrated in FIG. 13B, the pixel selection unit 131 selects the pixels with seed 1 and seed 2 as reference pixels.

Then, the range setting unit 132 sets a first range for a target pixel (first target pixel) to be determined to be or not to be in the designated region corresponding to the reference pixel (step S102). In the example illustrated in FIG. 13B, the range setting unit 132 sets, as the first ranges, ranges of 5 pixels vertically and 5 pixels horizontally centered on the pixels with seed 1 and seed 2.

Then, the judgment unit 133 judges to which designated region the target pixel within the first range belongs (step S103). In this case, the judgment unit 133 judges that the target pixel belongs to a designated region having a higher strength in a portion where designated regions interfere with each other. Alternatively, the judgment unit 133 may make the judgment described above by using the Euclidean distance $d_i$ of the pixel values, and may spread the designated region.

Further, the characteristic changing unit 134 changes the characteristics of a target pixel judged by the judgment unit 133 to belong to any of the designated regions (step S104). Specifically, the characteristic changing unit 134 labels such a target pixel, and further gives a strength to the target pixel.

Then, the convergence judgment unit 135 judges whether or not the series of processes has converged (step S105). The convergence judgment unit 135 may judge that the sequence of processes has converged when, as described above, there is no longer a pixel whose label is to be changed or the predetermined maximum number of updates is reached.

If the convergence judgment unit 135 judges that the sequence of processes has converged (YES in step S105), the designated region segmentation process ends.

On the other hand, if the convergence judgment unit 135 judges that the sequence of processes has not converged (NO in step S105), the process returns to step S101. In this case, the reference pixel selected by the pixel selection unit 131 is changed.

Third Example (In the Case of "Passive Type" and "Synchronous Type")

Next, a description will be given of a third example of the first region detection unit 13.

In the third example, the pixel selection unit 131 selects one target pixel to be judged to be or not to be in a designated region. The range setting unit 132 changes a second range. The second range is set for the selected target pixel (second target pixel), and is a range including a reference pixel for judging in which designated region the selected target pixel is included.

Figure 22:
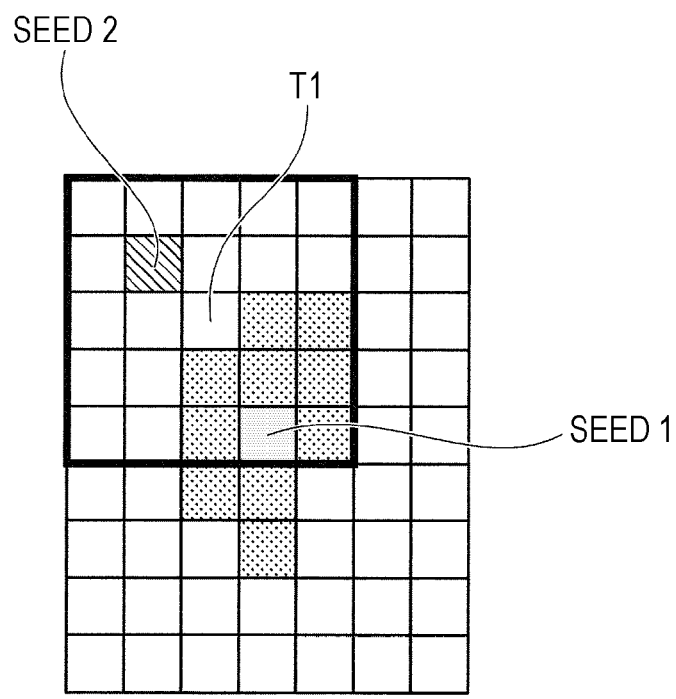
FIG. 22 illustrates a target pixel selected by a pixel selection unit and a second range set by a range setting unit in a third example.

FIG. 22 illustrates a target pixel selected by the pixel selection unit 131 and a second range set by the range setting unit 132.

In FIG. 22, reference pixels are set as seed 1 and seed 2 in the original image illustrated in FIG. 13A in a manner similar to that illustrated in FIG. 13B. One pixel denoted by T1 is selected as a target pixel (second target pixel). In addition, a range of 5 pixels vertically and 5 pixels horizontally centered on the target pixel T1 is set as a second range. In FIG. 22, the second range is displayed in a thick-line frame.

The judgment unit 133 judges to which designated region the target pixel T1 belongs. The judgment unit 133 judges whether the target pixel T1 belongs to a designated region (first designated region) to which the pixel with seed 1 belongs or a designated region (second designated region) to which the pixel with seed 2 belongs.

For instance, the judgment unit 133 judges which of the pixel values of the pixels with seed 1 and seed 2 serving as the reference pixels included within the second range the pixel value of the target pixel T1 is closer to, thereby judging whether the target pixel T1 belongs to the first designated region or the second designated region. That is, the judgment unit 133 judges the target pixel T1 in accordance with the degree of closeness of the pixel value of the target pixel T1 to the pixel value of each of the reference pixels.

Alternatively, the judgment unit 133 may make the judgment described above by using a method based on strength. In this case, the judgment unit 133 judges to which designated region the target pixel T1 (second target pixel) belongs, in accordance with the strengths of the reference pixels included within the second range.

Figure 23:
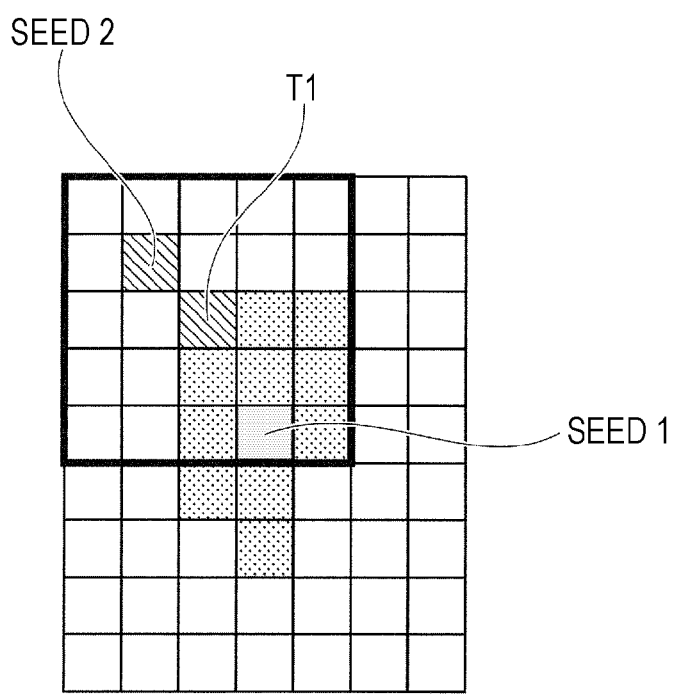
FIG. 23 illustrates a result of the judgment according to the first exemplary embodiment.

FIG. 23 illustrates a result of the judgment according to this exemplary embodiment.

In FIG. 23, the pixel value of the target pixel T1 is closer to the pixel value of the pixel with seed 2 than to the pixel value of the pixel with seed 1, and therefore it is judged that the target pixel T1 belongs to the second designated region.

The operation of the characteristic changing unit 134 and the convergence judgment unit 135 is similar to that in the first example.

Also in this exemplary embodiment, the process of the pixel selection unit 131, the range setting unit 132, the judgment unit 133, and the characteristic changing unit 134 is repeatedly performed until convergence is achieved. This process is repeatedly performed for a region update operation, thereby enabling a region subjected to the change of characteristics, such as labeling, to be expanded sequentially. Accordingly, the designated region 1 and the designated region 2 are segmented. The second range is variable and may be reduced sequentially in accordance with the number of updates.

Specifically, the second range is initially set to be large, and is then reduced if the number of updates is greater than or equal to a certain specified value. Plural specified values may be set and the second range may be reduced stepwise. That is, the second range is set to be large in the initial stage so that a reference pixel is more likely to be present within the second range, resulting in more efficient judgment. Further, setting the second range to be small when the update proceeds to some extent may result in an improvement in the accuracy of separation of designated regions.

The region growing method according to this exemplary embodiment focuses on the target pixel T1, and the pixel value of the target pixel T1 is compared with the pixel value of a reference pixel (the pixel with seed 1 or seed 2) within the second range to determine the designated region to which the target pixel T1 belongs. That is, the region growing method in the third example is a so-called "passive type" method in which the target pixel T1 changes upon being influenced by a reference pixel within the second range.

Also in the passive-type method, a pixel labeled with a certain label may have the label changed to a different label. This method is similar to the region growing method of the related art described with reference to FIGS. 11A to 11C. In the region growing method of the related art, the target pixel T1 is influenced by eight fixed neighboring pixels adjacent to the target pixel T1. In contrast, the region growing method in the third example has a feature in that the second range is variable. An increase in the size of the second range may enable more efficient judgment, as described above. Eight fixed neighboring pixels, on the other hand, will be less likely to include a reference pixel, reducing the efficiency of judgment.

In this region growing method, furthermore, the labels and strengths of the entire image immediately before region growing are temporarily stored. The judgment unit 133 judges to which designated region the selected target pixel T1 belongs, and region growing is carried out. After the judgment, the characteristic changing unit 134 changes the stored label and strength. The changed labels and strengths are stored as the labels and strengths of the entire image immediately before further region growing, and further region growing is carried out. That is, the region growing method in the third example is of a so-called "synchronous type".

In addition, reducing the size of the second range may further improve the accuracy of separation of designated regions. In this exemplary embodiment, accordingly, the second range is changed so as to be reduced in accordance with the number of updates.

Fourth Example (In the Case of "Passive Type" and "Asynchronous Type")

The region growing method described above is of the "synchronous type" similar to that in the first example. Alternatively, the region growing method of the "asynchronous type" similar to that in the second example may be used. In the following, the region growing method of the "passive type" and the "asynchronous type" will be described as a fourth example.

FIGS. 24A to 24H illustrate an example of the progress of the labeling of pixels using the region growing method in the fourth example.

Figure 24A:
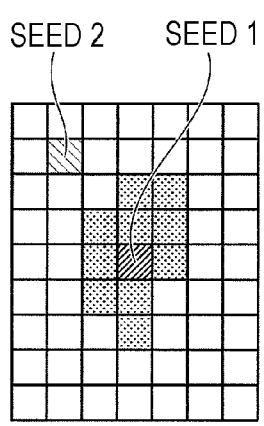
FIGS. 24A to 24H illustrate an example of the progress of the labeling of pixels using a region growing method in a fourth example.

In FIG. 24A, the pixels with seed 1 and seed 2 serving as reference pixels illustrated in FIG. 13B are set in the original image illustrated in FIG. 13A, which is similar to that described with reference to FIG. 18A and FIG. 19A.

Figure 24B:
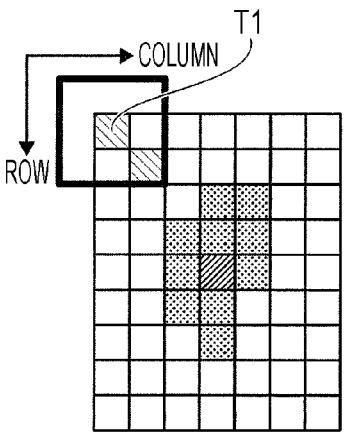
Figure 24C:
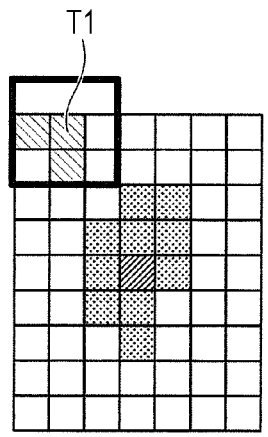
Figure 24D:
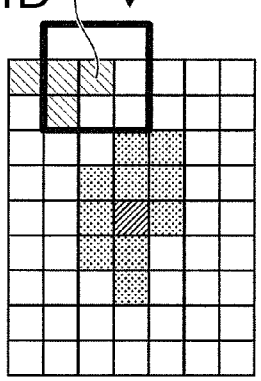
Figure 24E:
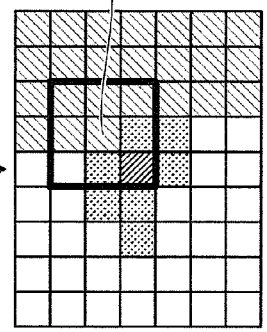
Figure 24F:
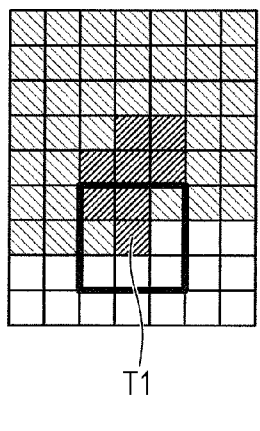
Figure 24G:
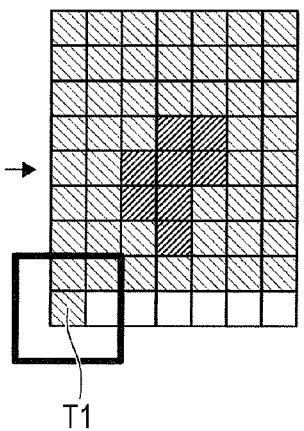

FIG. 24B illustrates a second range set in this case. In this exemplary embodiment, as illustrated in FIG. 24B, the judgment unit 133 makes a judgment using the pixel at the first row and first column as the starting point, and initially sets the pixel as a target pixel T1. Then, the judgment unit 133 judges to which designated region the target pixel T1 belongs. Then, as illustrated in FIGS. 24C and 24D, the judgment unit 133 judges to which designated region the target pixel T1 belongs, while shifting the target pixel T1 to the right in FIGS. 24C and 24D by one pixel. This judgment is based on strength, and is similar to that in the first to third examples.

After the judgment for each of the pixels up to the right end in FIGS. 24C and 24D as a target pixel T1, the judgment unit 133 shifts the target pixel T1 to the second row, and judges to which designated region the target pixel T1 belongs while shifting the target pixel T1 to the right in FIGS. 24C and 24D by one pixel in a manner similar to that described above. After the judgment for the pixels up to the right end in FIGS. 24C and 24D, the judgment unit 133 further shifts the target pixel T1 to the next row. This operation is repeatedly performed in the way illustrated in FIGS. 24E to 24G, and is performed until the target pixel T1 has moved to the lower right end in FIGS. 24E to 24G.

After the lower right end has been reached and the target pixel T1 becomes no longer movable, the judgment unit 133 shifts the target pixel T1 in a direction opposite to that described above, and performs a similar process until the target pixel T1 has moved to the upper left end. Accordingly, a single reciprocating movement of the target pixel T1 is achieved. This reciprocating movement of the target pixel T1 is subsequently repeated until convergence is achieved.

In the illustrated example, the description has been made in the context of a single starting point. Alternatively, as described in the third example, plural starting points may be set and individually shifted. In addition, any pixel in the image may be selected as a starting point.

Figure 24H:
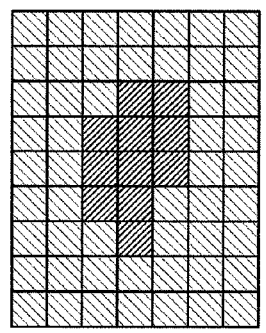

Finally, as illustrated in FIG. 24H, the first designated region and the second designated region are segmented.

This region growing method may also provide higher convergence speed and higher processing speed. When reaching a terminal position, the target pixel T1 is further shifted so that the image is scanned in the reverse direction, allowing a portion with slow convergence to be less likely to occur, resulting in an increase in convergence speed.

The second range may be fixed or changed. The second range may be changed so as to be reduced in size in accordance with the number of updates.

In this region growing method, furthermore, each time the selected target pixel T1 is shifted by one pixel, the judgment unit 133 judges to which designated region the target pixel T1 belongs, and region growing is carried out. That is, a single target pixel T1 (second target pixel) is selected in a predetermined order, and a selected target pixel T1 (second target pixel) is subjected to a judgment once. This judgment is repeated. After the judgment, the characteristic changing unit 134 changes the stored label and strength. That is, only the target pixel T1 (second target pixel) is to be subjected to the change in the label and strength each time the target pixel T1 is shifted by one pixel. The region growing method described above is of an "asynchronous type".

Next, a description will be given of the operation of the first region detection unit 13 in the third example and the fourth example.

Figure 25:
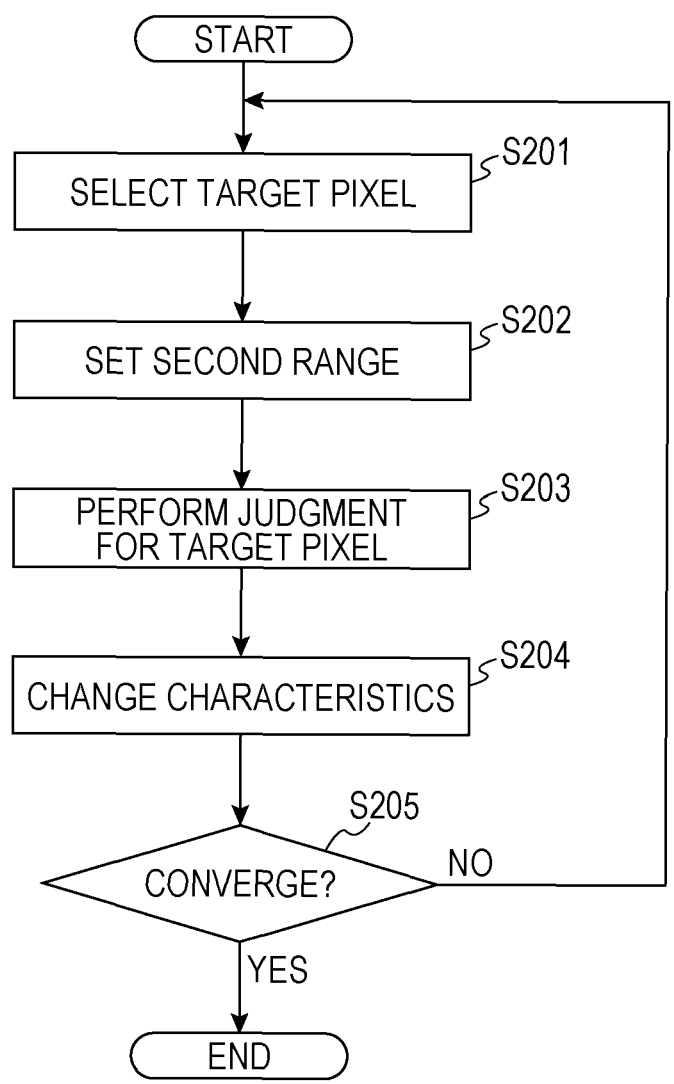
FIG. 25 is a flowchart illustrating the operation of the first region detection unit in the third example and the fourth example.

FIG. 25 is a flowchart illustrating the operation of the first region detection unit 13 in the third example and the fourth example.

In the following, the operation of the first region detection unit 13 will be described with reference to FIG. 12 and FIG. 25.

First, the pixel selection unit 131 selects a target pixel (second target pixel) (step S201). In the example illustrated in FIG. 22, the pixel selection unit 131 selects a target pixel T1.

Then, the range setting unit 132 sets a second range that is an influential range of pixels having an effect on a judgment for the target pixel T1 (step S202). In the example illustrated in FIG. 22, the range setting unit 132 sets, as the second range, a range of 5 pixels vertically and 5 pixels horizontally centered on the target pixel T1.

Then, the judgment unit 133 judges to which designated region the target pixel T1 belongs (step S203). In the example described above, the judgment unit 133 makes a judgment in accordance with the degree of closeness of the pixel value of the target pixel T1 to each of the pixel values of the pixels with seed 1 and seed 2 and in accordance with the strengths of the target pixel T1, the pixel with seed 1, and the pixel with seed 2.

If the judgment unit 133 determines that the target pixel T1 belongs to any of the designated regions, the characteristic changing unit 134 changes the characteristics (step S204). Specifically, the characteristic changing unit 134 labels the target pixel T1, and further gives a strength to the target pixel T1.

Then, the convergence judgment unit 135 judges whether or not the series of processes has converged (step S205). The convergence judgment unit 135 may judge that the sequence of processes has converged when, as described above, there is no longer a pixel whose label is to be changed or the predetermined maximum number of updates is reached.

If the convergence judgment unit 135 judges that the sequence of processes has converged (YES in step S205), the designated region segmentation process ends.

On the other hand, if the convergence judgment unit 135 judges that the sequence of processes has not converged (NO in step S205), the process returns to step S201. In this case, the target pixel (second target pixel) selected by the pixel selection unit 131 is changed.

Fifth Example

Next, a description will be given of a fifth example of the first region detection unit 13.

The fifth example adopts both the "active type" region growing method described in the first example and the second example and the "passive type" region growing method described in the third example and the fourth example. That is, in the fifth example, region growing is carried out while the "active type" region growing method and the "passive type" region growing method are switched during the update.

The range setting unit 132 selects which of the "active type" region growing method and the "passive type" region growing method to use each time an update is performed. If the "active type" region growing method is selected, the range setting unit 132 sets a first range. Then, the judgment unit 133 judges to which designated region a target pixel within the first range belongs. If the "passive type" region growing method is selected, the range setting unit 132 sets a second range. Then, the judgment unit 133 judges to which designated region a target pixel belongs. That is, the judgment unit 133 makes a judgment while switching at least once between the setting of a first range and the setting of a second range.

The switching method is not limited to any specific one. For example, the "active type" and "passive type" region growing methods may be alternately used. Alternatively, the "active type" region growing method may be initially used a number of times corresponding to the predetermined number of updates, and then the "passive type" region growing method may be used until the end of the process. Conversely, the "passive type" region growing method may be initially used a number of times corresponding to the predetermined number of updates, and then the "active type" region growing method may be used until the end of the process. The "active type" region growing method in either the first example or the second example may be used.

Accordingly, a region growing method that adopts both the "active type" and the "passive type" also enables the segmentation of the designated region 1 and the designated region 2.

In this exemplary embodiment, the first range or the second range to be set may be fixed or variable. The first range and the second range may be sequentially reduced in accordance with the number of updates. In addition, any of the "synchronous type" in the first example and the "asynchronous type" in the second example may be used.

Next, a description will be given of the operation of the first region detection unit 13 in the fifth example.

Figure 26:
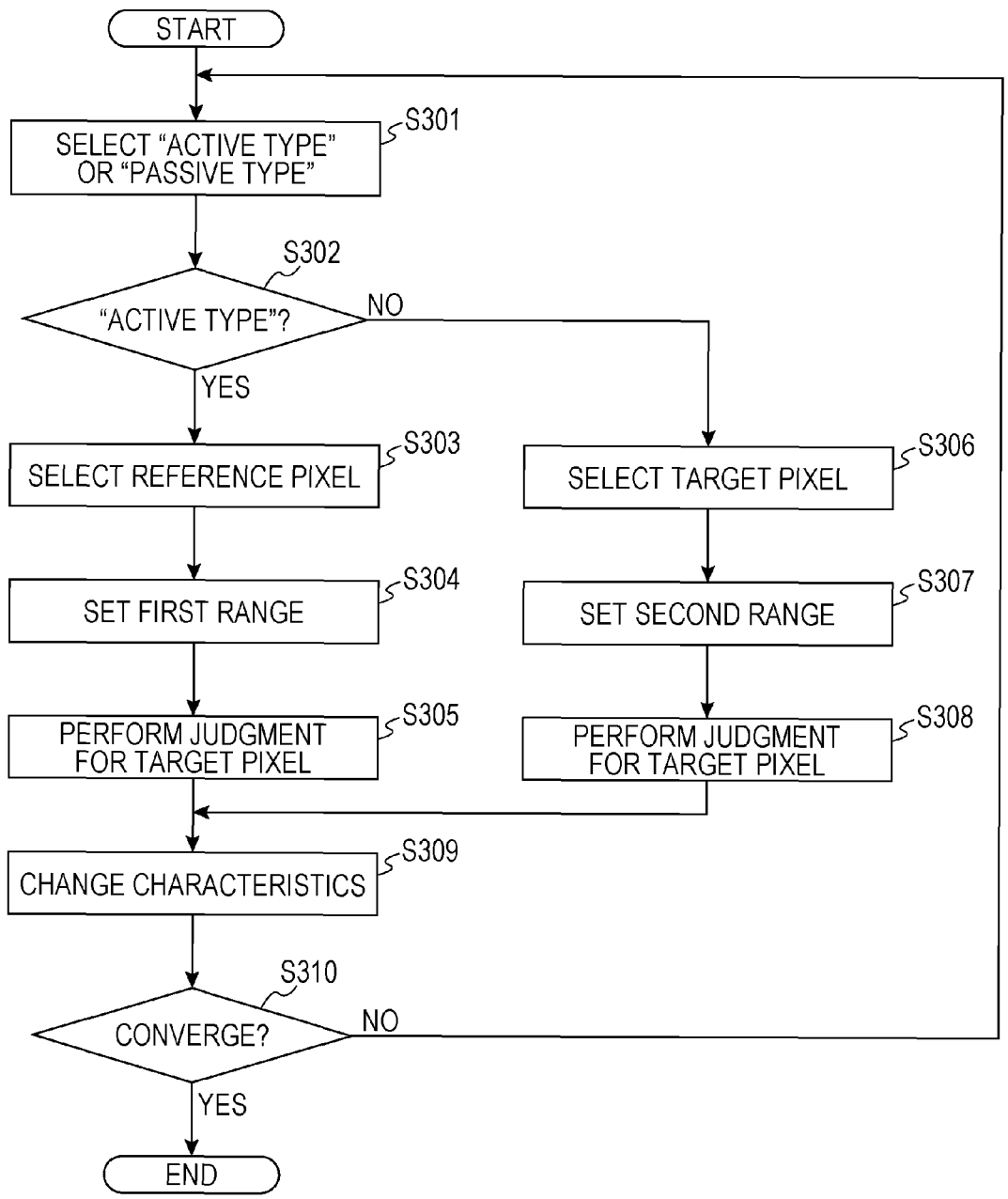
FIG. 26 is a flowchart illustrating the operation of the first region detection unit in a fifth example.

FIG. 26 is a flowchart illustrating the operation of the first region detection unit 13 in the fifth example.

In the following, the operation of the first region detection unit 13 will be described with reference to FIG. 12 and FIG. 26.

First, the pixel selection unit 131 selects which of the "active type" and the "passive type" to use (step S301).

If the pixel selection unit 131 selects the "active type" (YES in step S302), the pixel selection unit 131 selects a reference pixel to be selected from among pixels belonging to a designated region (step S303).

Then, the range setting unit 132 sets a first range for a target pixel (first target pixel) to be determined to be or not to be in the designated region corresponding to the reference pixel (step S304).

Then, the judgment unit 133 judges to which designated region the target pixel within the first range belongs (step S305).

On the other hand, if the pixel selection unit 131 selects the "passive type" (NO in step S302), the pixel selection unit 131 selects a target pixel T1 (second target pixel) (step S306).

Then, the range setting unit 132 sets a second range that is an influential range of pixels having an effect on a judgment for the target pixel T1 (step S307).

Then, the judgment unit 133 determines to which designated region the target pixel T1 belongs (step S308).

Then, the characteristic changing unit 134 changes the characteristics (step S309) of the target pixel within the first range or the target pixel T1, which is judged by the judgment unit 133 to belong to any of the designated regions.

Then, the convergence judgment unit 135 judges whether or not the series of processes has converged (step S310).

If the convergence judgment unit 135 judges that the sequence of processes has converged (YES in step S310), the designated region segmentation process ends.

On the other hand, if the convergence judgment unit 135 judges that the sequence of processes has not converged (NO in step S310), the process returns to step S301. In this case, the reference pixel or the target pixel (second target pixel) selected by the pixel selection unit 131 is changed.

The configuration of the first region detection unit 13 described above in detail may enable designated regions to be segmented more rapidly by using a region growing method than by using that of the related art.

If an image obtained by the image information obtaining unit 11 has low visibility, retinex processing or the like may be performed in advance to enhance visibility.

Assuming that the pixel value (luminance value) of a pixel at a pixel position (x, y) on an image is represented by I(x, y) and the pixel value of the corresponding pixel on a visibility-enhanced image is represented by I'(x, y), retinex processing may enable an enhancement of visibility as follows:

$$I'(x,y)=\alpha R(x,y)+(1-\alpha)I(x,y),$$

where $\alpha$ is a parameter that emphasizes reflectance and R(x, y) denotes an estimated reflectance component. In the Retinex model, the emphasis of the reflectance component may enable an enhancement in visibility. In this exemplary embodiment, the estimated reflectance component R(x, y) may be calculated using any existing method using the Retinex model. Given $0 \le \alpha \le 1$, the original image is represented when $\alpha=0$ and the reflectance image (with maximum visibility) is represented when $\alpha=1$. The parameter $\alpha$ may be adjusted by the user, or may be associated with a value in accordance with the darkness of the image.

FIGS. 27A and 27B are conceptual diagrams illustrating retinex processing for enhancing the visibility of an original image.

FIG. 27A illustrates the original image, and FIG. 27B illustrates an image subjected to the retinex processing. In this manner, the enhancement of visibility may further improve the accuracy of segmentation of designated regions.

Second Exemplary Embodiment

Next, an image processing apparatus 10 according to a second exemplary embodiment will be described.

Description of Image Processing Apparatus

Figure 28:
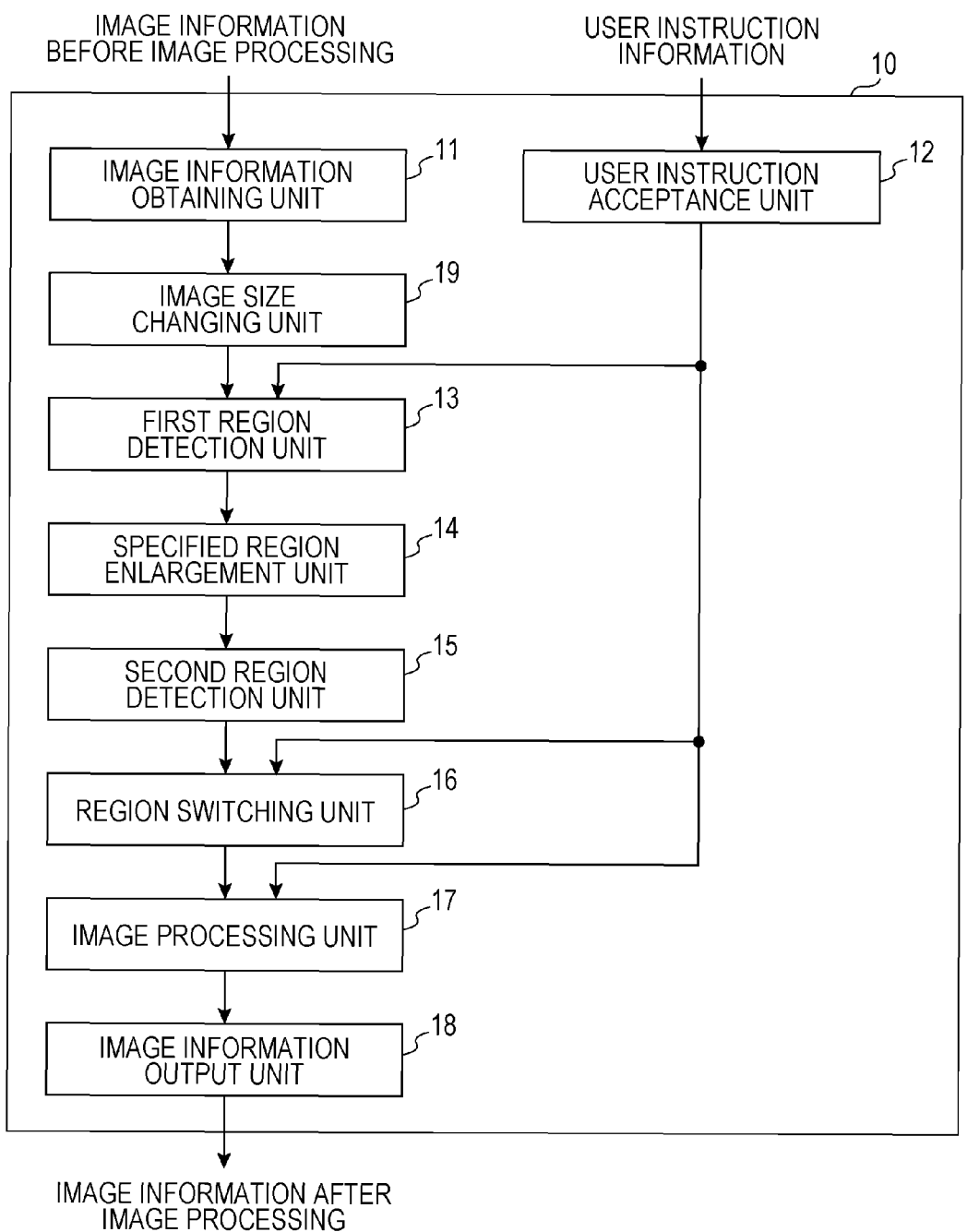
FIG. 28 is a block diagram illustrating an example functional configuration of an image processing apparatus according to a second exemplary embodiment.

FIG. 28 is a block diagram illustrating an example functional configuration of the image processing apparatus 10 according to the second exemplary embodiment.

As illustrated in FIG. 28, the image processing apparatus 10 according to this exemplary embodiment includes an image information obtaining unit 11, a user instruction acceptance unit 12, an image size changing unit 19, a first region detection unit 13, a designated region enlargement unit 14, a second region detection unit 15, a region switching unit 16, an image processing unit 17, and an image information output unit 18. That is, the image processing apparatus 10 according to this exemplary embodiment has a configuration in which the image processing apparatus 10 according to the first exemplary embodiment illustrated in FIG. 2 further includes the image size changing unit 19.

For example, in a case where seeds in designated regions are input using curved lines as illustrated in FIGS. 3A and 3B, there are sizes optimal for users for editing. On the other hand, it may be desirable that the size used for editing be different from the size used for the segmentation of designated regions since the size at which the first region detection unit 13 performs a process for segmenting designated regions may depend on the processing capabilities and the like of the image processing apparatus 10. There also exists the size of the image being used G' at which the second region detection unit 15 finally segments designated regions. That is, there are three sizes of images.

Figure 29A:
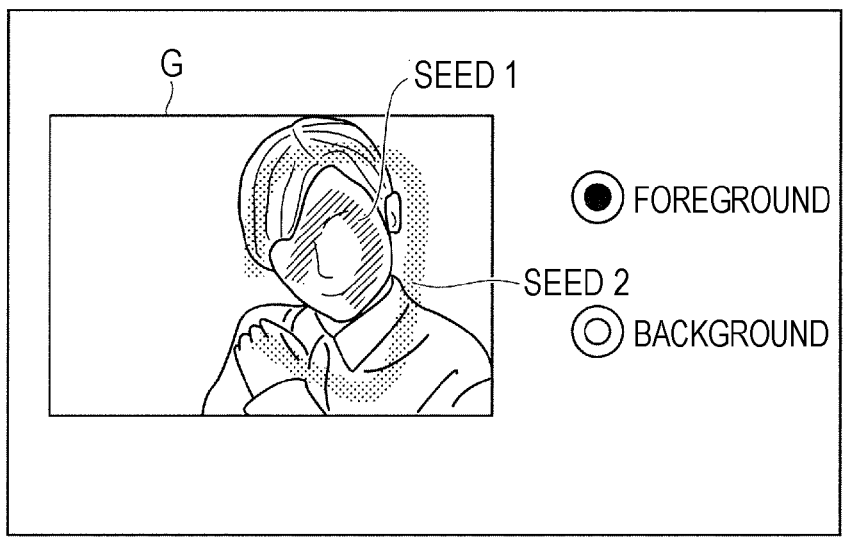
FIGS. 29A to 29C illustrate three sizes of images used in the second exemplary embodiment.
Figure 29B:
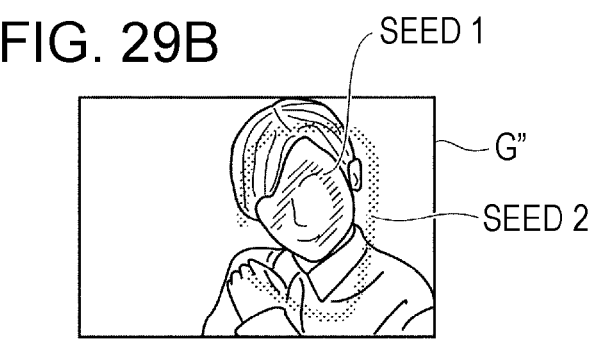
Figure 29C:

FIGS. 29A to 29C illustrate three sizes of images used in this exemplary embodiment.

FIG. 29A illustrates an editing image displayed on the display device 20, through which the user inputs seeds in designated regions. The editing image is represented by an image G. The image G is identical to the image G in the first exemplary embodiment. The image G includes "seed 1" and "seed 2" described with reference to FIGS. 3A and 3B.

FIG. 29B illustrates an image in which the first region detection unit 13 performs a process for segmenting designated regions. The image is represented by an image G". As illustrated in FIG. 29B, the image G" has a smaller size and a lower resolution than the image G. This may improve the processing speed for the segmentation of designated regions by the first region detection unit 13.

FIG. 29C illustrates an image being used G' on which the second region detection unit 15 finally segments designated regions. The image being used G' is identical to the image being used G' in the first exemplary embodiment. As in the first exemplary embodiment, the image being used G' has a larger size and a higher resolution than the image G.

In this exemplary embodiment, the image G" is created by reducing the size of the image G. In this case, the sizes of the seeds given by the user are also reduced. In this exemplary embodiment, this process is performed by the image size changing unit 19. The image size changing unit 19 changes the image size of the image G used by the user to specify designated regions, and also changes the seeds in accordance with the size of the image G whose image size has been changed. Note that a mere reduction in the size of the image G may cause impairment of position information on the seeds. That is, it is desirable that position information on the given seeds, as well as position information on the image G, be maintained. In the following, the process performed by the image size changing unit 19 will be described.

First, the image size changing unit 19 decomposes the editing image illustrated in FIG. 29A into the image G and a position information image Gp. The position information image Gp is an image indicating seeds.

Figure 30A:
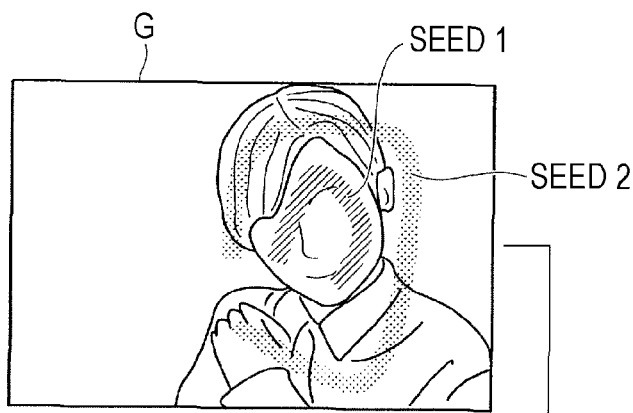
FIGS. 30A to 30C illustrate the decomposition of the editing image illustrated in FIG. 29A into an image and a position information image.
Figure 30B:
Figure 30C:
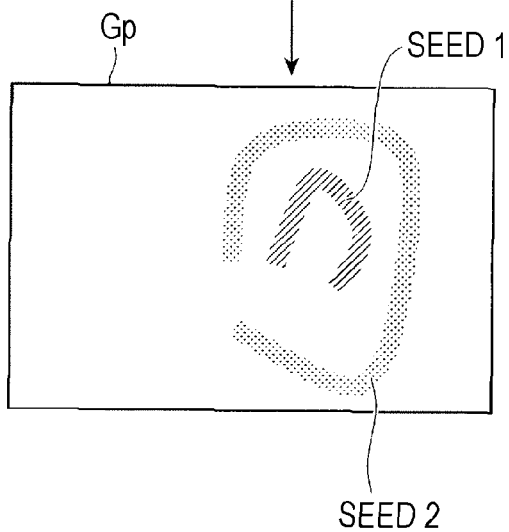

FIGS. 30A to 30C illustrate the decomposition of the editing image illustrated in FIG. 29A into the image G and the position information image Gp.

FIG. 30A illustrates the editing image illustrated in FIG. 29A, and the editing image is decomposed into the image G illustrated in FIG. 30B and the position information image Gp illustrated in FIG. 30C.

Then, the image G and the position information image Gp are reduced in size. The focus is on the reduction of the size of the position information image Gp. The position information image Gp is constituted by line segments, and the seeds may be missing depending on the size reduction method. In this exemplary embodiment, to address this issue, the position information image Gp is subjected to nearest-neighbor mapping. The mapping may be performed using equation (4) below when the position of each pixel on the position information image Gp is represented by (i, j), the position of each pixel after pixel mapping is represented by (y, x), the size change rate is represented by r, the pixel value of each pixel before the size change is represented by P, and the pixel value of each pixel after the size change is represented by p. An image which depicts the nearest-neighbor mapping according to equation (4) is illustrated in FIG. 31.

$$p(y,x)=P(i/r,j/r) \quad (4)$$

Since (y, x) indicates the position of a pixel, the values of (y, x) are each converted into an integer by, for example, rounding toward the nearest integer. Each seed indicates a flag (ON or OFF). Thus, for example, if a pixel with seed 1 is displayed in red, the pixel is represented by (R, G, B)=(255, 0, 0), and is thus regarded as being in a region with label 1. If a pixel with seed 2 is displayed in blue, the pixel is represented by (R, G, B)=(0, 0, 255), and is thus regarded as being in a region with label 2. The mapping using equation (4) is direct mapping without interpolation, resulting in rapid reduction in the size of an image without impairing the nature of the seeds as flags (ON or OFF). However, since seed positions are determined by rounding off to the nearest integers, the accuracy of the positions may be reduced.

Figure 32:
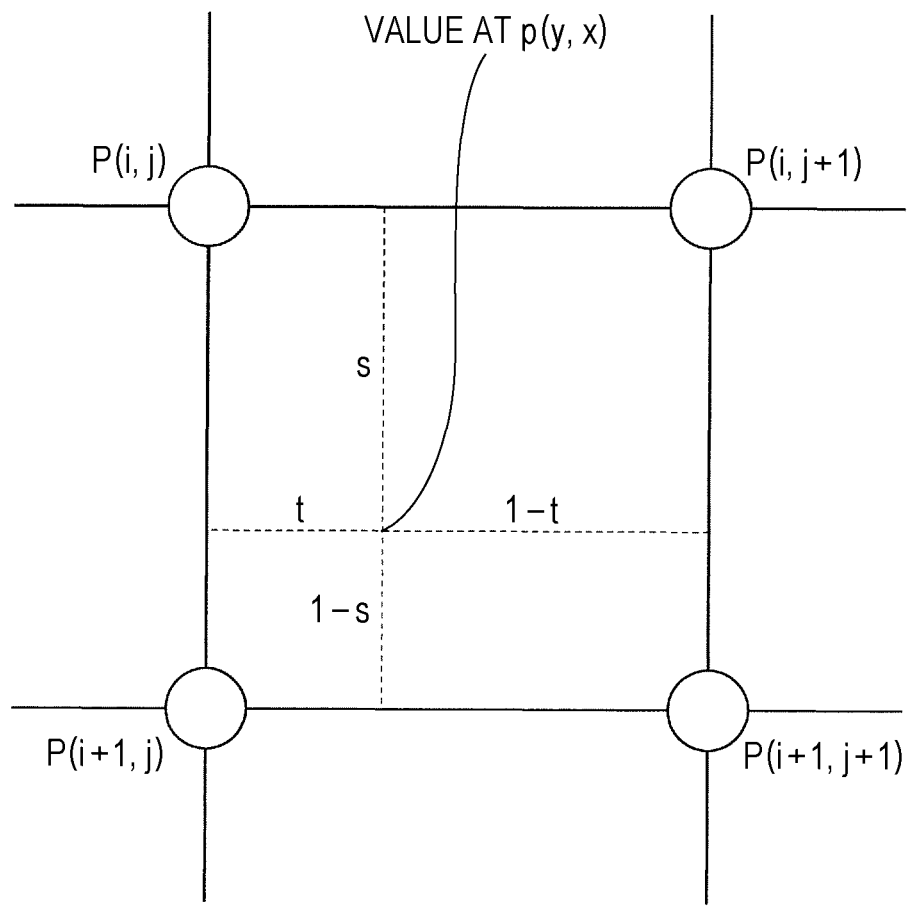
FIG. 32 is an image which depicts an interpolation process using linear interpolation.

For a further improvement in the accuracy of the seed positions, a nearest-neighbor interpolation process, such as linear interpolation, may be used. In an interpolation process using linear interpolation, each of the pixel values obtained after conversion is determined by equation (5) below. An image which depicts the interpolation process using linear interpolation according to equation (5) is illustrated in FIG. 32.

$$p(y,x)=(1-t)((1-s)P(i,j)+sP(i+1,j))+t((1-s)P(i,j+1)+sP(i+1,j+1)) \quad (5)$$

The interpolation process using linear interpolation is different from nearest-neighbor mapping in that the pixel value of the target pixel is weighted using the pixel values of neighboring pixels without rounding off.

Figure 33A:
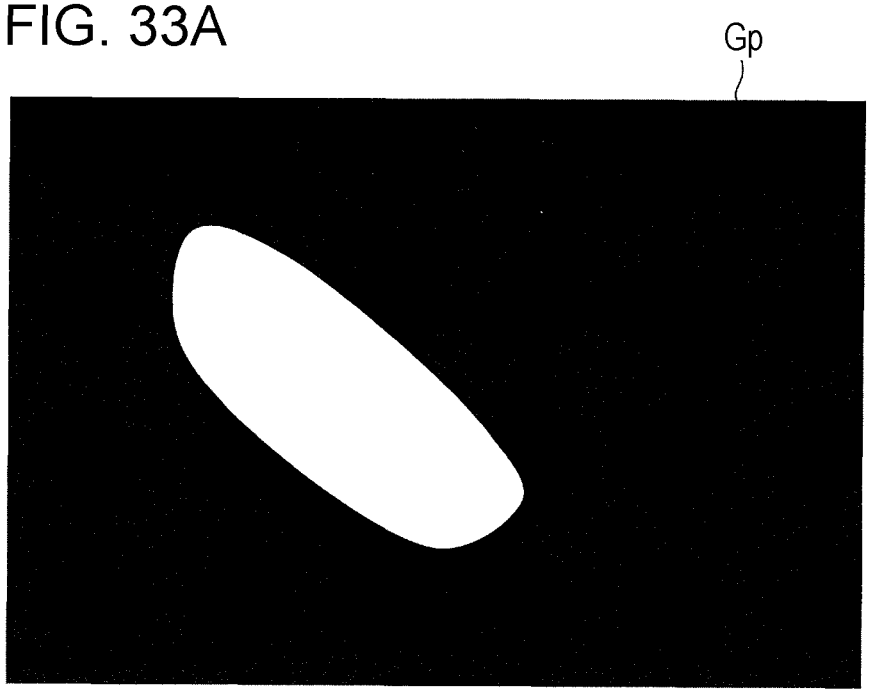
FIGS. 33A and 33B illustrate the linear interpolation of a portion of a curved line representing a seed.
Figure 33B:
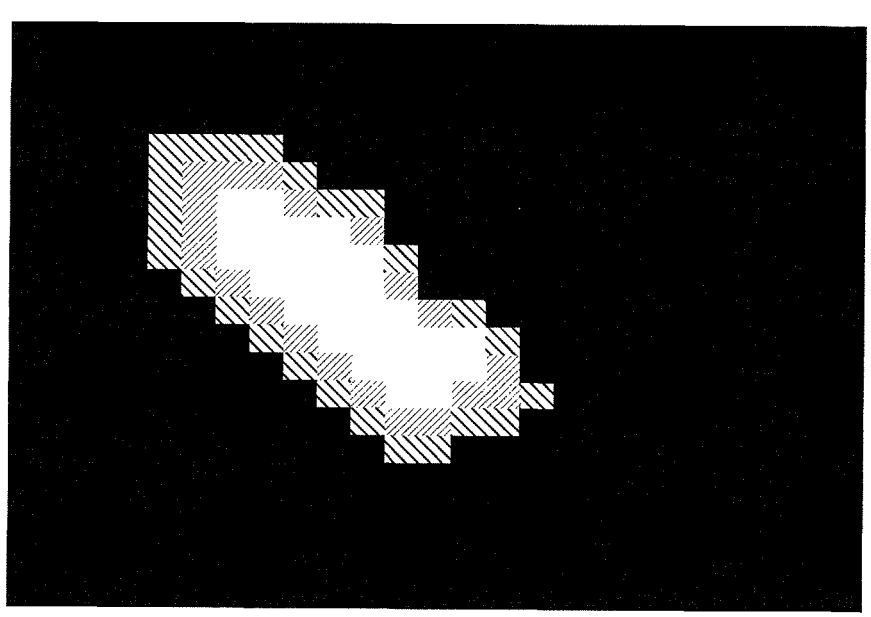

FIGS. 33A and 33B illustrate the linear interpolation of a portion of a curved line representing a seed. FIG. 33A illustrates an image before linear interpolation, and FIG. 33B illustrates an image after linear interpolation.

The interpolation process using linear interpolation may maintain the accuracy of a seed position. In this case, the pixel values of the pixels other than the seed pixels are regarded as being given by (R, G, B)=(0, 0, 0). For instance, with regard to seed 1, the pixel values of the seed pixels are given by (R, G, B)=(0<R≤55, 0, 0) after the interpolation process while they are given by (R, G, B)=(255, 0, 0) before the interpolation process. In FIGS. 33A and 33B, the pixels whose pixel values are given by (R, G, B)=(0, 0, 0) are displayed in black, the pixels whose pixel values are given by (R, G, B)=(255, 0, 0) are displayed in white, and the pixels whose pixel values are given by (R, G, B)=(0<R<255, 0, 0) are displayed with (diagonal) hatching.

The pixels whose pixel values are given by (R, G, B)=(0<R<255, 0, 0) are subjected to thresholding so as to be segmented into the seed pixels and the non-seed pixels. In this exemplary embodiment, a threshold value Θ is set, and processing is performed so that, for example, R is set to be equal to 255 (R=255) if R>Θ, and is set to be equal to zero (R=0) otherwise. The threshold value Θ may be set to a value, for example, 128.

Figure 34A:
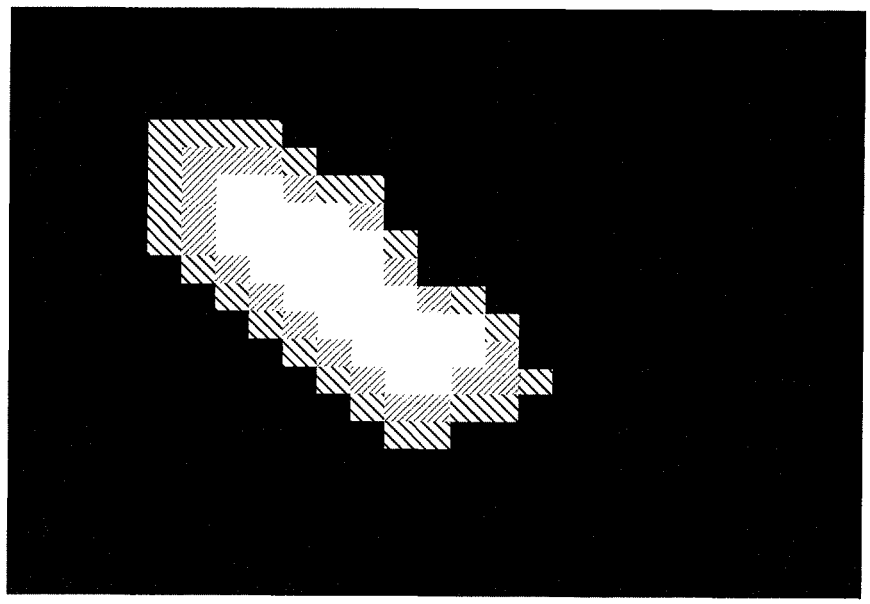
FIGS. 34A and 34B illustrate an image before thresholding and an image after thresholding, respectively.
Figure 34B:
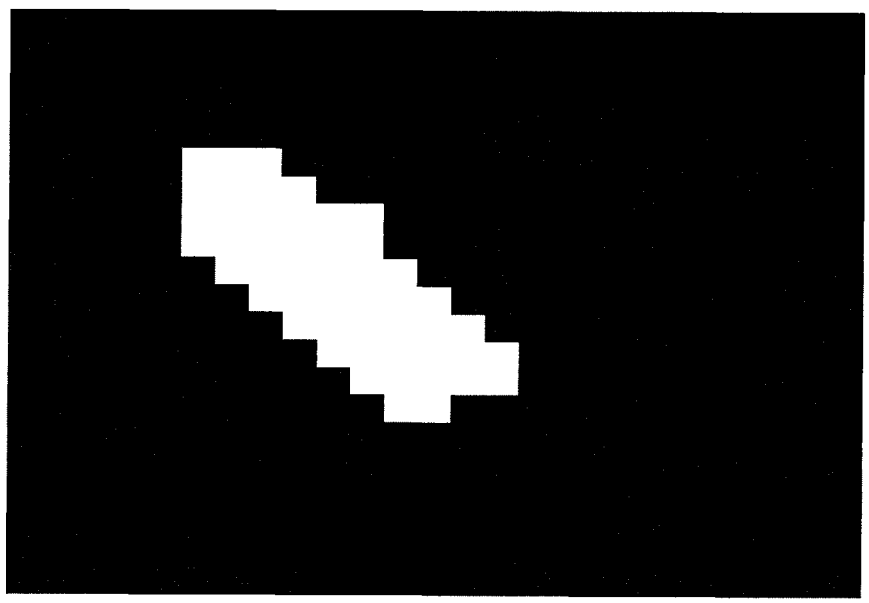

FIGS. 34A and 34B illustrate images before and after thresholding. Similarly to FIG. 33B, FIG. 34A illustrates the image before thresholding. FIG. 34B illustrates the image after thresholding. Accordingly, as illustrated in FIG. 34B, the position information image Gp, which is an image representing the seed, may be accurately reduced in size.

Alternatively, the pixels whose pixel values are given by (R, G, B)=(0<R<255, 0, 0) may be segmented into a fixed seed and a variable seed. As used herein, the term "fixed seed" refers to a pixel whose label is not changed during the segmentation of designated regions, and the term "variable seed" refers to a pixel whose label may be changed during the segmentation of designated regions. A variable seed is the same as an unlabeled pixel in terms of the label being changed, but unlike an unlabeled pixel, a variable seed is a point having a label and an initial value of the strength of the label.

Figure 35:
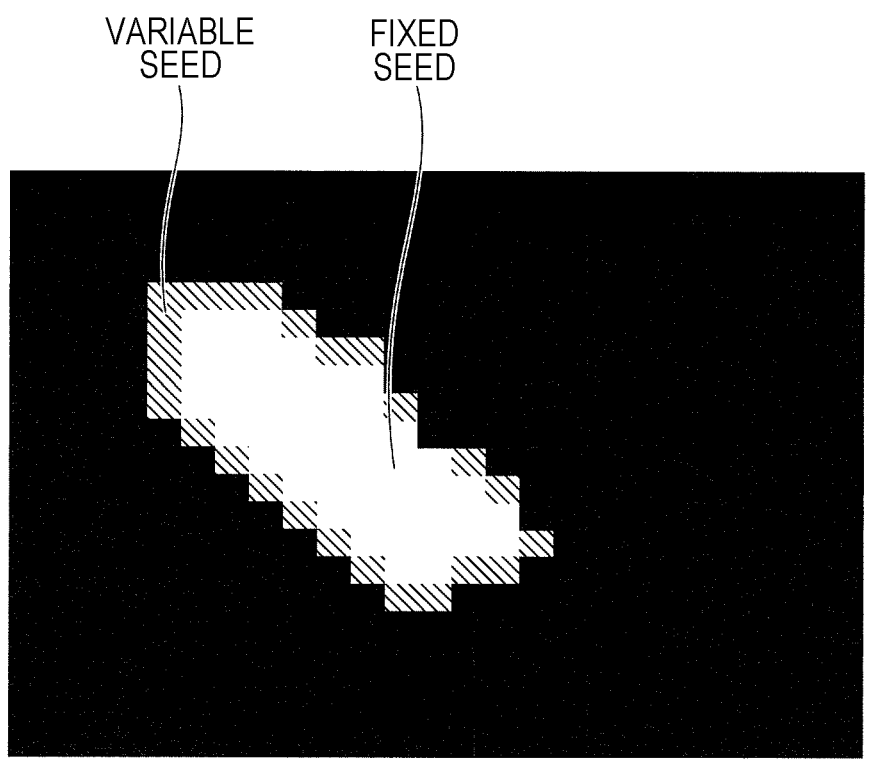
FIG. 35 illustrates a fixed seed and a variable seed.

For example, as in FIG. 35, each of the pixels illustrated in FIG. 34A is processed so as to be segmented into a fixed seed if R>Θ or a variable seed if 0<R≤Θ. The value Θ may be set to a value, for example, 128.

While the foregoing description has been given in the context of one type of seed, two or more types of seeds may be used in a similar manner.

Figure 36:
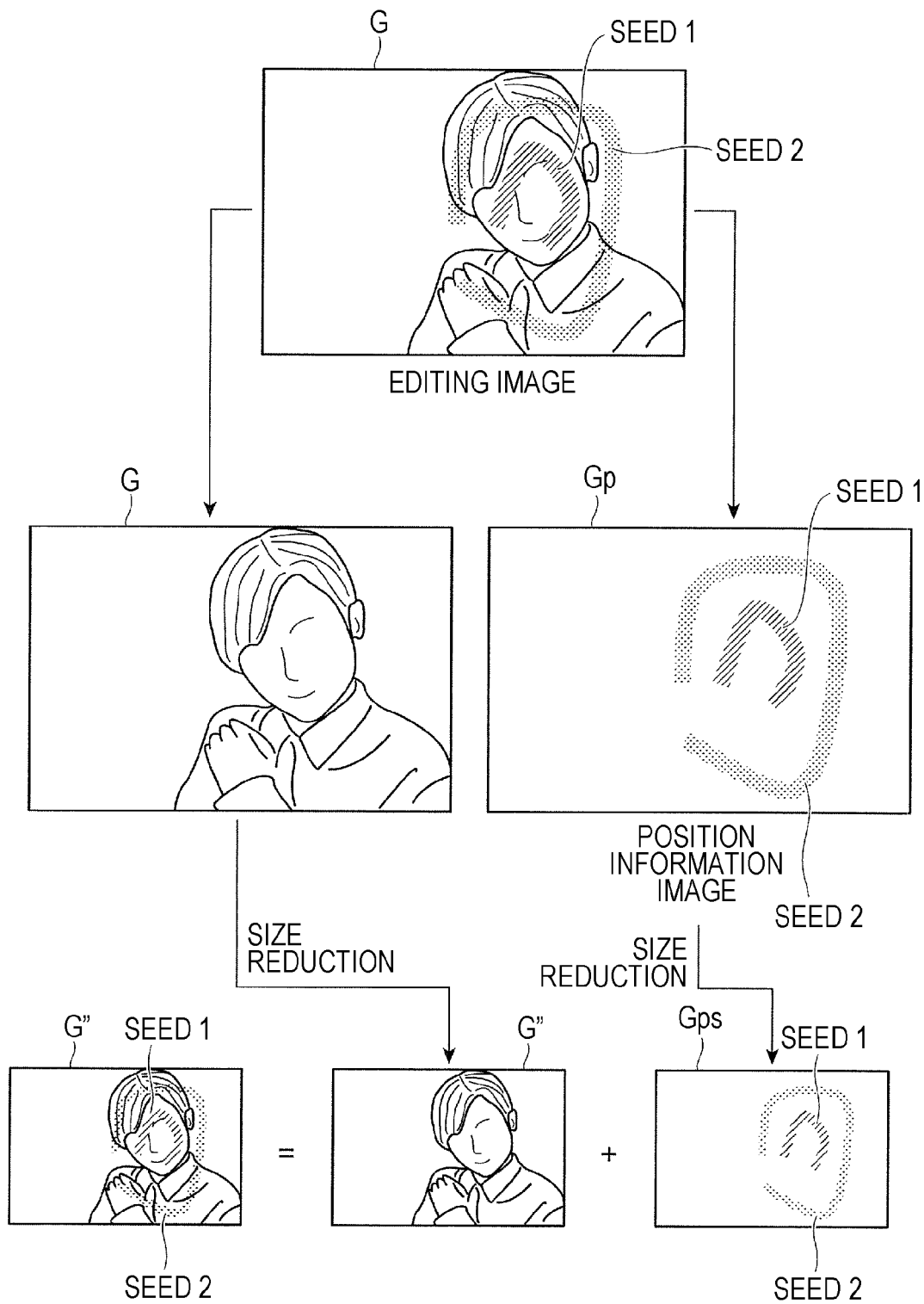
FIG. 36 illustrates the combination of a reduced image and a reduced position information image.

Then, as illustrated in FIG. 36, the image G", which is a size-reduced version of the image G, and a size-reduced position information image Gps are combined. Then, the first region detection unit 13 segments designated regions. That is, the first region detection unit 13 detects designated regions on the basis of a changed seed.

As described above, in the second exemplary embodiment, the image size changing unit 19 has the feature of decomposing an editing image having a size suitable for the user for editing into to an image G to be edited and a position information image Gp indicating the positions of seeds, and reducing the sizes of the image G and the position information image Gp to sizes suitable for image processing. In other words, the image size changing unit 19 separates an editing image to be used by the user to specify a designated region and position information from each other, and separately changes the editing image and the position information.

The functions of the image information obtaining unit 11, the user instruction acceptance unit 12, the first region detection unit 13, the designated region enlargement unit 14, the second region detection unit 15, the region switching unit 16, the image processing unit 17, and the image information output unit 18 illustrated in FIG. 28 are similar to those in the first exemplary embodiment. Note that the first region detection unit 13 uses the image G", which is a size-reduced version of the image G, instead of the image G.

Third Exemplary Embodiment

Next, an image processing apparatus 10 according to a third exemplary embodiment will be described. In the third exemplary embodiment, a block diagram illustrating an example functional configuration of the image processing apparatus 10 is similar to that illustrated in FIG. 2.

In the first exemplary embodiment, two designated regions are used. In the third exemplary embodiment, three designated regions are used.

Figure 37:
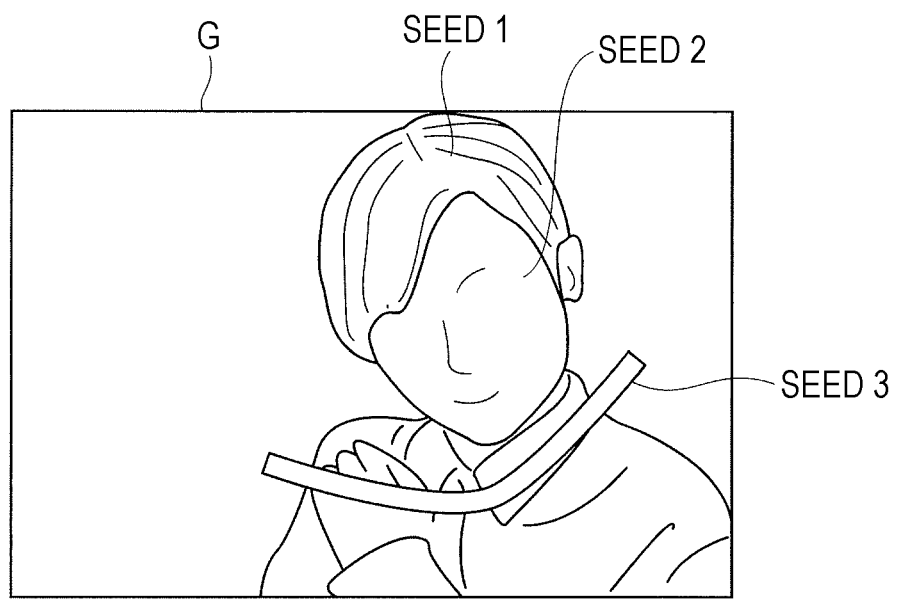
FIG. 37 illustrates the case where three seeds are given in the image illustrated in FIG. 3B according to the third exemplary embodiment.

FIG. 37 illustrates the case where three seeds are given in the image G illustrated in FIG. 3B.

In FIG. 37, "seed 1", "seed 2", and "seed 3" are drawn in the hair portion, the face portion, and the portion other than the hair portion and the face portion, respectively.

The first region detection unit 13 assigns "label 1" to the pixels corresponding to the "seed 1", "label 2" to the pixels corresponding to the "seed 2", and "label 3" to the pixels corresponding to the "seed 3", and performs a process for segmenting designated regions from within the image G by using a region growing method.

Figure 38A:
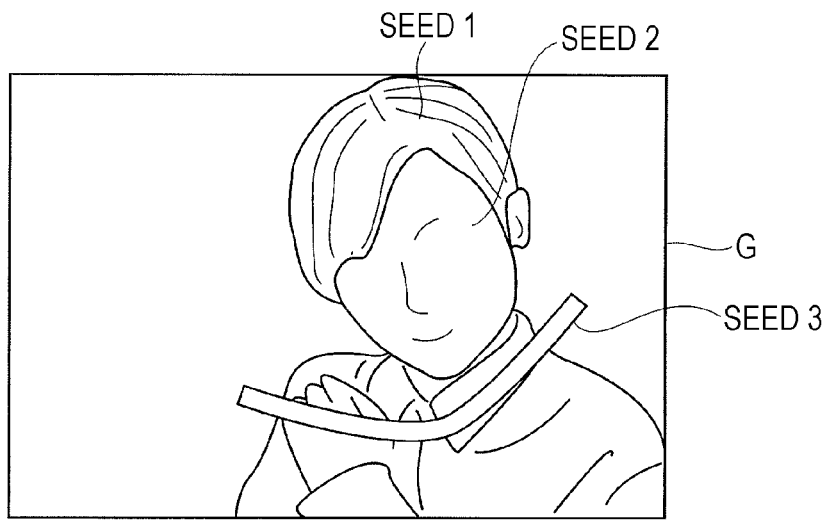
FIGS. 38A to 38C illustrate the segmentation of designated regions in the image illustrated in FIG. 37 using a region growing method.
Figure 38B:
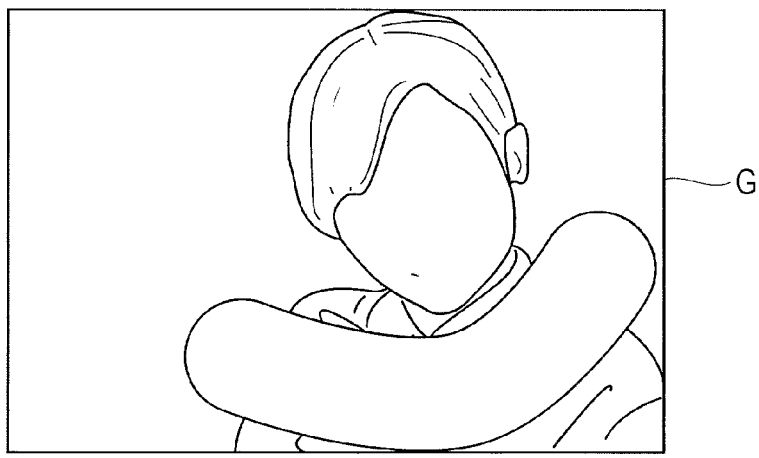
Figure 38C:
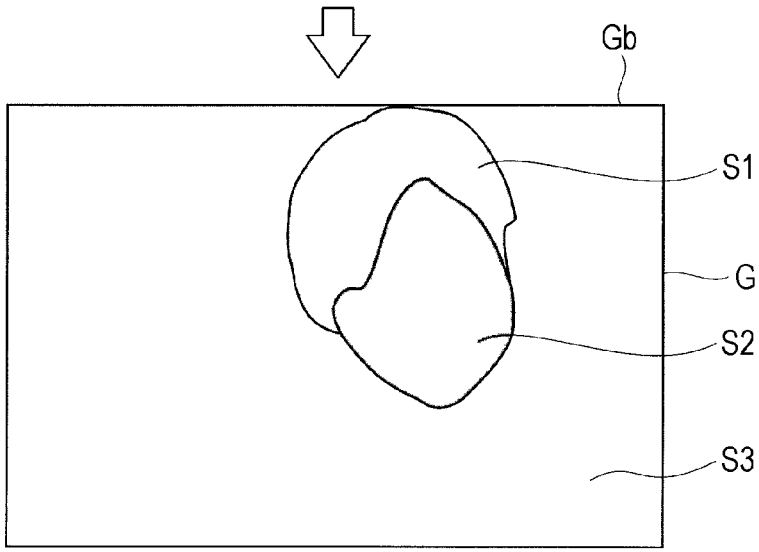

FIGS. 38A to 38C illustrate the segmentation of designated regions in the image G illustrated in FIG. 37 using a region growing method.

FIG. 38A illustrates the image G illustrated in FIG. 37, on which paths are drawn as seeds.

Then, as illustrated in FIG. 38B, the respective regions are expanded into the designated regions from the paths drawn as the seeds. Then, as illustrated in FIG. 38C, three designated regions, namely, a "first designated region (S1)", a "second designated region (S2)", and a "third designated region (S3)", are finally segmented as designated regions.

Figure 39A:
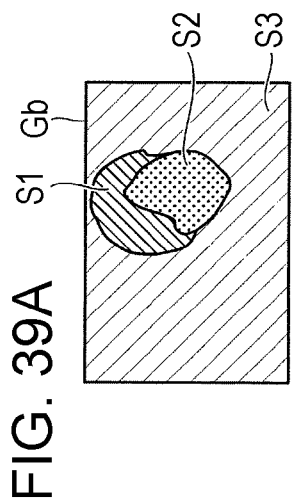
FIGS. 39A to 39C illustrate a process performed by the designated region enlargement unit according to the third exemplary embodiment.
Figure 39B:
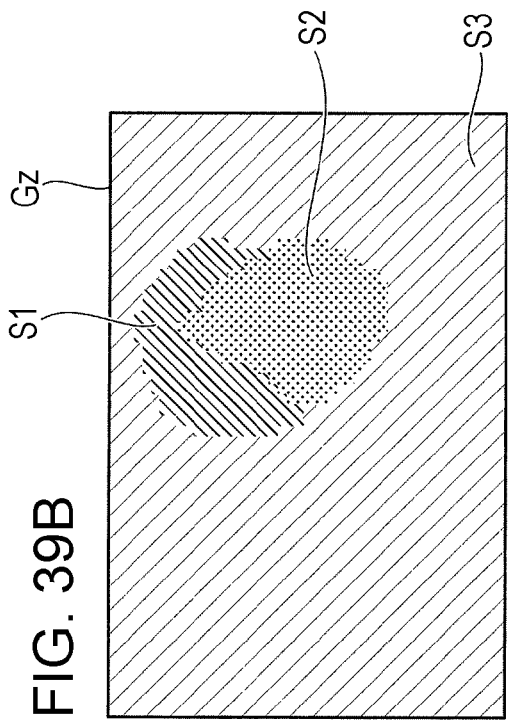
Figure 39C:
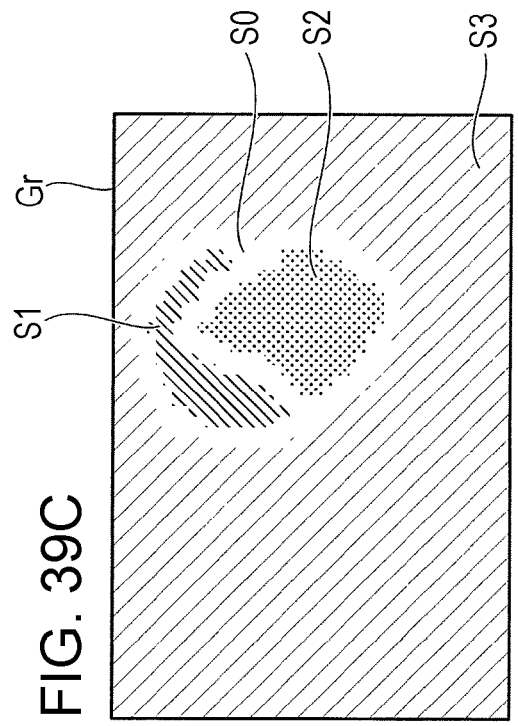

FIGS. 39A to 39C illustrate a process performed by the designated region enlargement unit 14 according to this exemplary embodiment, which corresponds to the process according to the first exemplary embodiment illustrated in FIGS. 5A and 5B.

That is, the designated region enlargement unit 14 enlarges a segmentation image Gb illustrated in FIG. 39A in which designated regions have been segmented to produce an enlarged segmentation image Gz illustrated in FIG. 39B.

FIG. 39C illustrates a process performed by the second region detection unit 15 according to this exemplary embodiment.

That is, the second region detection unit 15 resets the labels in the boundary portions for the "first designated region (S1)", the "second designated region (S2)", and the "third designated region (S3)" to obtain a region S0, and produces a label-reset image Gr.

FIGS. 40A and 40B illustrate a process in which the second region detection unit 15 detects designated regions again within the region S0 according to this exemplary embodiment.

Similarly to FIG. 39C, FIG. 40A illustrates the label-reset image Gr before the second region detection unit 15 detects designated regions. Then, the second region detection unit 15 detects designated regions again within the region S0. As a result, as illustrated in FIG. 40B, the "first designated region (S1)", the "second designated region (S2)", and the "third designated region (S3)" are again segmented, resulting in the region S0 disappearing and a final segmentation image Gbe being obtained.

The subsequent processes are similar to those in the first exemplary embodiment.

The graph cut method of the related art enables the segmentation of only two designated regions. In contrast, the image processing apparatus 10 according to this exemplary embodiment enables the segmentation of three designated regions. Note that the image processing apparatus 10 according to this exemplary embodiment may segment more than three designated regions.

Fourth Exemplary Embodiment

Next, an image processing apparatus 10 according to a fourth exemplary embodiment will be described. In the fourth exemplary embodiment, a block diagram illustrating an example functional configuration of the image processing apparatus 10 is similar to that illustrated in FIG. 2.

In the fourth exemplary embodiment, if the first region detection unit 13 has failed to segment designated regions, an additional seed is used to segment designated regions again.

FIGS. 41A to 41E illustrate the case where an additional seed is used for the segmentation of designated regions.

Figure 41A:
FIGS. 41A to 41E illustrate the case where an additional seed is used for the segmentation of designated regions according to the fourth exemplary embodiment.

Similarly to FIG. 3B, FIG. 41A illustrates an image G in which the user draws seed 1 in the face portion and seed 2 in the non-face portion.

Figure 41B:

In FIG. 41B, the image G is segmented into a "first designated region (S1)" and a "second designated region (S2)" by the first region detection unit 13. FIG. 41B illustrates the case where the first region detection unit 13 has failed to segment designated regions within a region surrounded by a dotted-line circle in FIG. 41B. That is, a portion that should have been segmented into the "second designated region (S2)" has been segmented into the "first designated region (S1)". Such a portion, which should have been assigned "label 1", has been assigned "label 2".

Figure 41C:
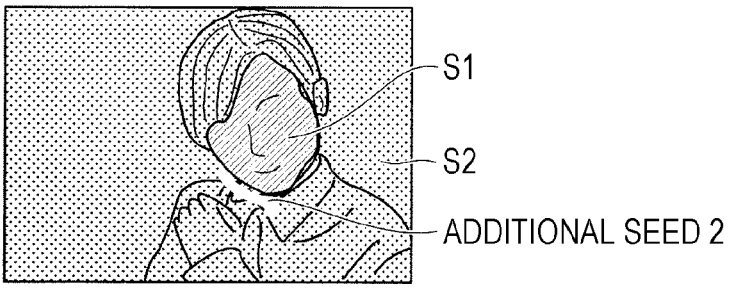

In this case, as illustrated in FIG. 41C, the user gives additional seed 2 on this portion, which indicates that this portion is in the "second designated region (S2)". That is, the user gives additional position information. The additional position information is obtained by the user instruction acceptance unit 12.

In response to the additional seed 2 having been given, the first region detection unit 13 resets the "label 1" or "label 2" assigned to each of the pixels located around the position indicated by the additional position information. That is, the setting of the designated regions in this portion is canceled. The labels in the remaining portion are still maintained; the "label 1" or the "label 2" is maintained as is.

Figure 41D:
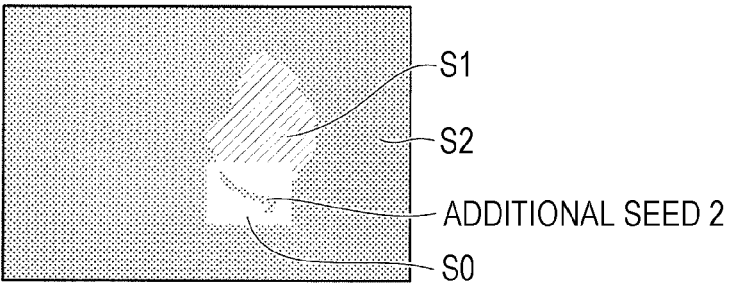

In FIG. 41D, the labels assigned to the additional seed 2 and the neighboring pixels have been reset. In FIG. 41D, the portion for which the labels have been reset is indicated by a region S0. In other words, the pixels in the region S0 are assigned "label 0". As illustrated in FIG. 41D, the region S0 is set as, for example, a rectangular region.

Figure 41E:

The subsequent processes are similar to those in the first exemplary embodiment. As illustrated in FIG. 41E, the "first designated region (S1)" and the "second designated region (S2)" are segmented. As seen in FIG. 41E, due to the effect of the use of additional seed 2, the image G is accurately segmented into the "first designated region (S1)", which is the face portion, and the "second designated region (S2)", which is the non-face portion.

Figure 42A:
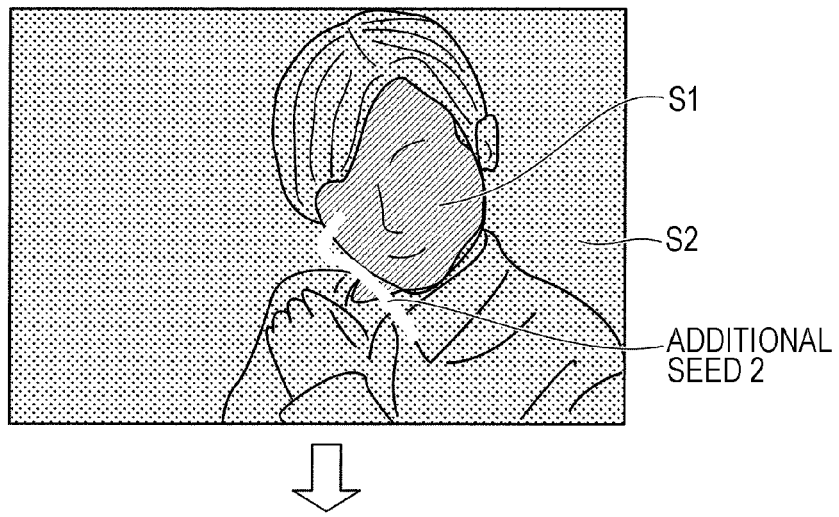
FIGS. 42A to 42C illustrate the correction of an additional seed.
Figure 42B:
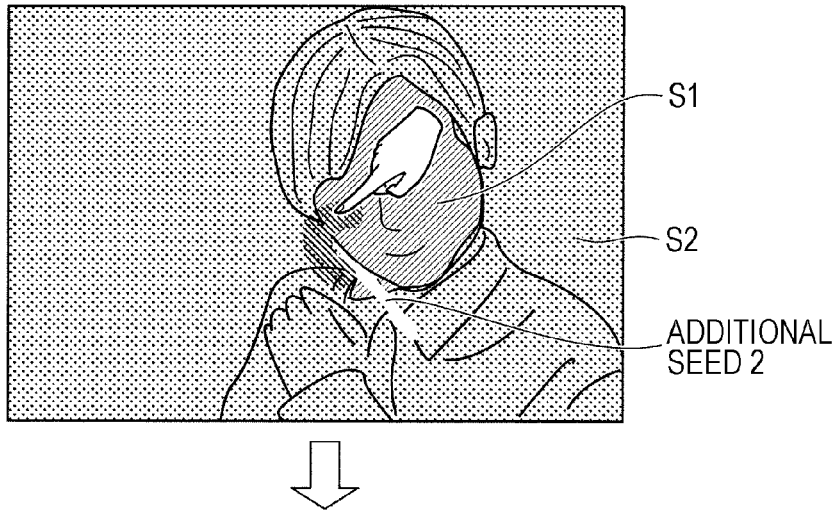
Figure 42C:
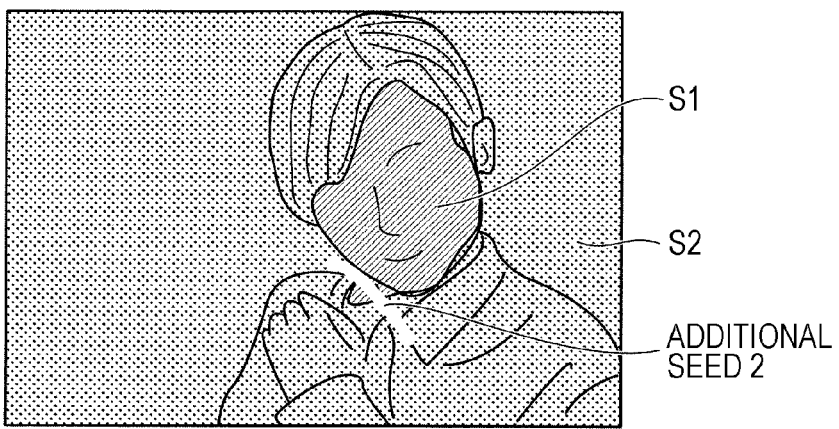

FIGS. 42A to 42C illustrate the correction of an additional seed.

In FIG. 42A, the user draws additional seed 2. Additional seed 2 is drawn so as to protrude into a portion that should be the "first designated region (S1)" within the region surrounded by the dotted-line circle in FIG. 41B.

In this case, the user is able to correct the additional seed 2 which has once been drawn. Specifically, the seed 2 is partially erased and a protruding portion thereof is deleted. In practice, as illustrated in FIG. 42B, the user draws a path for erasing an unnecessary seed portion in a way similar to that when the user draws a seed. Information (erasure information) for erasing a seed by the user is obtained by the user instruction acceptance unit 12. This enables at least a portion of the additional seed 2 to be selectively erased. FIG. 42C illustrates an image in which the protruding portion of the additional seed 2 has been erased.

In the subsequent processes, the first region detection unit 13 detects designated regions in accordance with the additional seed 2, at least the portion of which has been erased using the erasure information. That is, the first region detection unit 13 segments designated regions in the way illustrated in FIGS. 41D and 41E.

In the example described above, a single additional seed is used. Plural additional seeds may be used.

Figure 43:
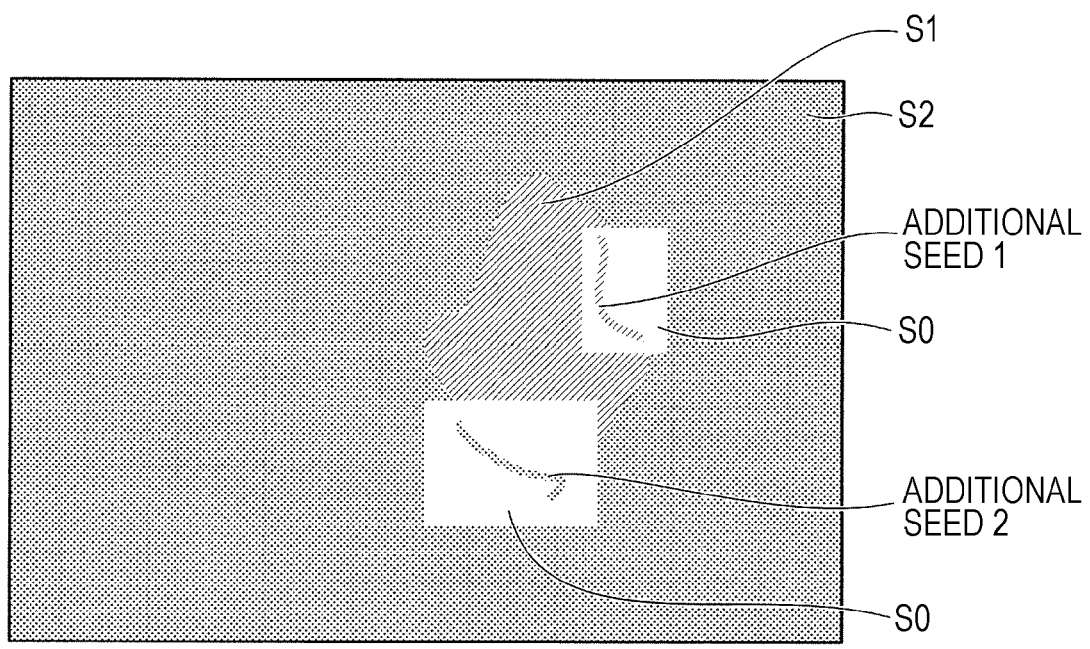
FIG. 43 illustrates the case where plural additional seeds are used.

FIG. 43 illustrates the case where plural additional seeds are used.

In FIG. 43, additional seeds each for one of seed 1 and seed 2 are used. In FIG. 43, the seeds are represented by additional seed 1 and additional seed 2. Rectangular regions S0 are respectively set for the additional seed 1 and the additional seed 2. Plural additional seeds for the seed 1 may be used and plural additional seeds for the seed 2 may be used.

In the example described above, each of the regions S0 is set as a rectangular region. However, the region S0 is not limited to this shape.

Figure 44A:
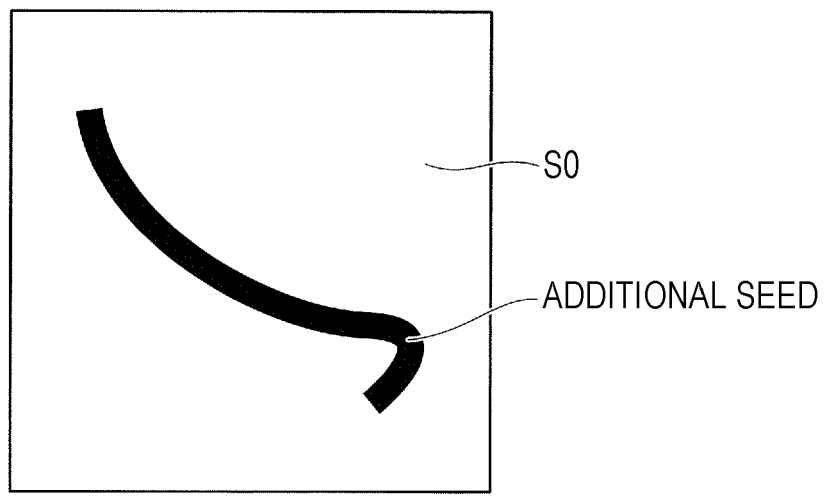
FIGS. 44A and 44B illustrate a method for setting a region in which an additional seed is given.
Figure 44B:
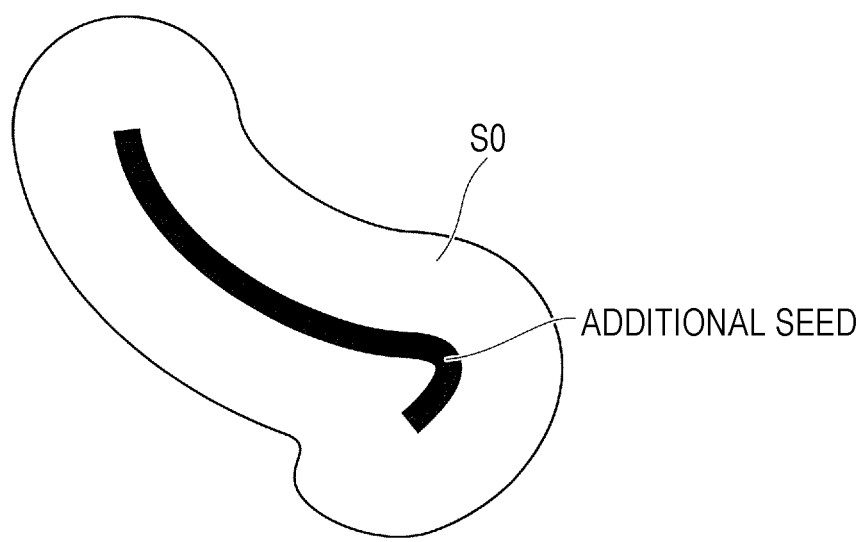

FIGS. 44A and 44B illustrate a method for setting the region S0 in which an additional seed is given.

In FIG. 44A, the region S0 is set to have a rectangular shape for an additional seed, which is similar to the case described above. In FIG. 44B, the region S0 is set to have a curved shape for the additional seed. The curved shape has a certain width and surrounds the additional seed.

Alternatively, the set region S0 may include a seed that has been given. In this case, the label for the previously given seed is not reset but is maintained as is.

Figure 45:
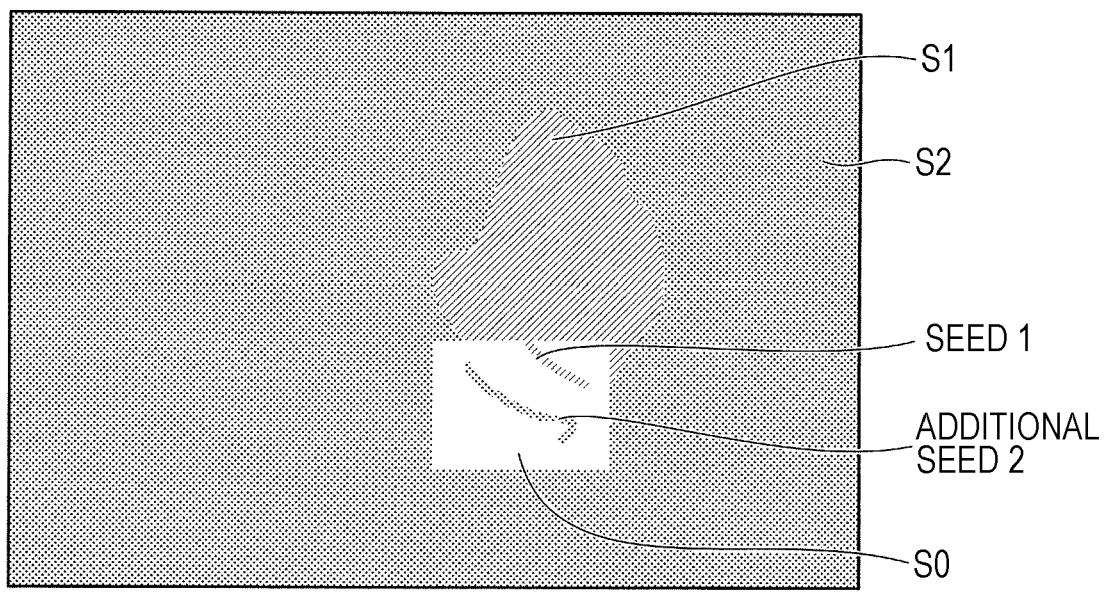
FIG. 45 illustrates the case where the set region includes a seed that has been given.

FIG. 45 illustrates the case where the set region S0 includes a seed that has been given.

In this case, a rectangular region S0 set for an additional seed includes the seed 1 that has been given. Since it is apparent that the portion corresponding to the seed 1 be included in the "first designated region (S1)", the label for this portion is maintained as "label 1". The labels for the remaining portion in the rectangular region S0 are reset, resulting in a region S0 being obtained.

In the fourth exemplary embodiment, not all the image is subjected to the segmentation of designated regions in FIG. 41D.

Figure 46B:
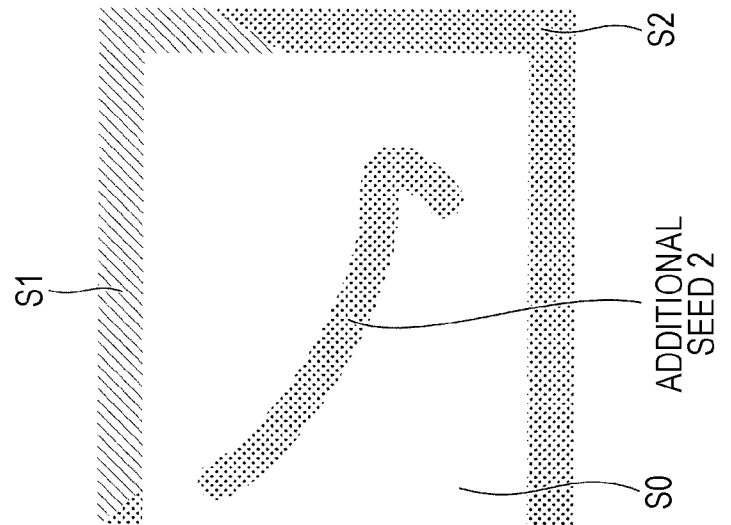
FIGS. 46A and 46B illustrate an image range to be subjected to the segmentation of designated regions according to the fourth exemplary embodiment.
Figure 46A:
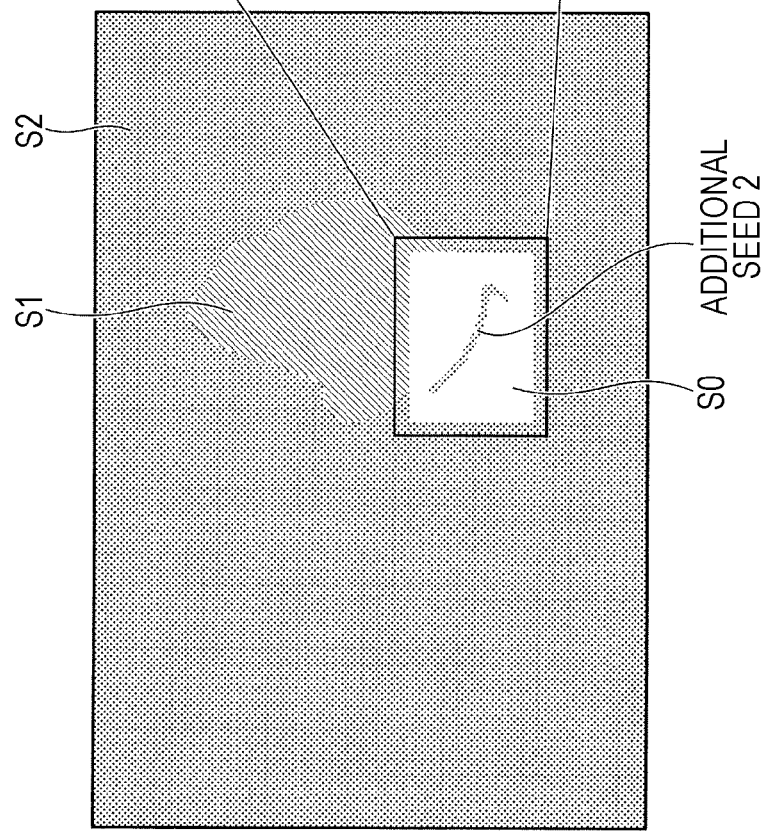

FIGS. 46A and 46B illustrate an image range to be subjected to the segmentation of designated regions according to the fourth exemplary embodiment.

FIG. 46A illustrates an image in the state illustrated in FIG. 41D, in which a region S0 has been set. As illustrated in FIG. 46B, it may be sufficient that a rectangular region larger than the set region S0 by a predetermined width be set and designated regions be segmented within the rectangular region. In this case, the pixels in the "first designated region (S1)" may be handled as the seed 1 and the pixels in the "second designated region (S2)" may be handled as the seed 2.

In the image processing apparatus 10 according to the first to fourth exemplary embodiments described above, both the first region detection unit 13 and the second region detection unit 15 segment designated regions by using any of the region growing methods in the first to fourth examples described above. These methods may not necessarily be adopted. A region growing method of the related art, such as the Grow-Cut method, may provide sufficient processing speed. Note that, as described above, the methods in the first to fourth examples may ensure that designated regions are more rapidly segmented.

While the image information obtaining unit 11 obtains image information on two types of images, namely, the image G and the image being used G', the image information obtaining unit 11 may obtain image information on the image being used G' and may reduce the size of the image being used G' to create an image G.

The image processing apparatus 10 described above first segments designated regions on the basis of the entirety of a lower-resolution image G or image G". Since the image G or the image G" is a low-resolution image, designated regions may be more rapidly segmented even though the entire image G is to be subjected to the segmentation of designated regions. The designated regions are enlarged until the size of the image G matches that of the image being used G', and designated regions are detected again within the boundary portion of the previously detected designated regions. Since the segmentation process is selectively performed on the boundary portion, a relatively small area is to be subjected to the segmentation process. The segmentation of designated regions does not involve giving seeds again and is based on a reference pixel selected from among pixels for which the setting of the designated regions has not been canceled. Accordingly, even if a high-resolution image being used G' is used, the accuracy for the segmentation of designated regions may be improved and an improvement in processing speed may be achieved. In addition, the region growing methods in the first to fourth examples described above may provide a further improvement in processing speed. In the fourth exemplary embodiment, when an additional seed is given, the additional seed and neighboring pixels of the additional seed are subjected to the process described above. Also in this case, the accuracy for the segmentation of designated regions may be more improved and an improvement in processing speed may be achieved.

The process performed by the image processing apparatus 10 described above may be implemented as an image processing method including a position information obtaining step of obtaining position information indicating a representative position of one or more designated regions in an image, and a region detecting step of detecting the one or more designated regions from the position information, the region detecting step including canceling a setting of the one or more designated regions for pixels within a predetermined portion of the image, and detecting the one or more designated regions again for the pixels within the predetermined portion, based on a reference pixel selected from among pixels on the image for which the setting of the one or more designated regions has not been canceled.

Example Hardware Configuration of Image Processing Apparatus

Next, a hardware configuration of the image processing apparatus 10 will be described.

Figure 47:
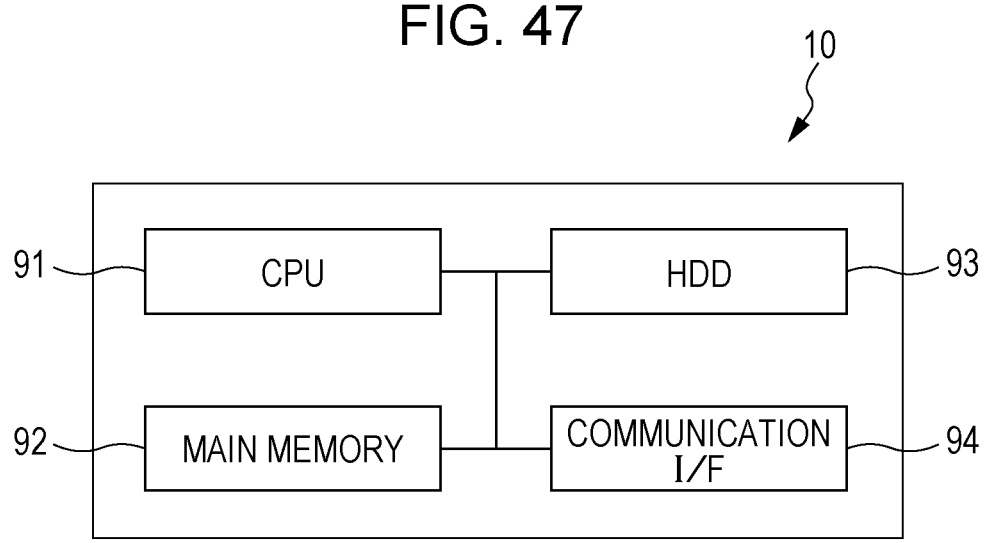
FIG. 47 illustrates a hardware configuration of the image processing apparatus.

FIG. 47 illustrates a hardware configuration of the image processing apparatus 10.

As described above, the image processing apparatus 10 is implementable by a personal computer or the like. As illustrated in FIG. 47, the image processing apparatus 10 includes a central processing unit (CPU) 91 serving as an arithmetic unit, and a main memory 92 and a hard disk drive (HDD) 93, each of which serves as a memory. The CPU 91 executes various programs such as an operating system (OS) and application software. The main memory 92 is a storage area that stores various programs and data and the like used for the execution of the programs, and the HDD 93 is a storage area that stores input data for various programs, and output data and the like from the various programs.

The image processing apparatus 10 further includes a communication interface (I/F) 94 for performing communication with an external device.

Description of Program

The process performed by the image processing apparatus 10 according to the exemplary embodiments described above is prepared as, for example, a program of application software or the like.

Accordingly, the process performed by the image processing apparatus 10 according to the exemplary embodiments disclosed herein may be implemented as a program for causing a computer to implement a position information obtaining function of obtaining position information indicating a representative position of one or more designated regions in an image, and a region detection function of detecting the one or more designated regions from the position information, the region detection function canceling a setting of the one or more designated regions for pixels within a predetermined portion of the image, and detecting the one or more designated regions again for the pixels within the predetermined portion, based on a reference pixel selected from among pixels on the image for which the setting of the one or more designated regions has not been canceled.

A program implementing the exemplary embodiments disclosed herein may be provided through a communication unit, or may be stored in a recording medium such as a compact disc read-only memory (CD-ROM) and provided.

While exemplary embodiments have been described, the technical scope of the present invention is not limited to the scope described in the exemplary embodiments described above. It will be apparent from the appended claims that a variety of changes or modifications to the foregoing exemplary embodiments also fall within the technical scope of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a memory storing a program; and
a processor that, when instructed by the stored program, performs the functions of:
  a position information obtaining unit that obtains position information indicating a representative position of one or more designated regions in an image; and
  a region detection unit that detects the one or more designated regions from the position information,
wherein the region detection unit cancels a setting of the one or more designated regions for pixels within a predetermined portion of the image, and detects the one or more designated regions again for the pixels within the predetermined portion, based on a reference pixel selected from among pixels on the image for which the setting of the one or more designated regions has not been canceled,
the region detection unit detecting two designated regions, and
the setting cancellation within the predetermined portion of the image being performed by applying a filter for canceling a setting of the pixels within the predetermined portion of the image, the predetermined portion of the image being a boundary of the two designated regions.

2. The image processing apparatus according to claim 1, wherein the predetermined portion is a boundary portion of designated regions that are detected.

3. The image processing apparatus according to claim 1, wherein
the region detection unit includes a first region detection unit and a second region detection unit,
the first region detection unit detects the one or more designated regions from the position information, and
the second region detection unit cancels a setting of the one or more designated regions in a boundary portion of the designated regions that are enlarged.

4. The image processing apparatus according to claim 1, wherein the position information obtaining unit obtains additional position information indicating an additional position of the one or more designated regions, and
the region detection unit cancels the setting of the one or more designated regions for neighboring pixels of a pixel at the additional position indicated by the additional position information within a predetermined portion of the image.

5. The image processing apparatus according to claim 1, wherein
the position information obtaining unit further obtains erasure information for erasing at least a portion of the position information, and
the region detection unit detects the one or more designated regions from the position information, at least the portion of which has been erased using the erasure information.

6. The image processing apparatus according to claim 1, wherein the processor further functions as:
an image size changing unit that changes an image size of an image used by a user to specify a designated region and that changes the position information in accordance with the changed image size of the image,
wherein the region detection unit detects the one or more designated regions in accordance with the changed position information.

7. An image processing apparatus comprising:
a memory storing a program; and
a processor that, when instructed by the stored program, performs the functions of:
  a position information obtaining unit that obtains position information indicating a representative position of one or more designated regions in an image;
  a first region detection unit that detects the one or more designated regions from the position information;
  a designated region enlargement unit that enlarges the detected designated regions; and
  a second region detection unit that detects the one or more designated regions again within a boundary portion of the enlarged designated regions, based on a reference pixel selected from among pixels belonging to a region in the image other than the boundary portion,
the first region detection unit detecting two designated regions, and
the setting cancellation within the predetermined portion of the image being performed by applying a filter for canceling a setting of the pixels within the predetermined portion of the image, the predetermined portion of the image being a boundary of the two designated regions.

8. The image processing apparatus according to claim 7, wherein the processor further functions as:
an image size changing unit that changes an image size of an image used by a user to specify a designated region and that changes the position information in accordance with the changed image size of the image,
wherein the first region detection unit detects the one or more designated regions in accordance with the changed position information.

9. The image processing apparatus according to claim 8, wherein the image size changing unit separates the image used by a user to specify a designated region and the position information from each other, and separately changes the image and the position information.

10. The image processing apparatus according to claim 7, wherein
the second region detection unit applies a filter for canceling a setting of the one or more designated regions so that the filter is centered on a pixel on a boundary of the designated regions enlarged by the designated region enlargement unit, and detects the one or more designated regions again for the pixels for which the setting of the one or more designated regions has been canceled, by using, as the reference pixel, a pixel for which the setting of the one or more designated regions has not been canceled.

11. The image processing apparatus according to claim 7, wherein the second region detection unit includes
a range setting unit that sets a first range or changes a second range,
  the first range being set for a reference pixel selected from among pixels belonging to each of the enlarged designated regions and being a range for a first target pixel to be determined to be or not to be in the corresponding one of the one or more designated regions,
  the second range being set for a second target pixel that is a selected target pixel and being a range including the reference pixel, the reference pixel being a pixel for determining in which designated region the second target pixel is included, and
a determination unit that determines to which designated region the first target pixel or the second target pixel belongs.

12. The image processing apparatus according to claim 7, wherein the first region detection unit includes
a range setting unit that sets a first range or changes a second range,
  the first range being set for a reference pixel selected from among pixels belonging to each of the one or more designated regions and being a range for a first target pixel to be determined to be or not to be in the corresponding one of the one or more designated regions,
  the second range being set for a second target pixel that is a selected target pixel and being a range including the reference pixel, the reference pixel being a pixel for determining in which designated region the second target pixel is included, and
a determination unit that determines to which designated region the first target pixel or the second target pixel belongs.

13. The image processing apparatus according to claim 7, wherein
the position information obtaining unit obtains additional position information indicating an additional position of the one or more designated regions, and
the first region detection unit detects the one or more designated regions in accordance with the additional position information.

14. An image processing system comprising:
an additive-color-mixing display that displays an image;
a processor that performs image processing on image information on the image displayed on the display device; and
a touch-sensitive input device that inputs an instruction from a user to the image processing apparatus to perform image processing,
the processor performing the functions of
  a position information obtaining unit that obtains position information indicating a representative position of one or more designated regions in the image, and
  a region detection unit that detects the one or more designated regions from the position information,
  wherein the region detection unit cancels a setting of the one or more designated regions for pixels within a predetermined portion of the image, and detects the one or more designated regions again for the pixels within the predetermined portion, based on a reference pixel selected from among pixels on the image for which the setting of the one or more designated regions has not been canceled,
the region detection unit detecting two designated regions, and
the setting cancellation within the predetermined portion of the image being performed by applying a filter for canceling a setting of the pixels within the predetermined portion of the image, the predetermined portion of the image being a boundary of the two designated regions.

15. A non-transitory computer readable medium storing a program causing a computer to execute a process, the process comprising:
obtaining position information indicating a representative position of one or more designated regions in an image; and
detecting the one or more designated regions from the position information, wherein the detecting includes canceling a setting of the one or more designated regions for pixels within a predetermined portion of the image, and detecting the one or more designated regions again for the pixels within the predetermined portion, based on a reference pixel selected from among pixels on the image for which the setting of the one or more designated regions has not been canceled, the region detection step detecting two designated regions, and the setting cancellation within the predetermined portion of the image being performed by applying a filter for canceling a setting of the pixels within the predetermined portion of the image, the predetermined portion of the image being a boundary of the two designated regions.

\* \* \* \* \*